United States Patent [19]

Winthrop et al.

[11] 4,406,627

[45] Sep. 27, 1983

[54] WAVEFORM SIMULATOR FOR AN ELECTRONIC SYSTEM MAINTENANCE TRAINER

[75] Inventors: Michael F. Winthrop, Sterling, Va.; Buddy L. Holmes, Ocean Springs, Miss.

[73] Assignee: The United States of America as represented by the Secretary of the Air Force, Washington, D.C.

[21] Appl. No.: 433,171

[22] Filed: Oct. 6, 1982

Related U.S. Application Data

[63] Continuation-in-part of Ser. No. 132,454, Mar. 21, 1980, abandoned.

[51] Int. Cl.³ .............................................. G09B 23/00
[52] U.S. Cl. .................................. 434/219; 434/366; 364/801
[58] Field of Search ............... 434/323, 307, 365, 366, 434/219; 364/801, 802

[56] References Cited

U.S. PATENT DOCUMENTS

| | | | |
|---|---|---|---|
| 3,832,790 | 9/1974 | Fryer, Jr. et al. | 434/324 |
| 4,091,550 | 5/1978 | Schrenk et al. | 434/366 |
| 4,167,821 | 9/1979 | Gibson, Jr. et al. | 434/219 |
| 4,316,720 | 2/1982 | Ackerman | 434/366 |

OTHER PUBLICATIONS

Forrest M. Mims, "*Micro Processor Microcourse*" Popular Electronics, May 1978, pp. 56-60.
Edward Roberts, "*Altair 8800 The Most Powerful Microcomputer Project ever presented can be built for under $400*", Popular Electronics, Jan. 1975, pp. 33-38.
Pace, "*A Logic Designers Guide to Program Equivalents of TTL Functions*", Mar. 1976, pp. 4.1-4.7.

Primary Examiner—Vance Y. Hum
Assistant Examiner—Leo P. Picard
Attorney, Agent, or Firm—Donald J. Singer; Willard R. Matthews

[57] ABSTRACT

A maintenance training system capable of precisely simulating both the inner and the outward functions of original electronic equipment is realized by utilizing a programmable waveform generator, a microcomputer and interfacing input/output circuits in a modular design that can be adapted to use with virtually any desired electronic system maintenance trainer. The system provides genuine waveform generation and display in a real time maintenance trainer with positive input/output control through line replacable unit read/write modules. The programmable waveform generator develops analog waveforms from digital control and picture data received from the micro-computer. The analog outputs of the programmable waveform generator drive the maintenance trainer's external meters, displays and oscilloscope and can be programmed to simulate point by point circuit tracing of the original electronic equipment.

13 Claims, 48 Drawing Figures

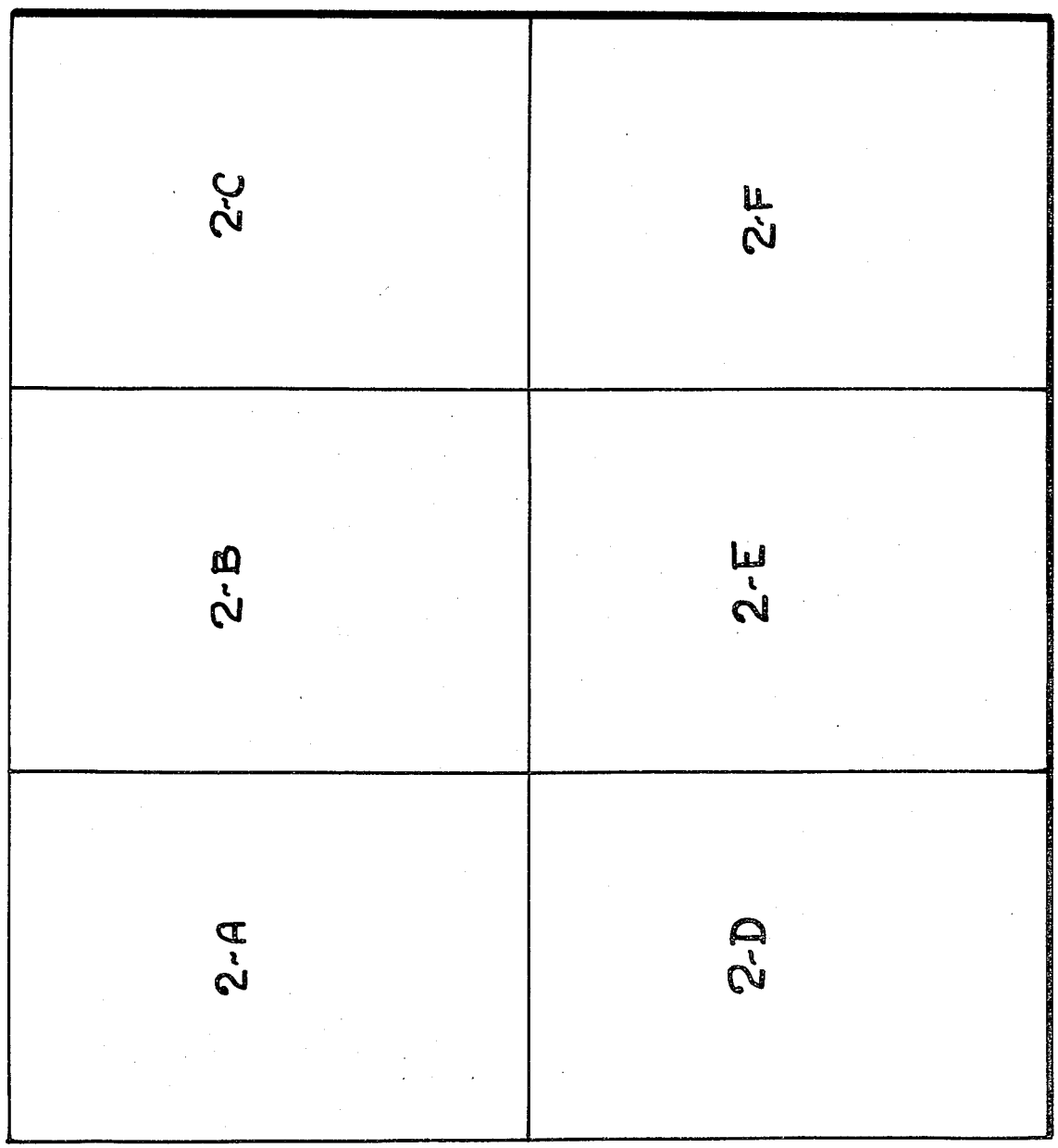

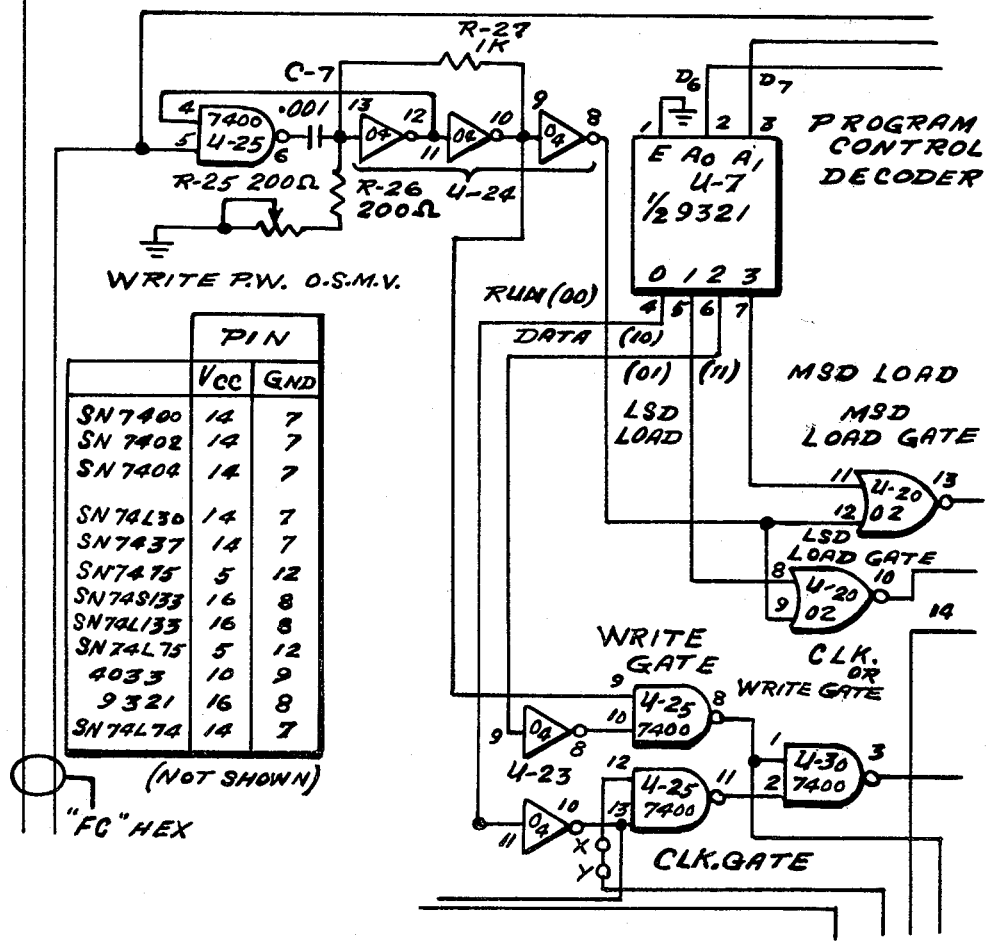
FIG. 2-A

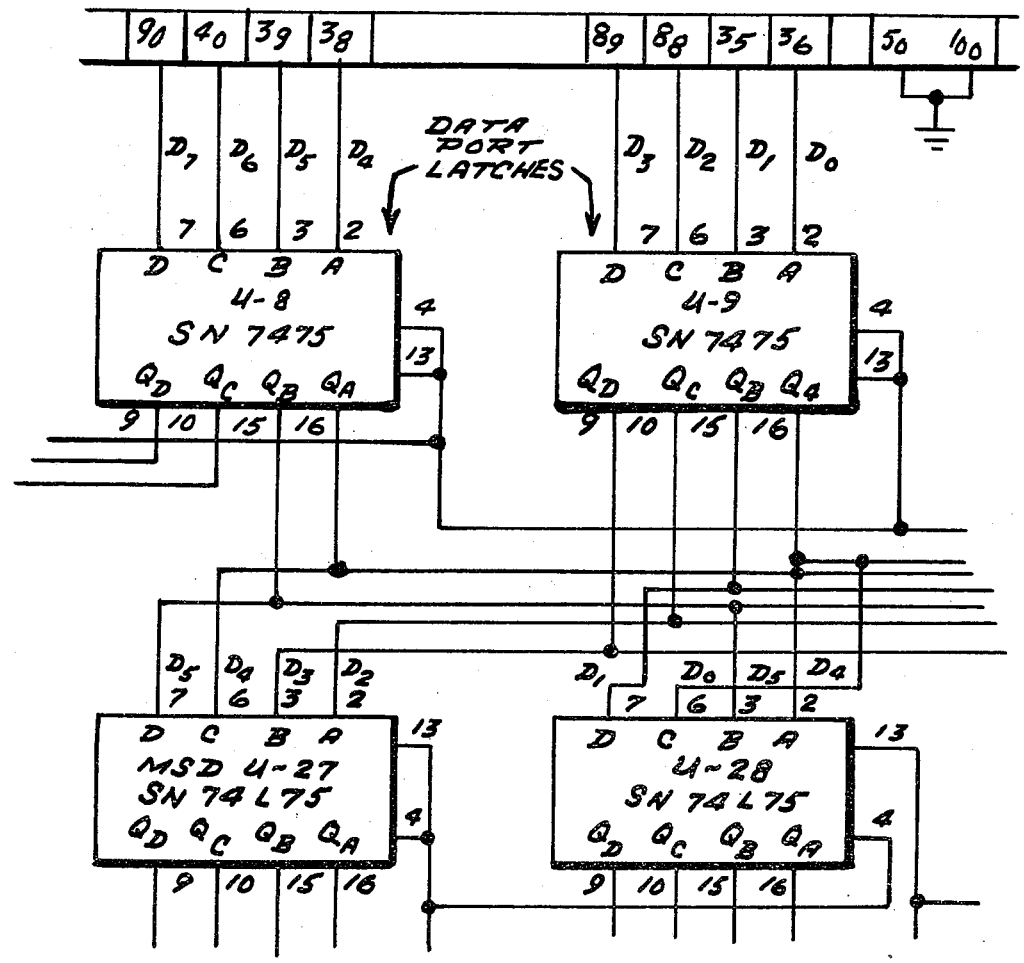
FIG. 2-B

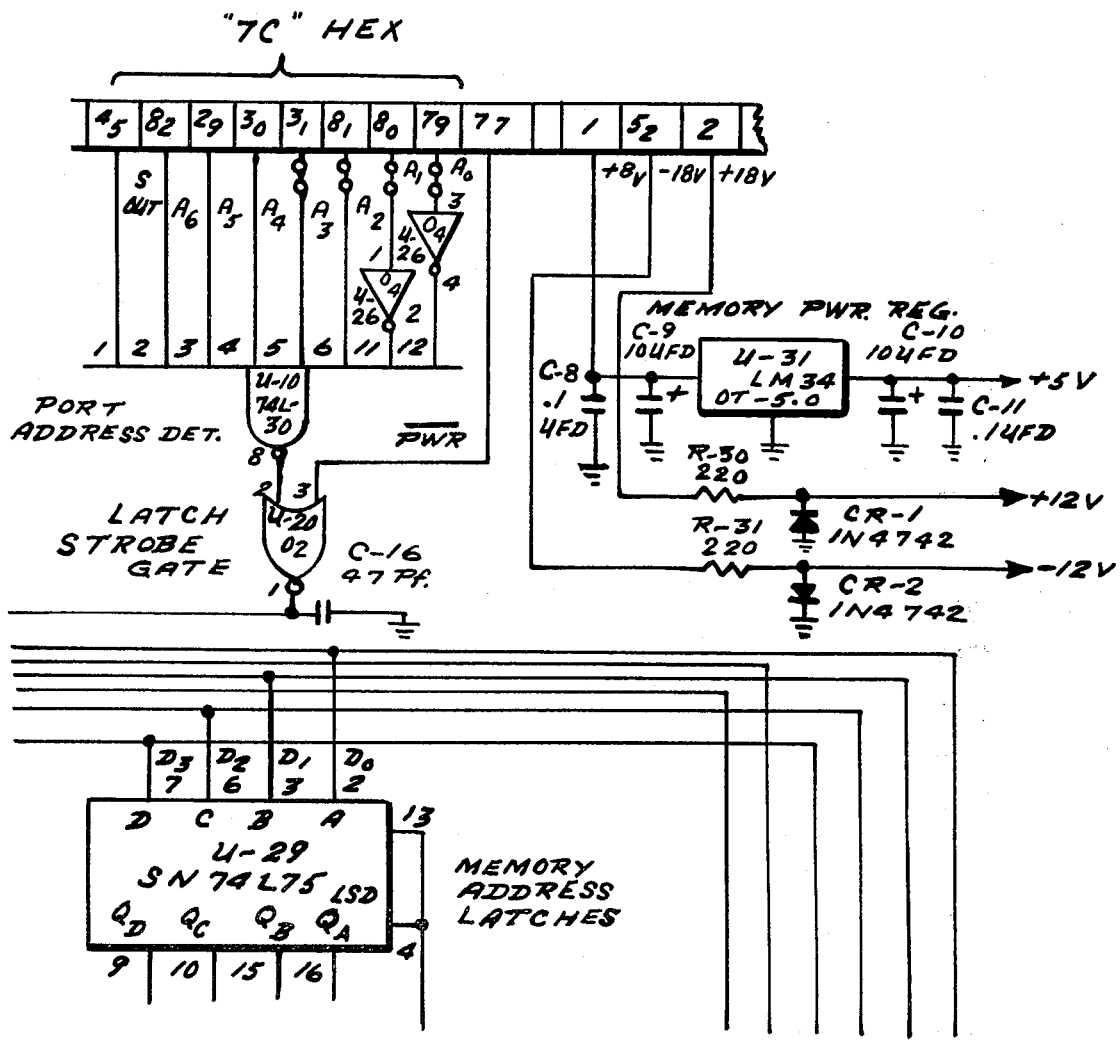
FIG. 2-C

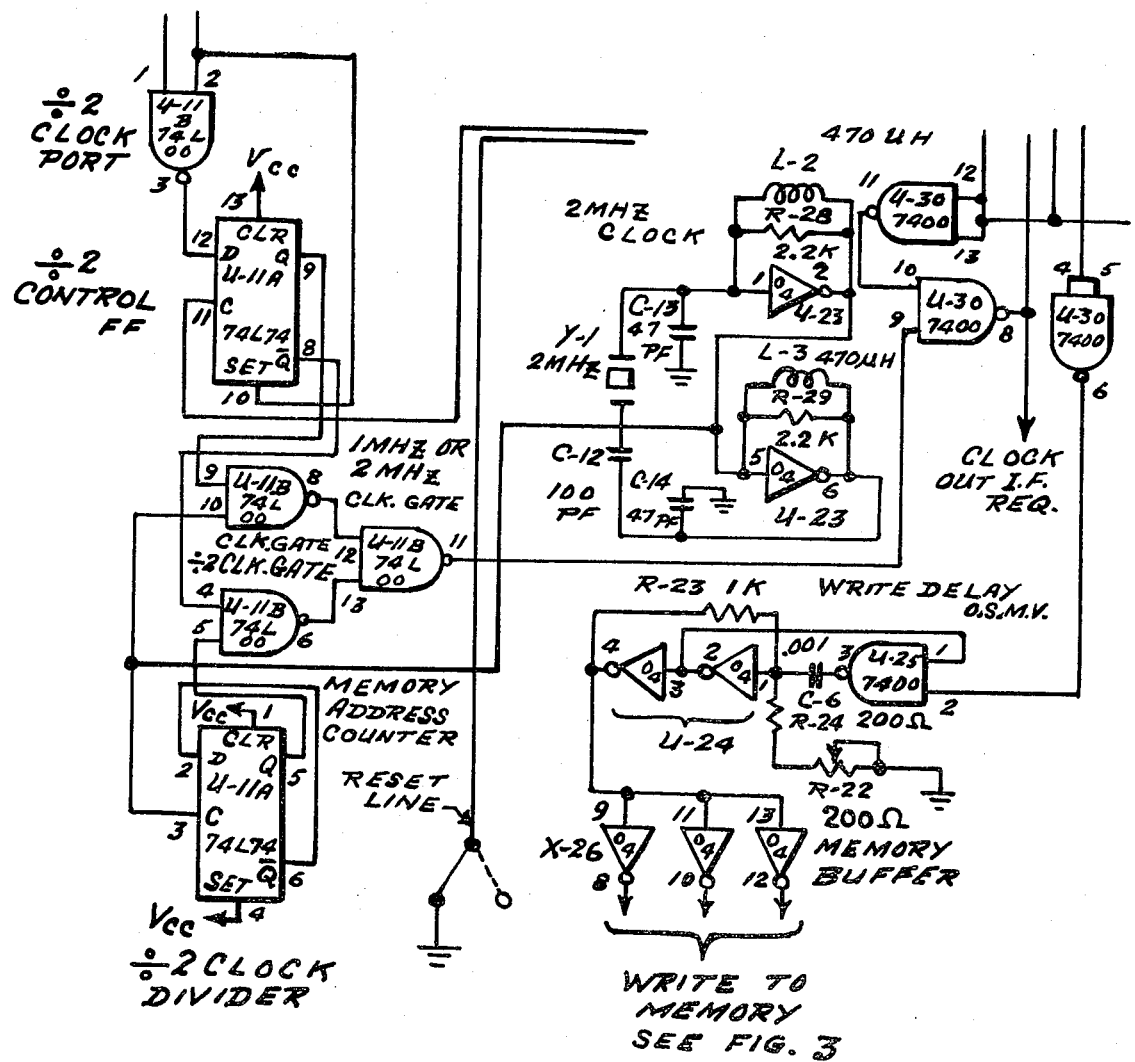
FIG. 2-D

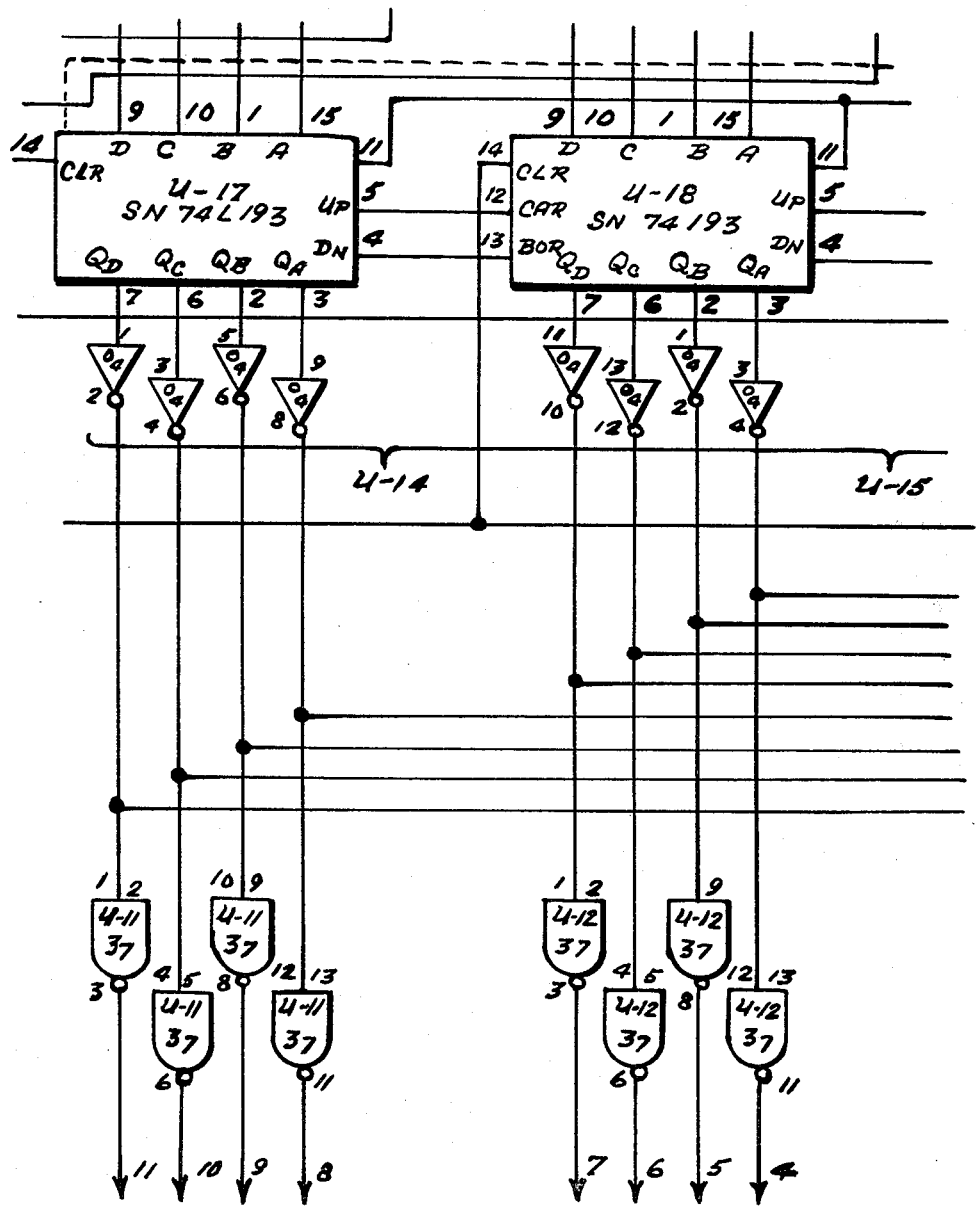
ADDRESS TO MEMORY
SEE FIG. 3
FIG. 2-E

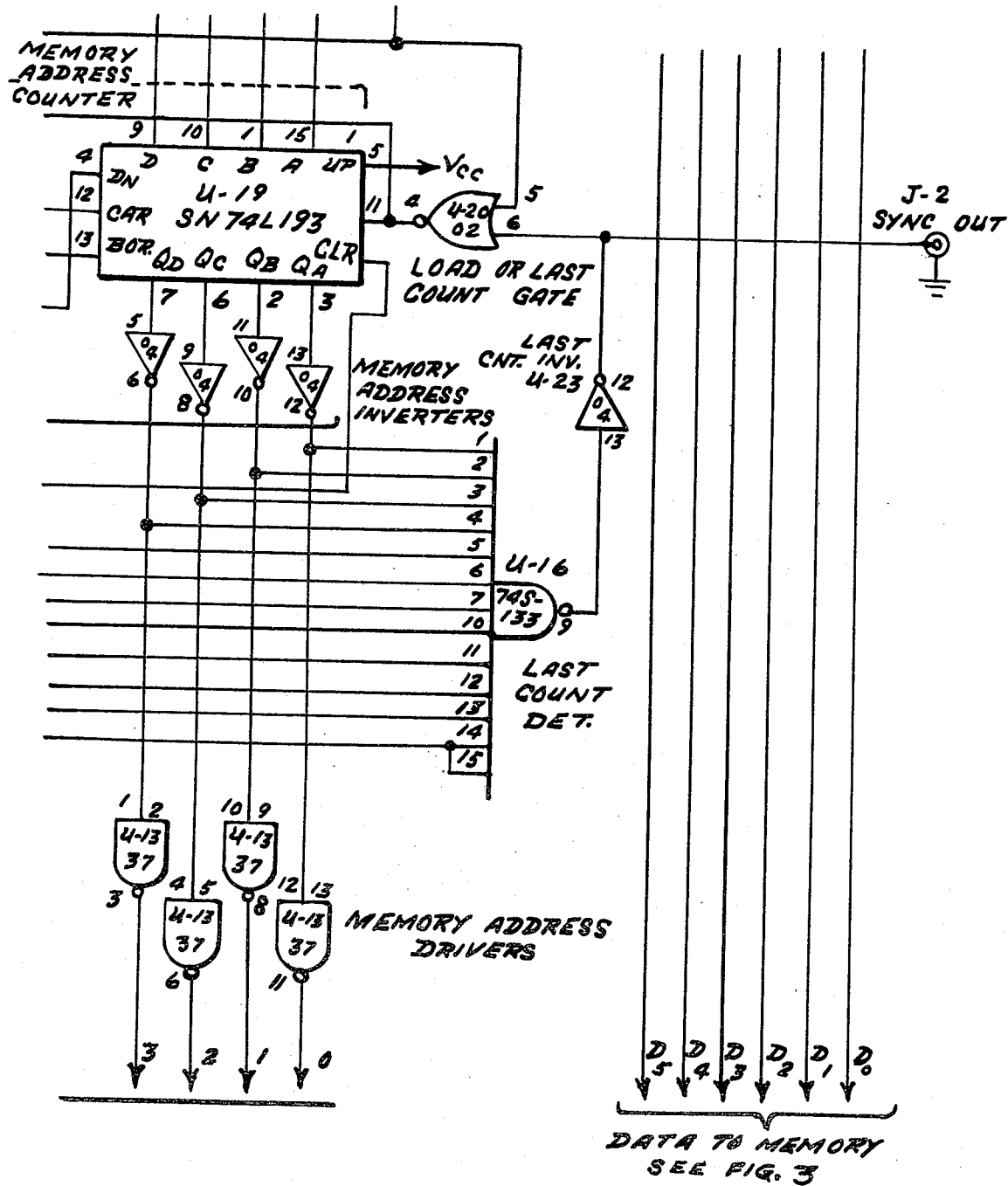
FIG. 2-F

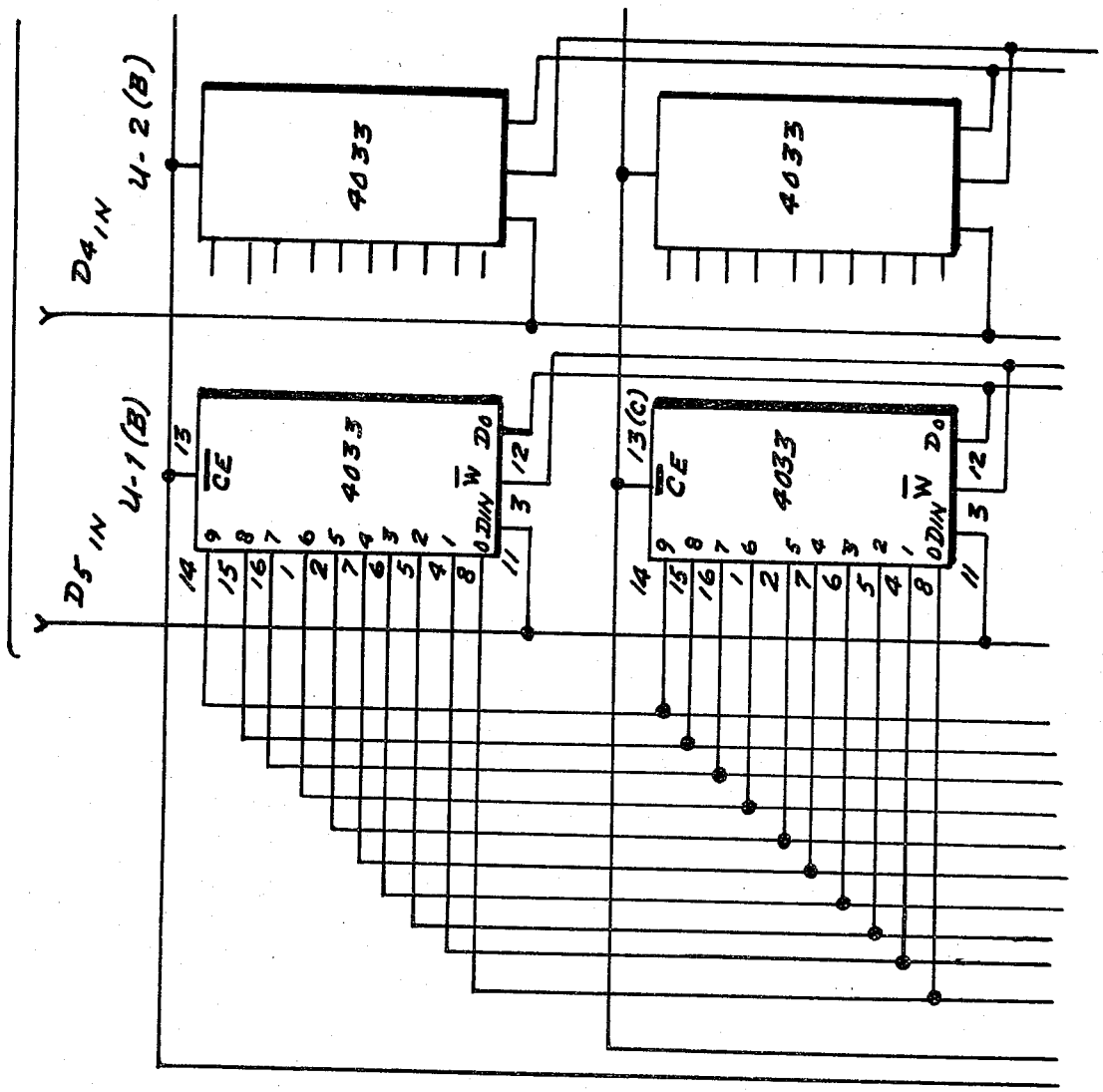
FIG.3-A

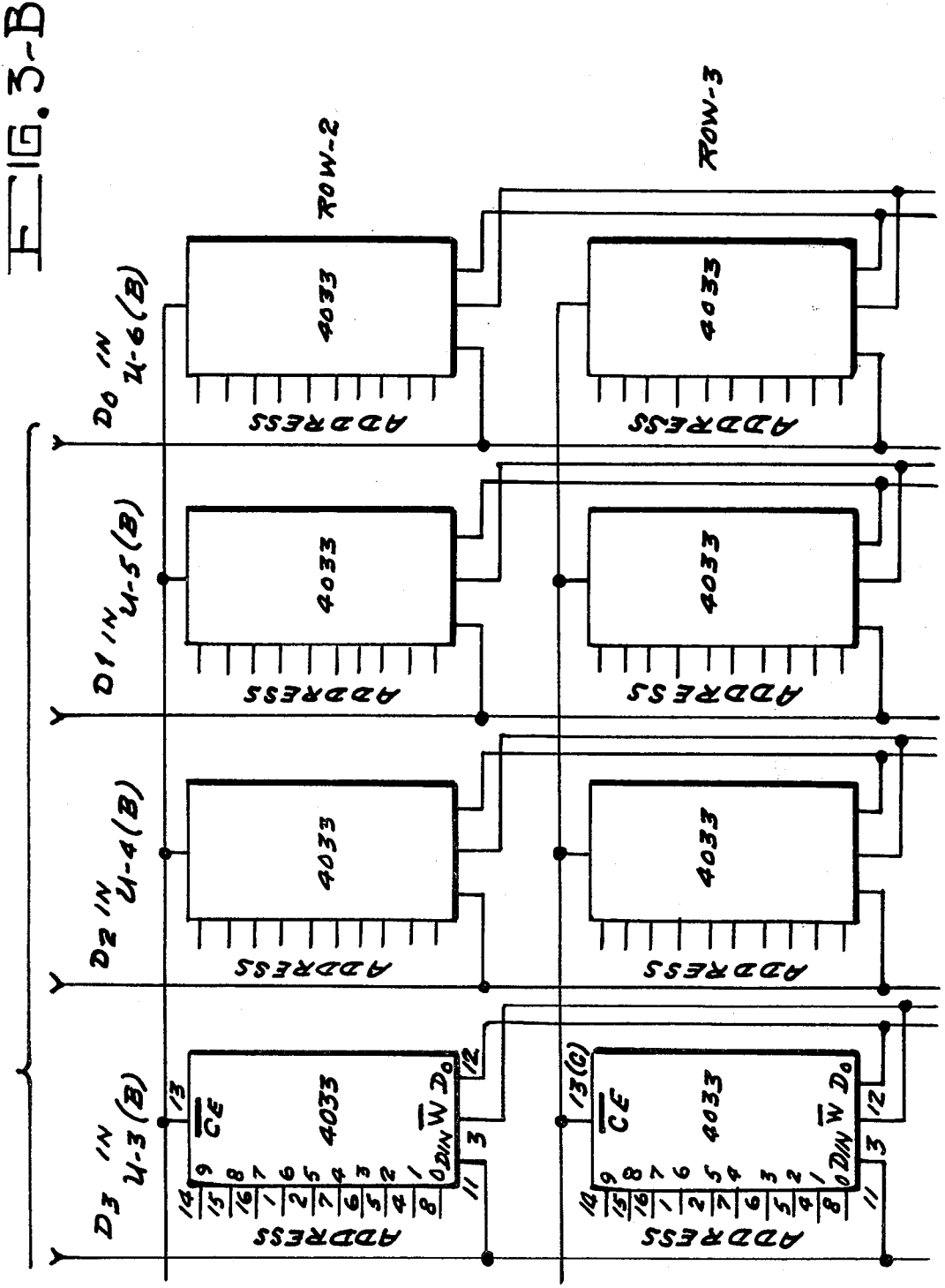

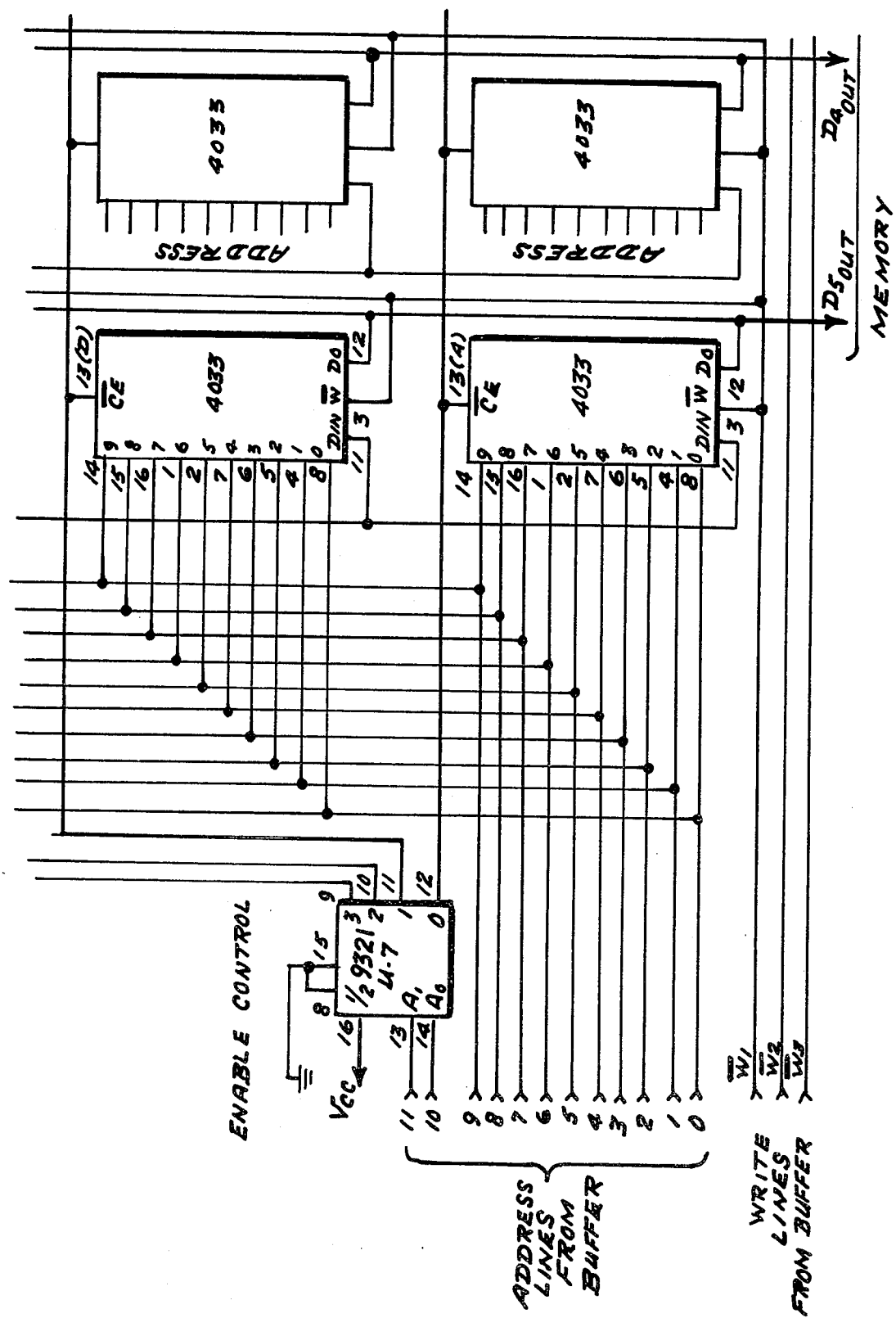
FIG.3-C

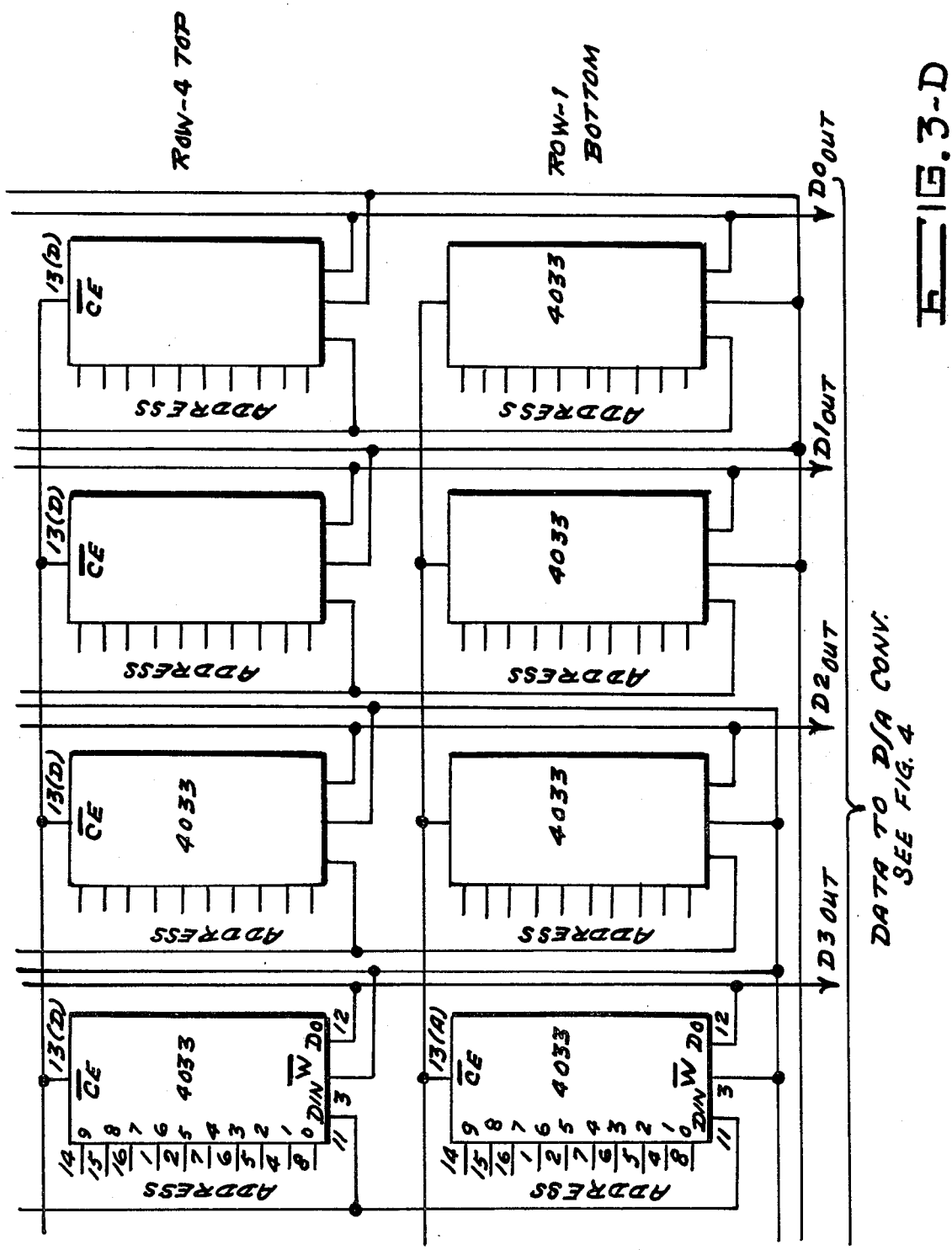
FIG. 3-D

FIG. 5-A

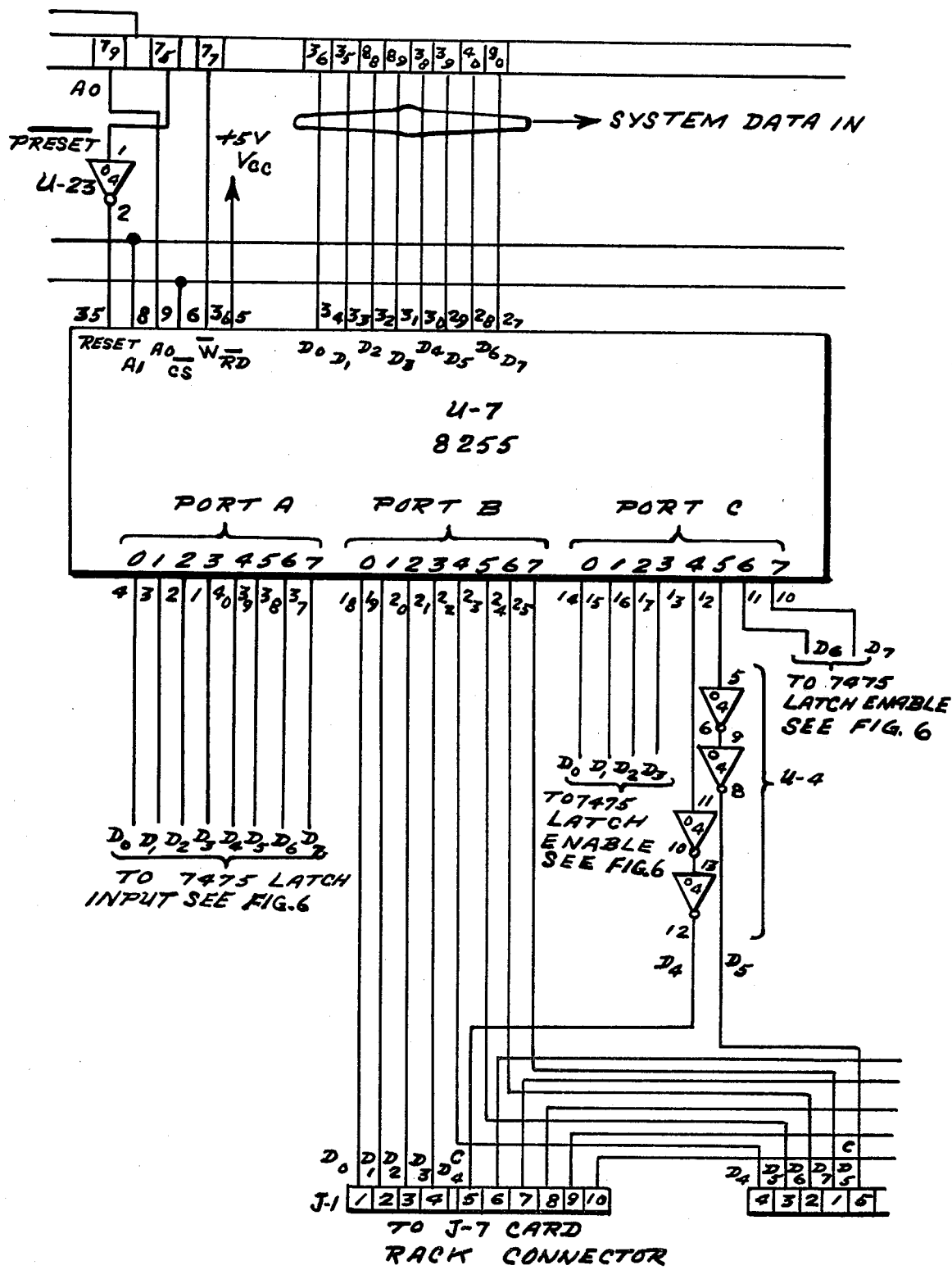
FIG. 5-B

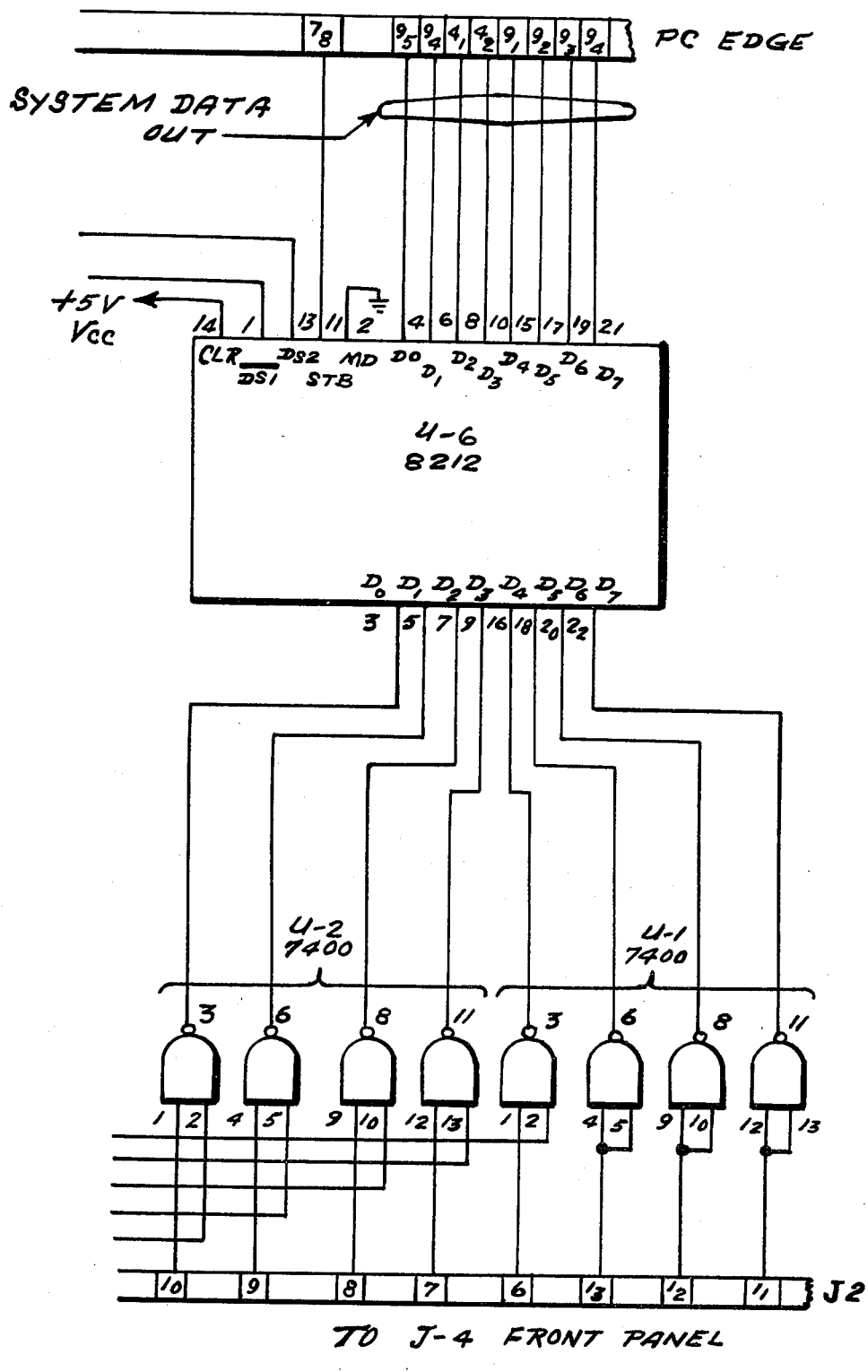
FIG. 5-C

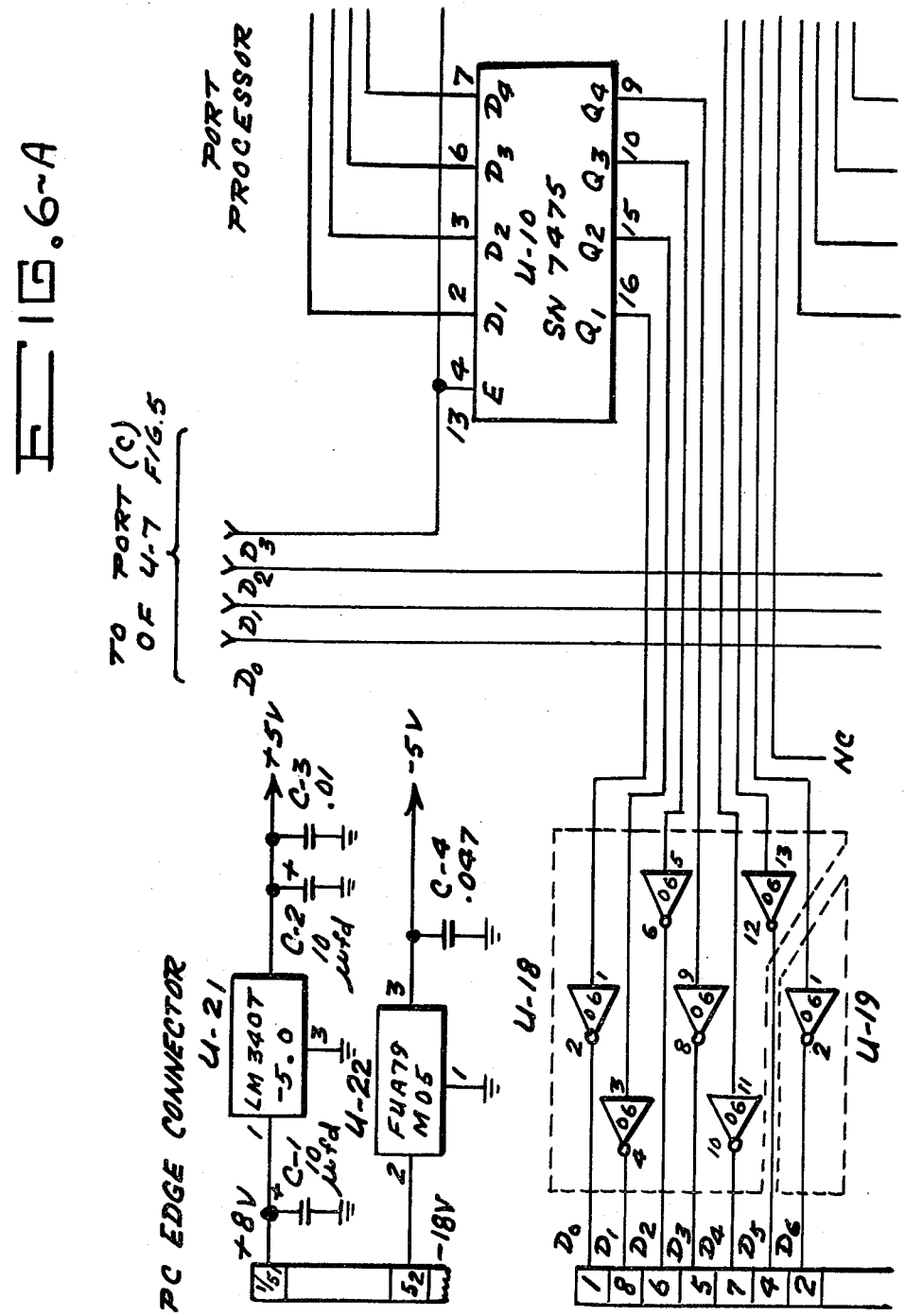
FIG.6-A

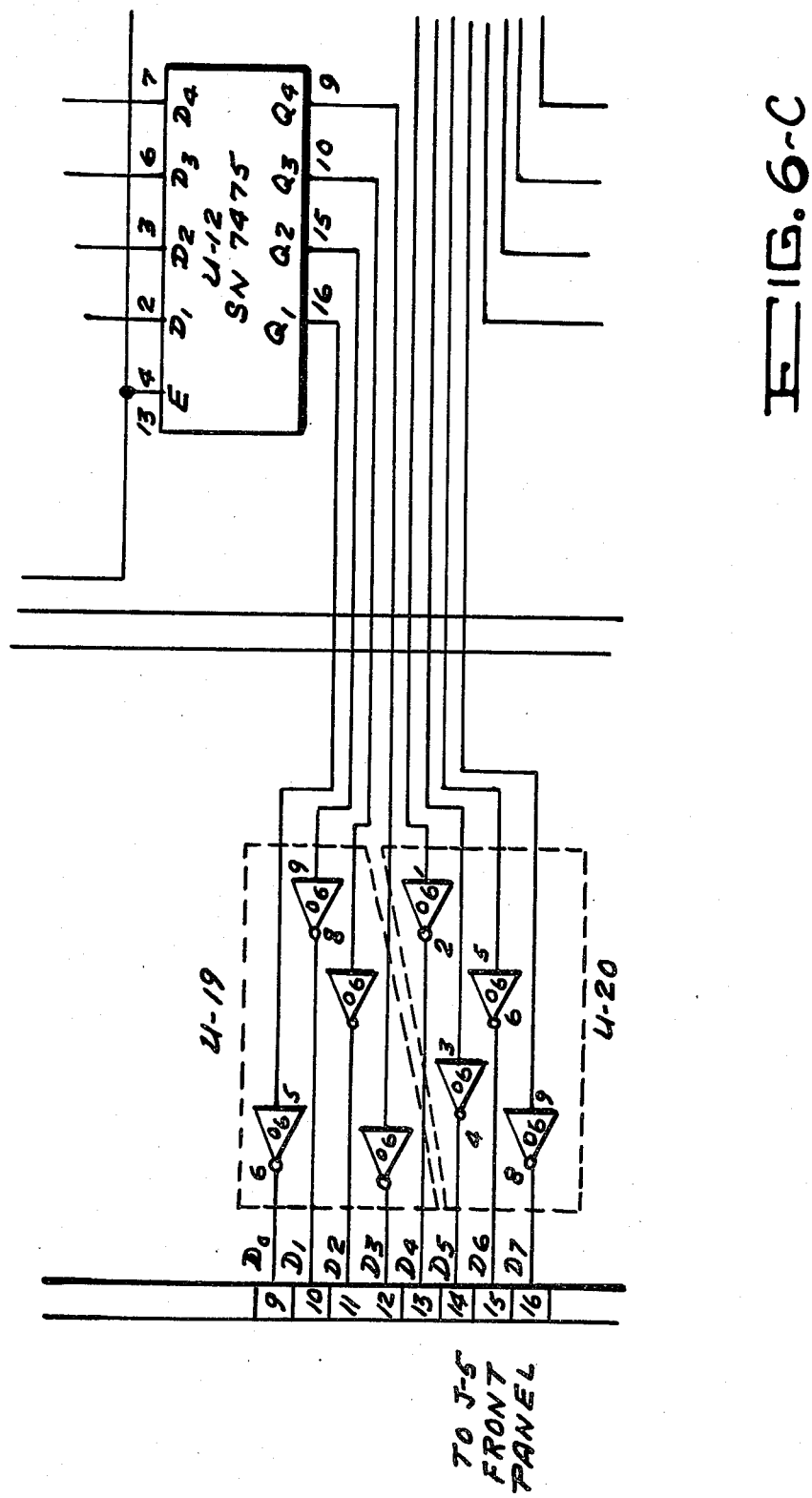
FIG.6-C

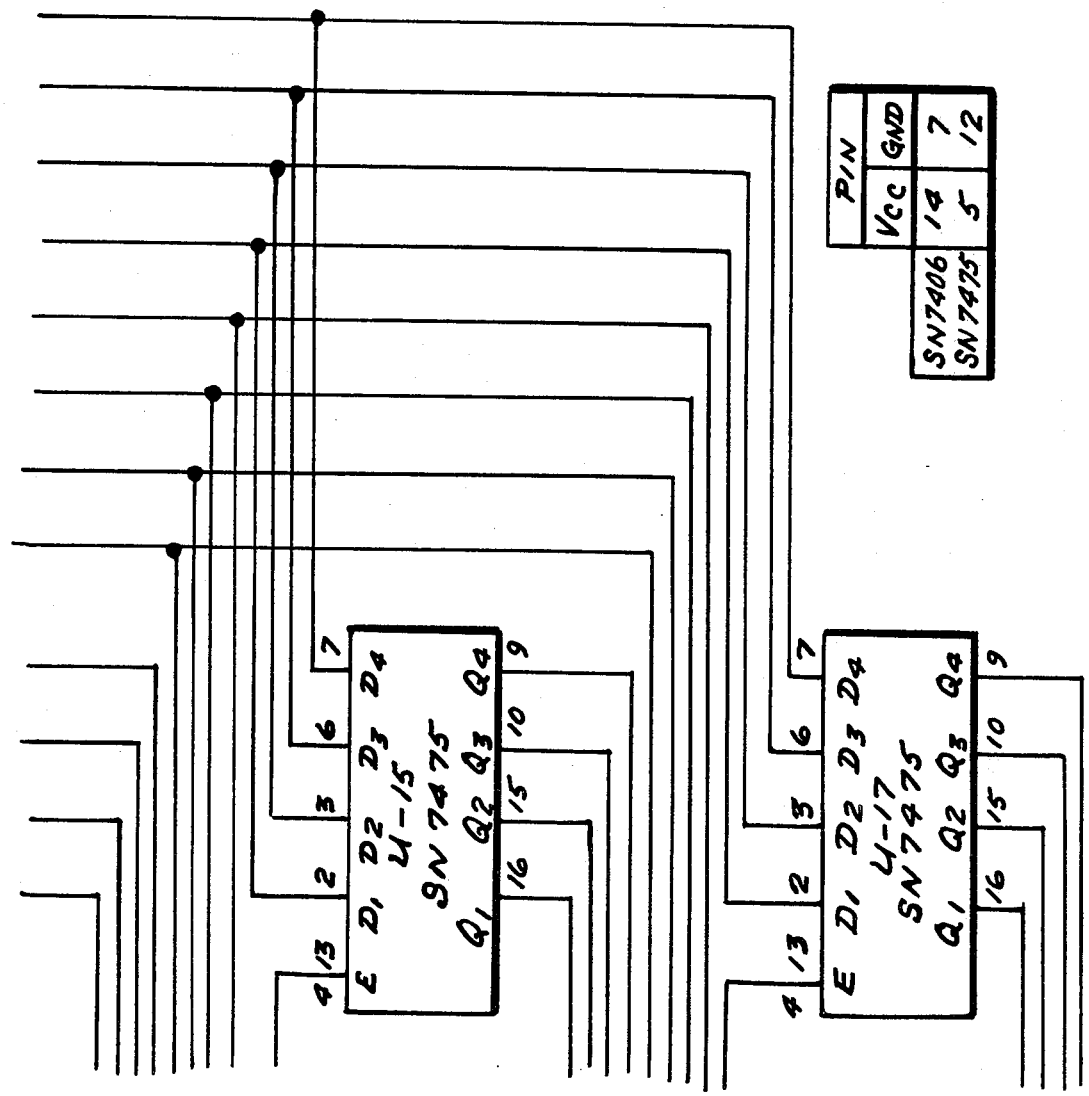
FIG.6-D

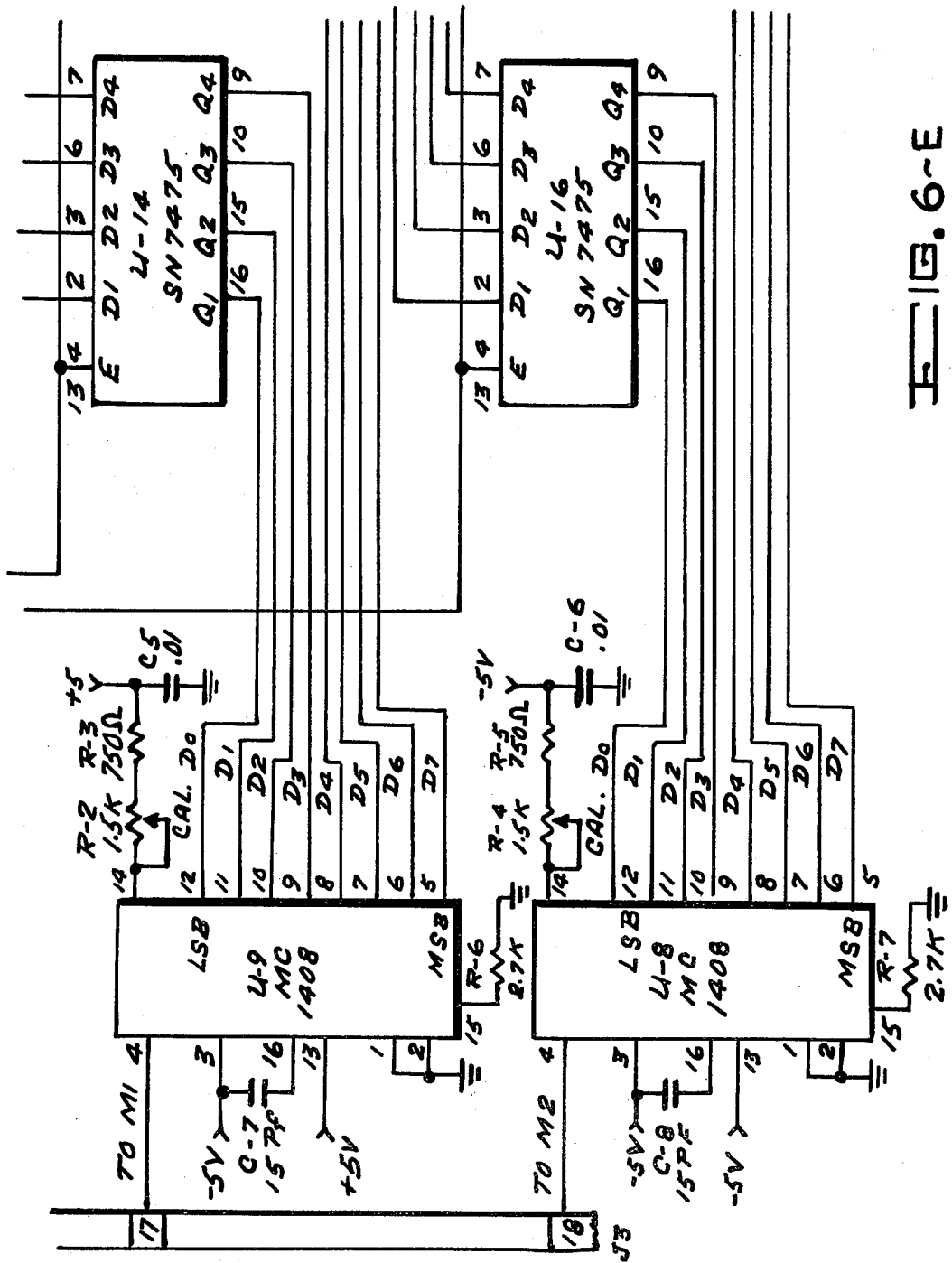
FIG.6-E

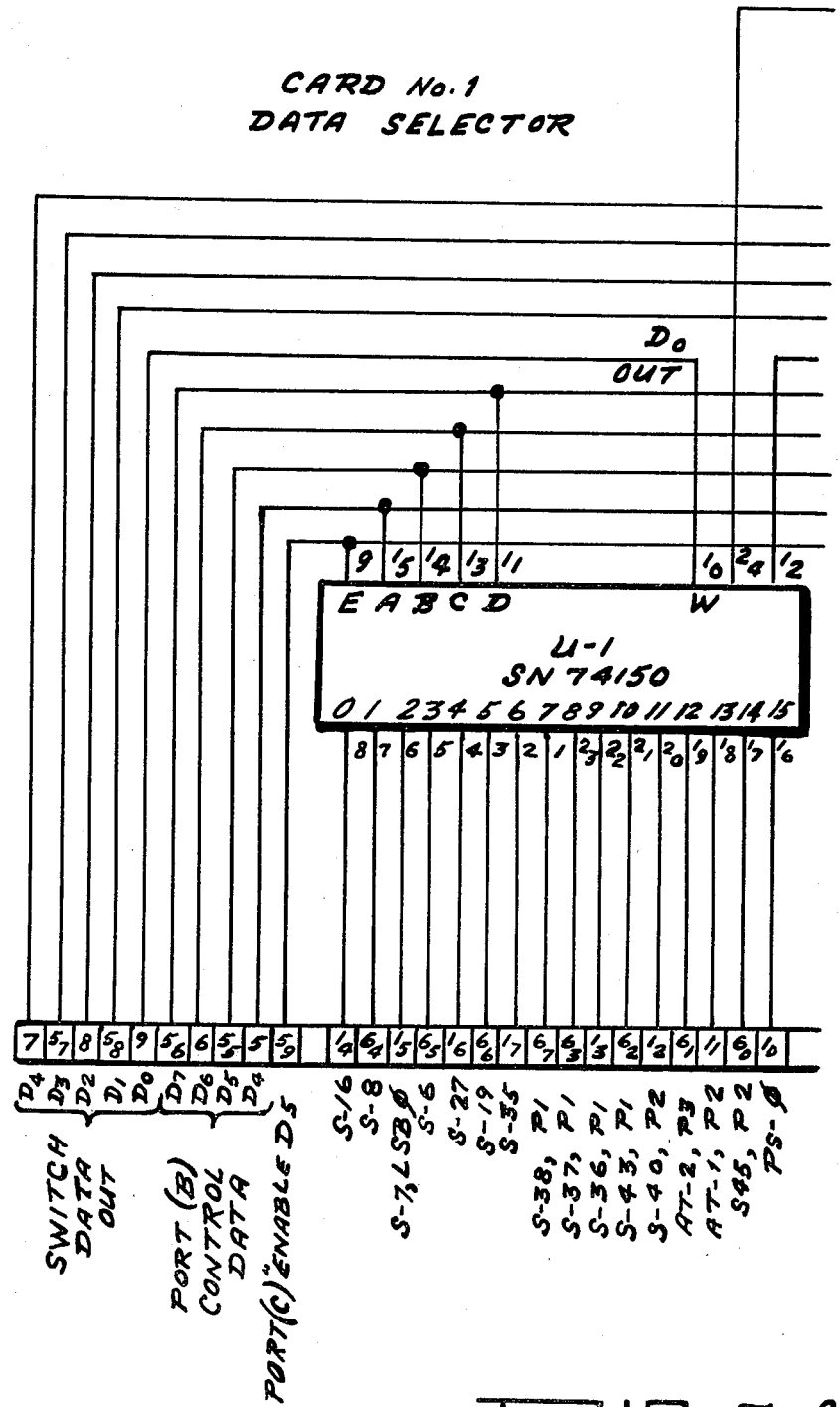
FIG. 7-A

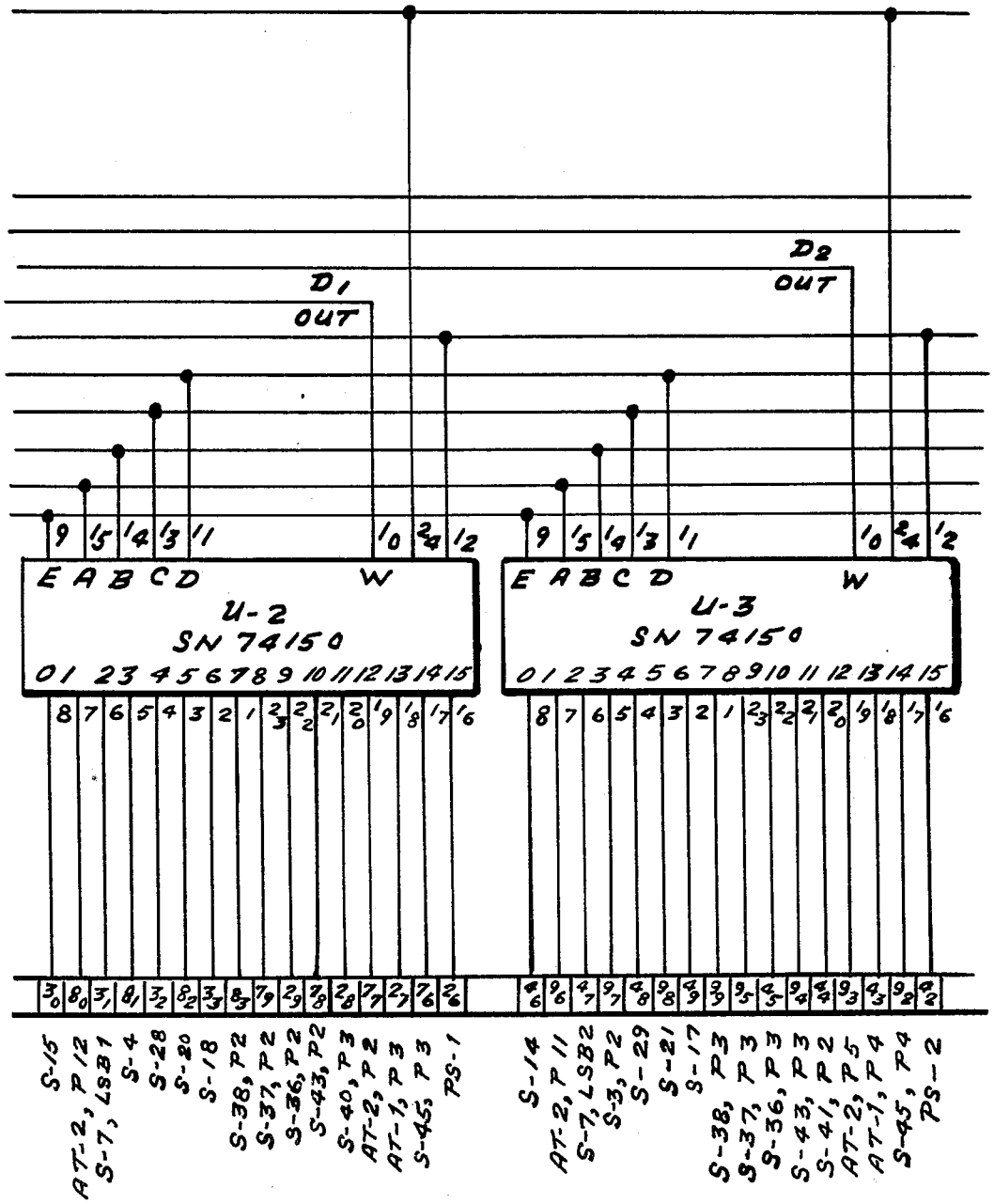
FIG. 7-B

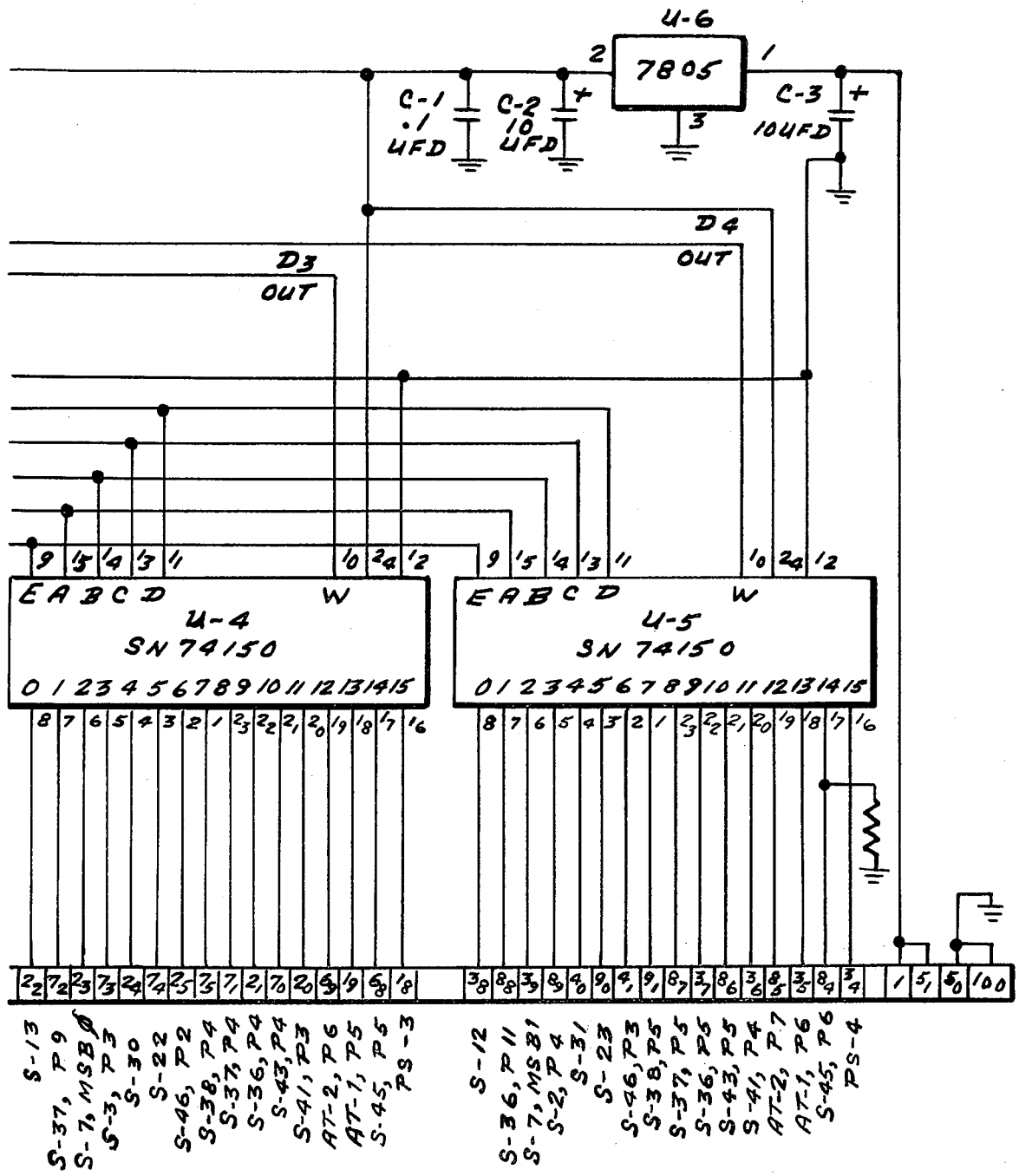
FIG.7-C

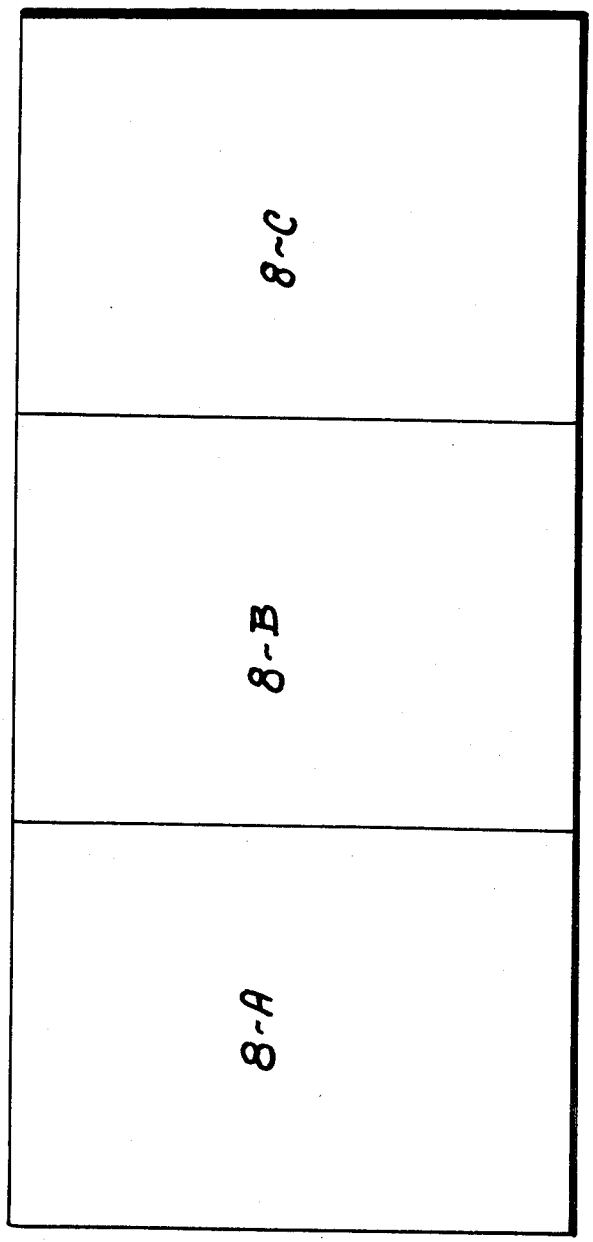

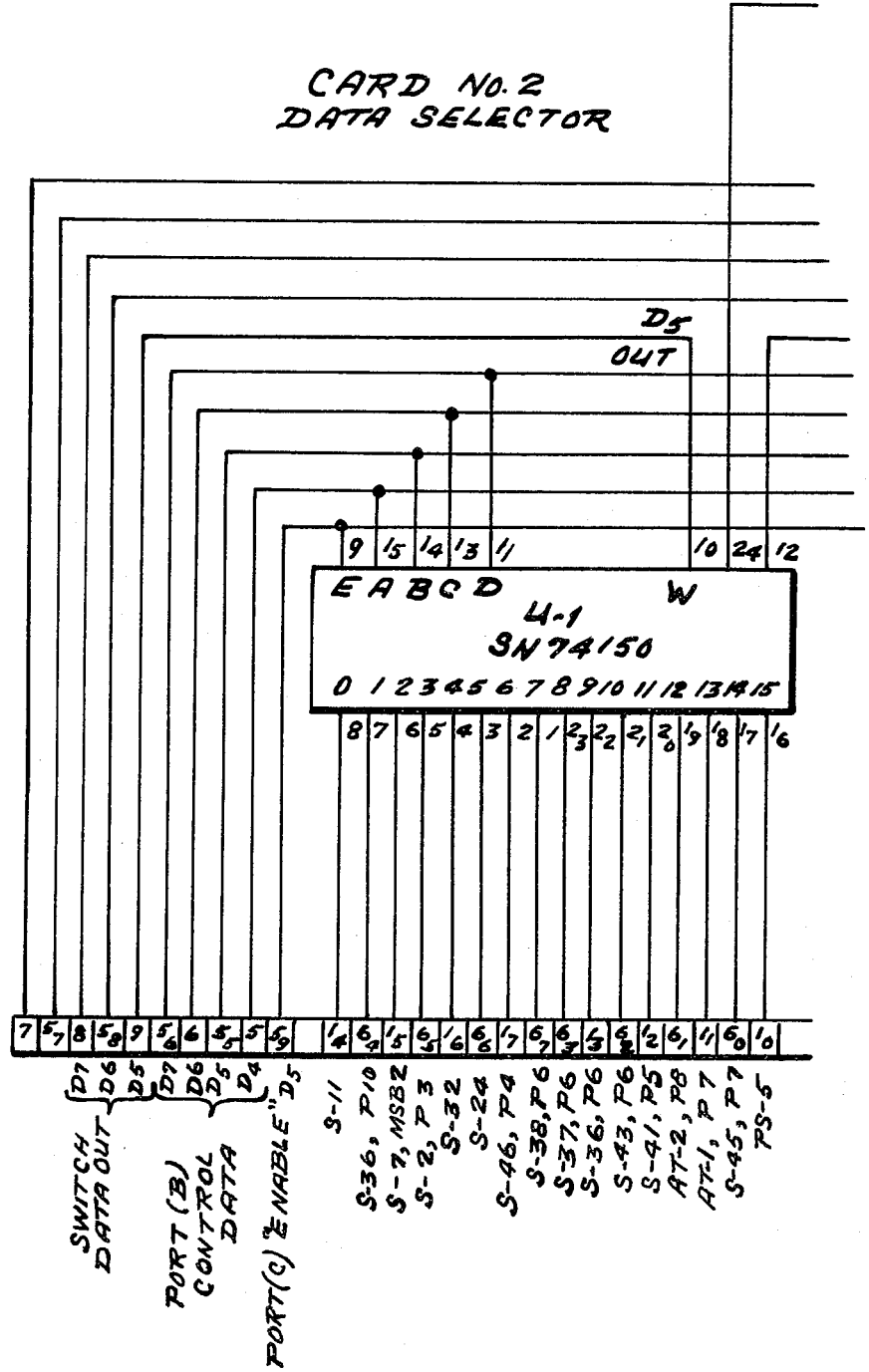
FIG. 8-A

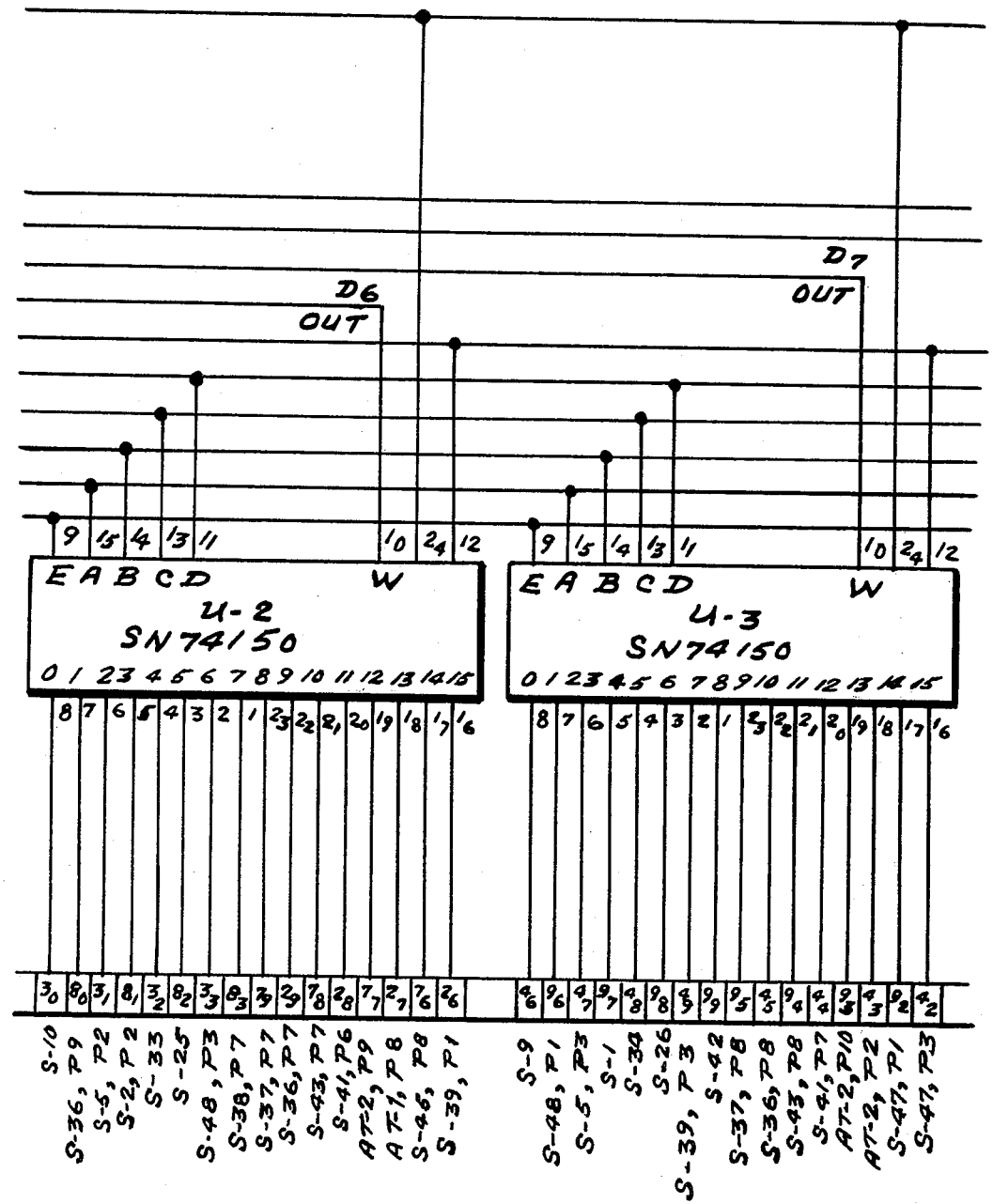
FIG. 8-B

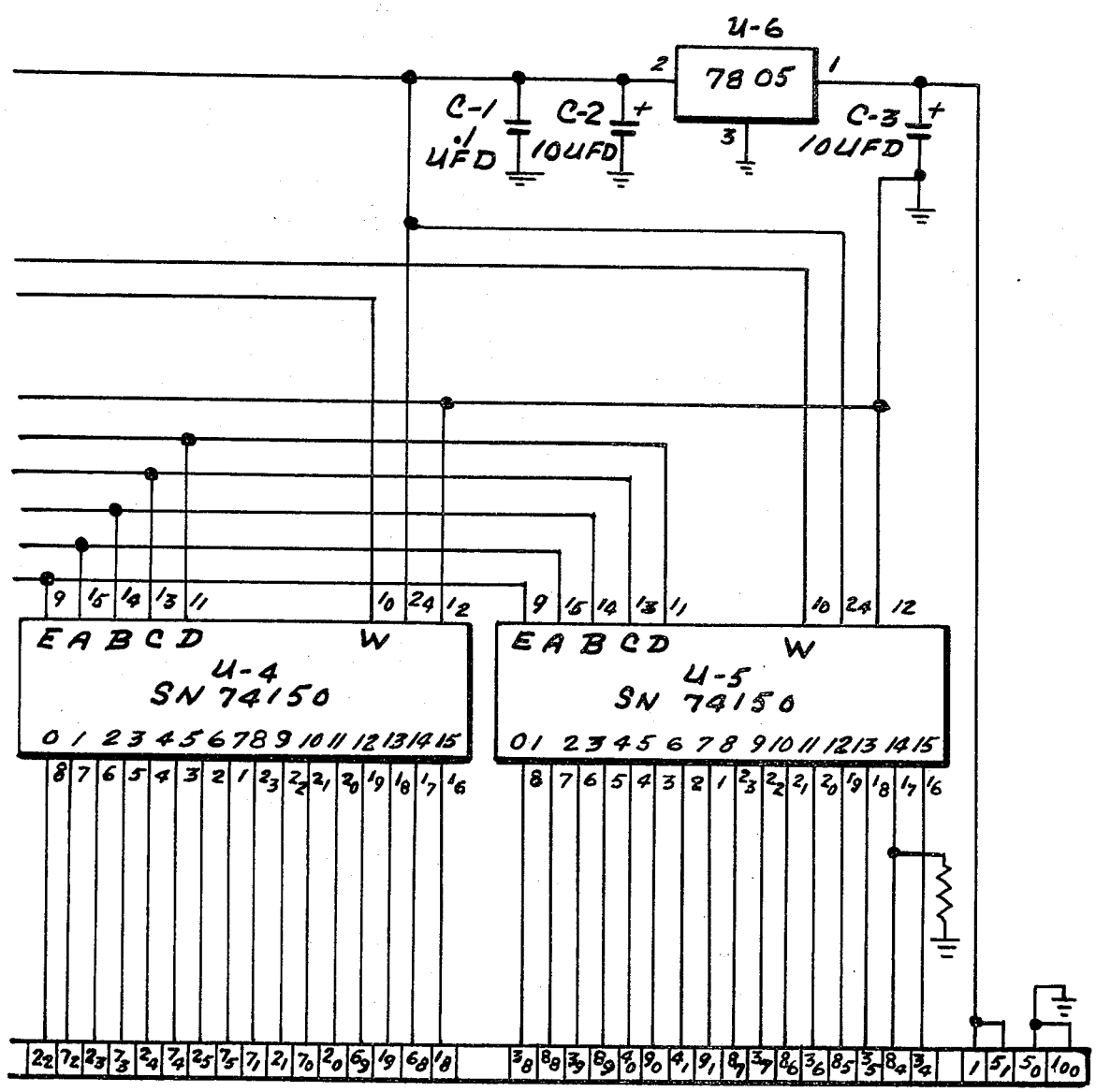
FIG. 8-C

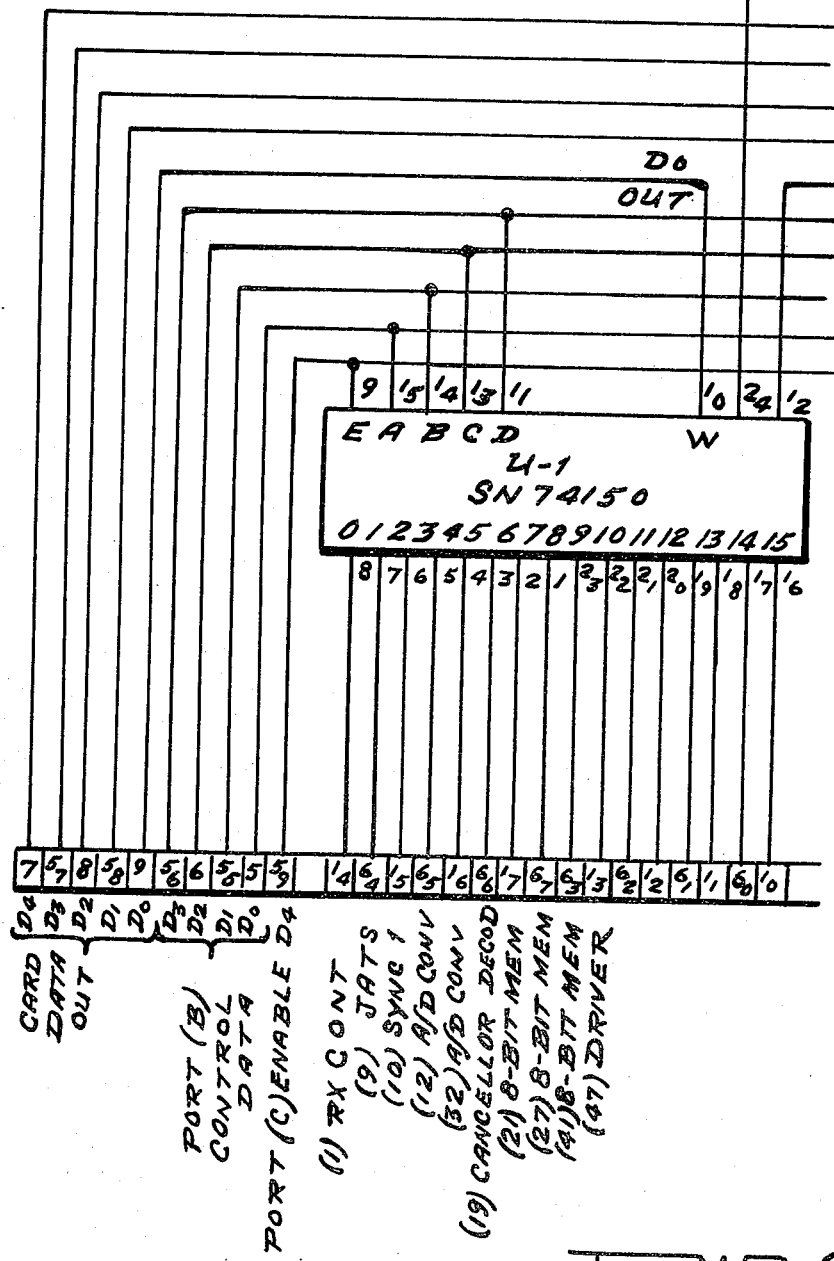
FIG. 9-A

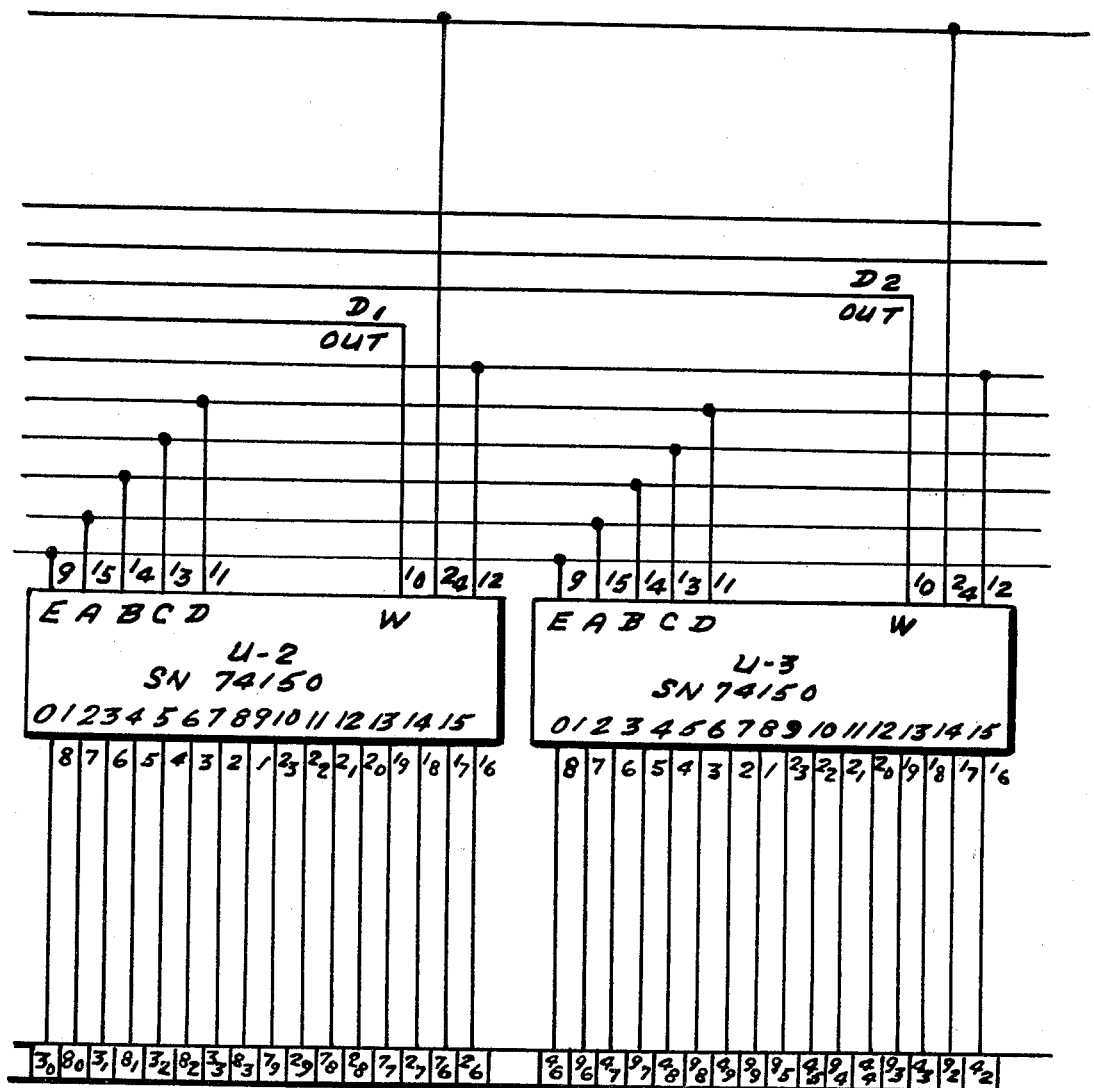
FIG. 9-B

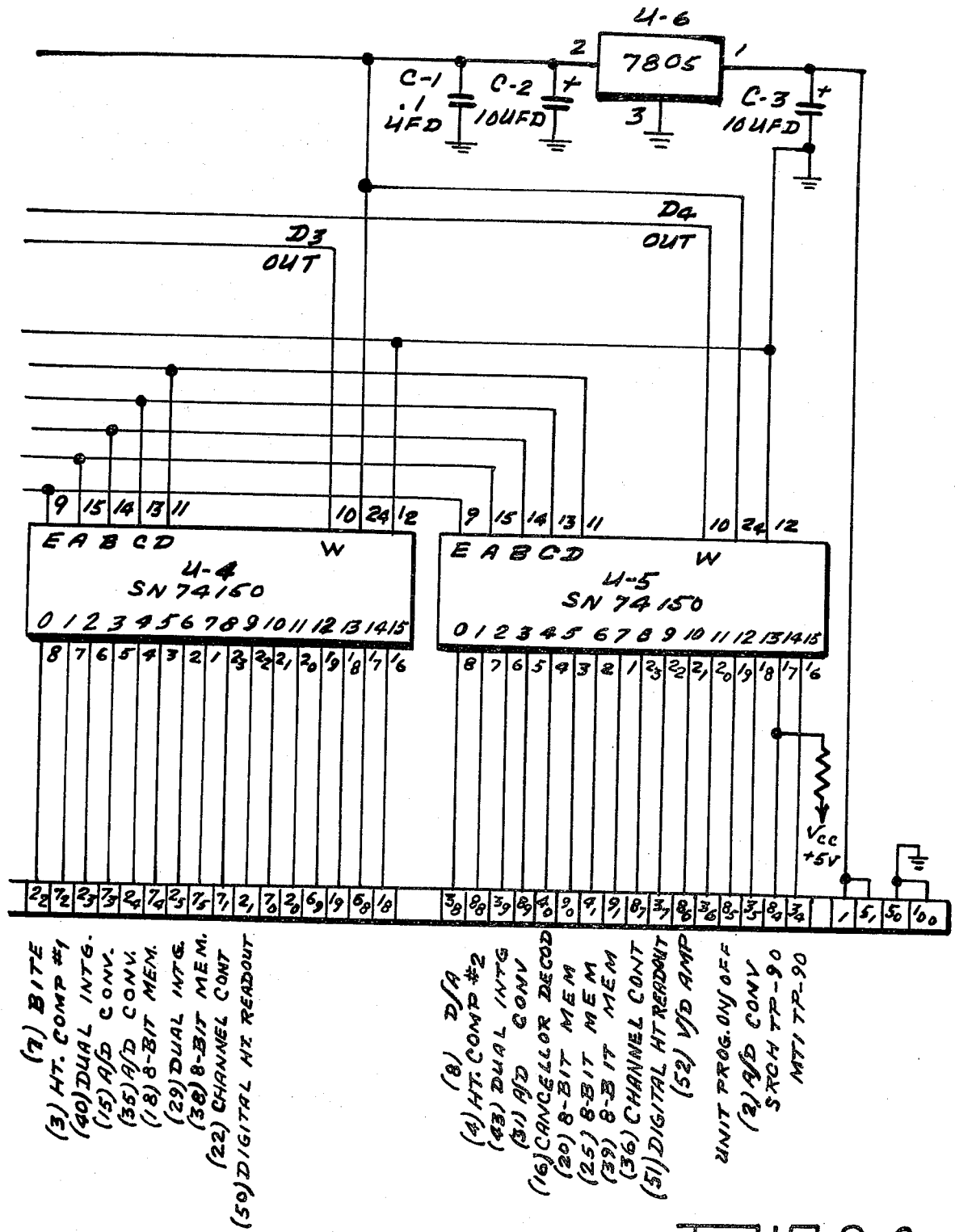
FIG.9-C

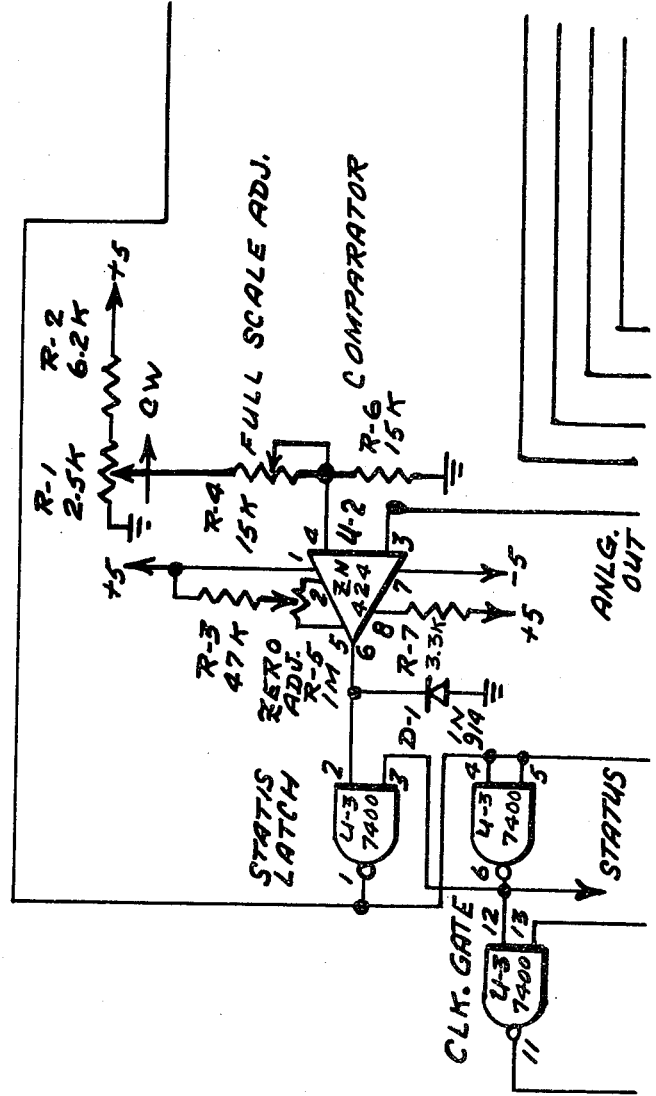
FIG.10-A

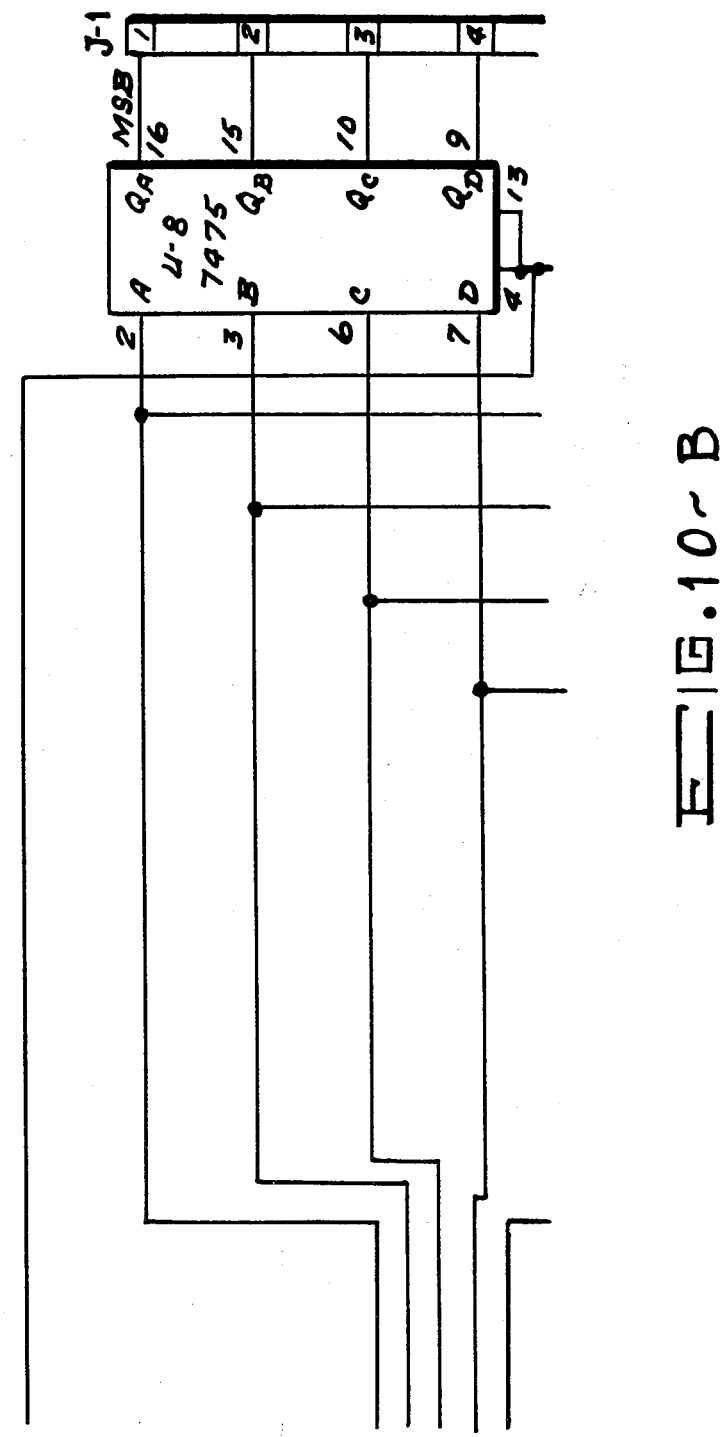

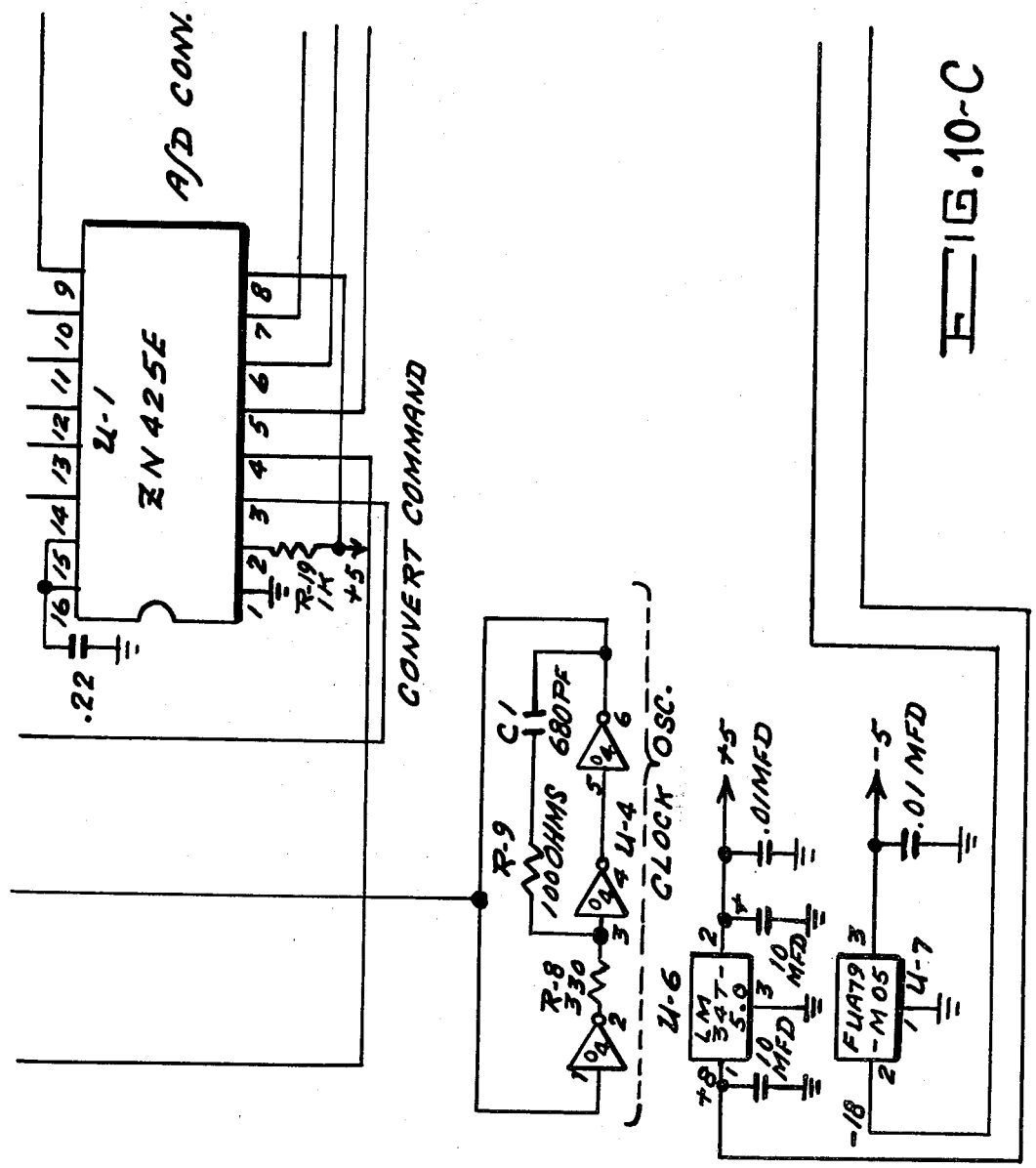
FIG.10-C

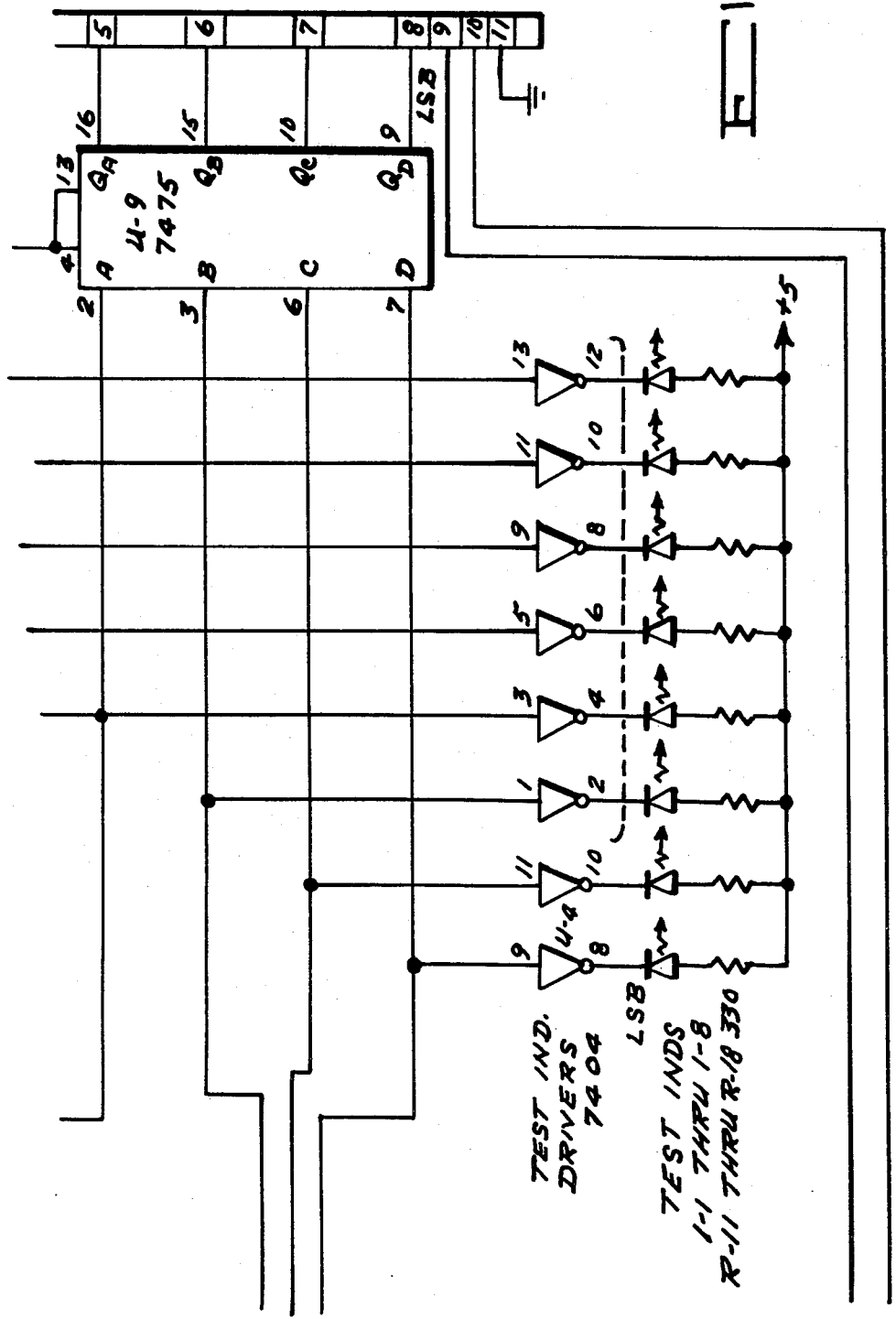

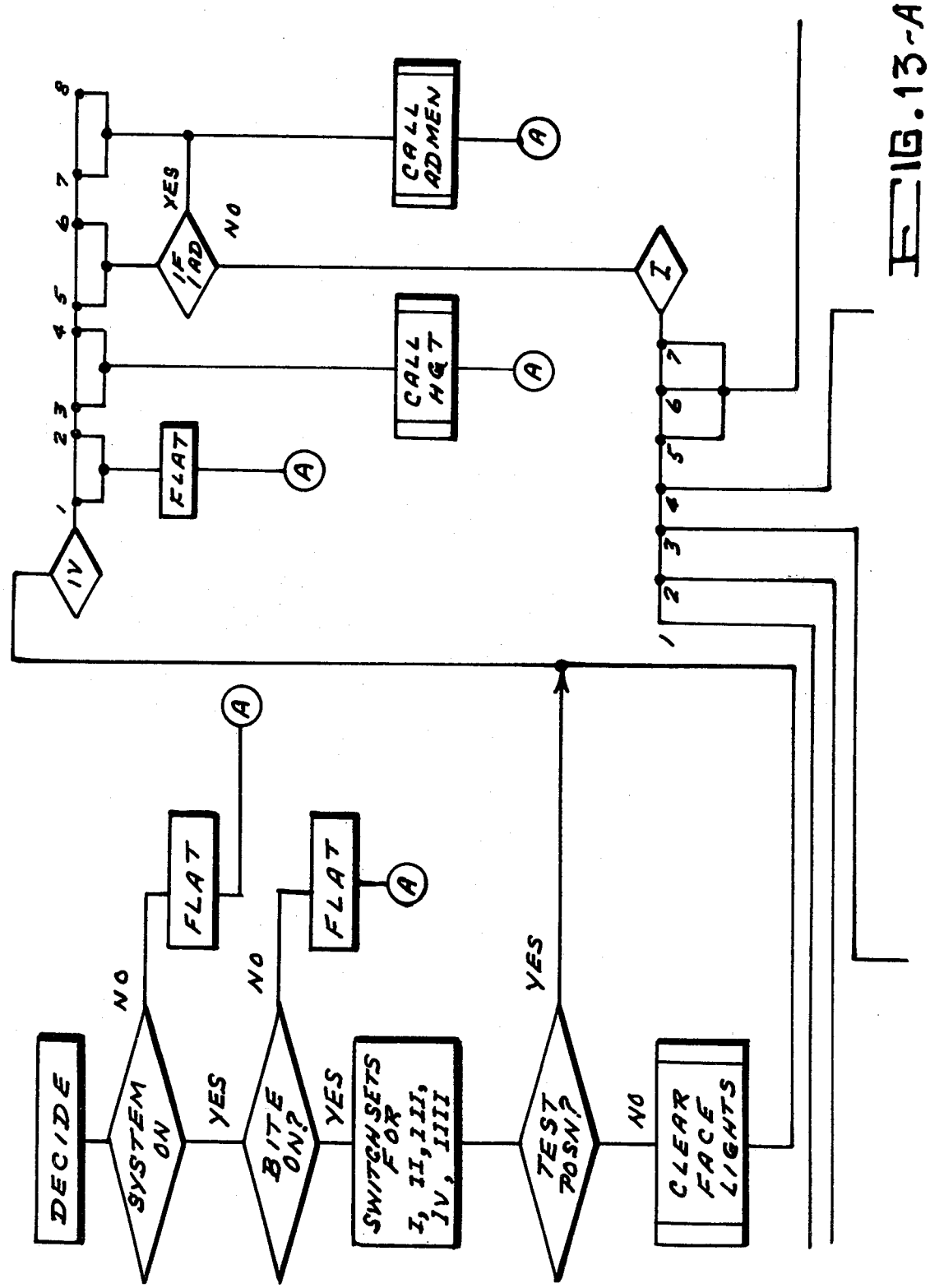
FIG.13-A

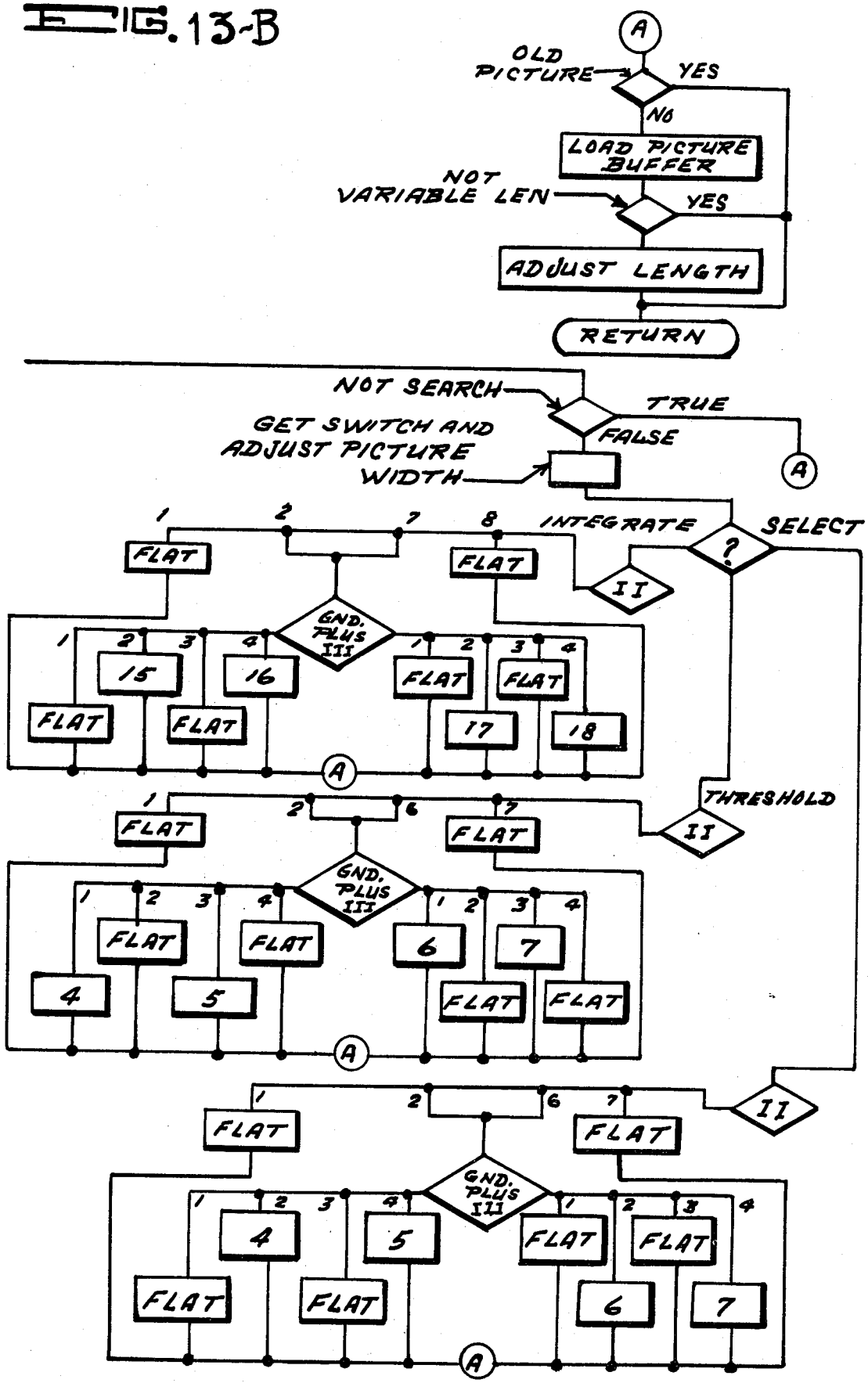

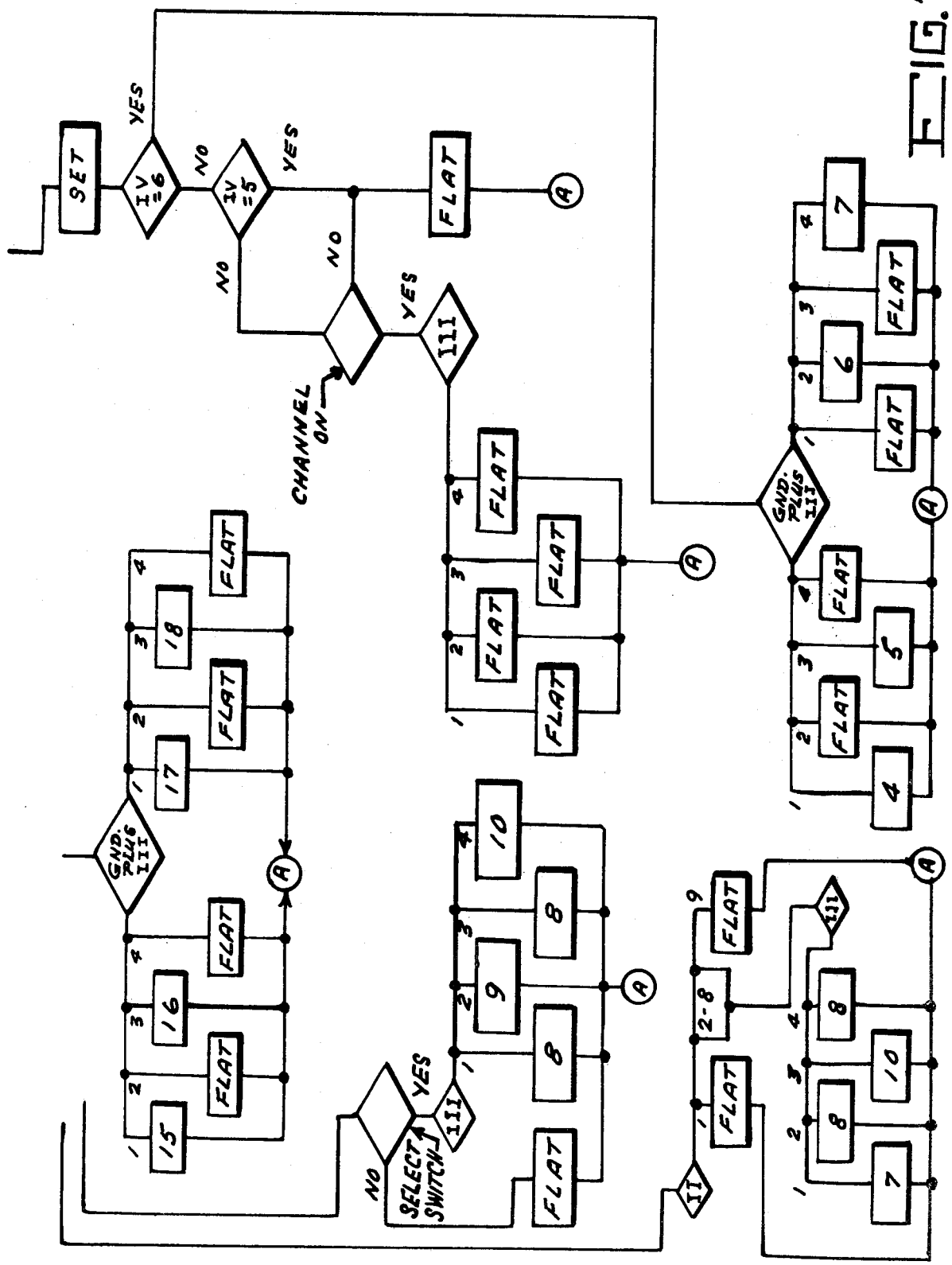

WAVEFORM SIMULATOR FOR AN ELECTRONIC SYSTEM MAINTENANCE TRAINER

STATEMENT OF GOVERNMENT INTEREST

The invention described herein may be manufactured and used by or for the Government for governmental purposes without the payment of any royalty thereon.

CROSS REFERENCE TO COPENDING U.S. PATENT APPLICATION

This patent application is a continuation-in-part of copending U.S. patent application Ser. No. 132,454 filed Mar. 21, 1980 by the same inventors, now abandoned.

BACKGROUND OF THE INVENTION

This invention relates to electronic system maintenance trainers and in particular to waveform generating means for electronically simulating the internal functions of the electronic system represented by the maintenance trainer.

Maintenance training comprehends the use of an operational electronic system, such as a radar, or a facsimile of the electronic system, into which an instructor introduces a fault or error (actually, in the case of an operational system, or, electronically in the case of a facsimile). The student then analyses the problem and makes the corrections (such as replacing a particular circuit card) that he thinks are necessary. The system displays, meters and oscilloscope indicate both the original problem and the results of the student's corrective actions.

Maintenance training traditionally has been considered an area that requires the actual equipment (end item). The reasons usually advanced are (a) the "realism" of the equipment, (b) user acceptance, and (c) the availability of such devices. Problems that have been encountered are (a) the end item is costly, (b) the end item is frequently more sophisticated than training needs dictate, and (c) the end item is not specifically designed to be "student proof" for training.

Simulation of end items is a method to reduce the costs of training equipment. The object is to design training equipment which will respond to a student the way the real equipment would insofar as trailing is concerned, but cost less initially and not have the overhead of maintenance and operation of the original equipment. As used herein, maintenance simulation is the application of simulation techniques to the area of maintenance training.

The nature of simulation is applicable to operational training because designers are required only to mimic the outward functions of the original equipment. Of importance today is maintenance simulation which requires mimicing the inner functions of the original equipment.

General purpose computers were used in maintenance simulators as early as the mid-50's. Unfortunately, the costs exceeded the benefits of maintenance simulation because of the dedicated computer requirement. Lately, the price of computers has dropped to the point where maintenance simulation is practical. In view of this, it is apparent that maintenance simulation as an alternative to the use of operational equipment can potentially save large amounts of money when applied to high cost systems, such as radar sets, weapon control systems and power systems. Although electronic maintenance simulation is desirable and has been for some time, lack of capability to cheaply produce circuit waveforms for electronics training (i.e., dynamically-controllable, highspeed complex outputs) has prevented maintenance simulation from achieving widespread use. Industrial system control concepts—using large scale integration (LSI) devices such as: eight bit microprocessors and cheap transistor memory devices—have changed the picture drastically in favor of maintenance simulation. However, effective electronic waveform simulation further requires the implementation of a programmable waveform generator to provide one and two megahertz data display ratio. Such a device is essential because no single commercially available microprocessor can perform such output rates continuously and direct a microcomputer system at the same time. There presently is the need therefore for a self-contained output device slaved to the host microcomputer which gives the microcomputer the ability to output unlimited iterations or arbitrary waveforms. The present invention is directed toward satisfying that need. It is also desirable that a programmable waveform generator of this type be readily adaptable to use with any electronic system maintenance trainer. The present invention also addresses this requirement and provides a device that is not limited in its application to any trainer or type of trainer.

SUMMARY OF THE INVENTION

The invention is a device for generating simulated waveforms for an electronic system maintenance trainer. It is modular in design making it suitable to use with any of a large variety of maintenance trainers, and in operation it is integrated with a training station that includes a mock-up of the electronic system's external meters, displays and test functions.

The simulated waveforms are generated by a programmable waveform generator that receives digital input control and picture data from a microcomputer and provides analog output signals to the training station meters, displays and test functions. An input/output circuit interfaces the microcomputer, the programmable waveform generator and the training station displays and test functions.

The programable waveform generator includes a random access memory, a data loading circuit comprised of data port latches, a function and address control circuit, memory address latches and a memory address counter, a 1 & 2 MHz clock, and a digital-/analog converter.

A special delay circuit permits loading of the memory circuit on the microcomputer's 4 MHz clock rate. The clock circuit permits run operation of the programmable waveform generator at 1 or 2 MHz rates. In the run mode of operation the programmable waveform generator can function independently of the microcomputer.

The input-output circuit functions as a special purpose memory mapped input/output controller and comprises data select circuit cards that are integrally interconnectable with the training station test functions, a bi-directional, tri-state integrated circuit data out port, and a mono-directional-tri-state integrated circuit in port. The data in and the data out ports are programmable and control data flow through the system.

It is a principal object of the invention to provide a new and improved device for generating simulated waveforms for an electronic system maintenance trainer.

It is another object of the invention to provide a device for generating simulated waveforms for an electronic system maintenance trainer that is modular in design and adaptable to use with a large variety of electronic system maintenance trainers.

It is another object of the invention to provide means for effecting genuine waveform generation and display in a real-time electronic maintenance trainer.

It is another object of the invention to provide a maintenance trainer for electronic systems having positive input/output control through line variable read/write modules.

It is another object of the invention to provide, for use in a maintenance trainer, a microcomputer driven programmable waveform generator and input/output circuit that in combination are capable of simulating the internal functions of an electronic system.

It is another object of the invention to provide for use in an electronic system maintenance trainer a programmable waveform generator capable of generating simulated analog waveforms in response to digital control and picture data from a microcomputer.

It is another object of the invention to provide for use in an electronic system maintenance trainer an input/output circuit that functions as a special purpose memory mapped input/output controller.

It is another object of the invention to provide in an electronic system maintenance trainer having a microcomputer driven programmable waveform generator, a timing circuit that permits programmable waveform generator data loading operations at a 4 MHz rate and run mode operation at 1 and 2 MHz rates.

These together with other objects, features and advantages of the invention will become more readily apparent from the following detailed description when taken in conjunction with the illustrative embodiment in the accompanying drawings.

DESCRIPTION OF THE DRAWINGS

FIG. 2 being comprised of FIGS. 2A-2F is a schematic diagram of the control circuits of the programmable waveshape generator of the invention;

FIG. 8 being comprised of FIGS. 8A-8C illustrates data select circuit card No. 2 of the input/output circuit of the invention;

DETAILED DESCRIPTION OF THE PREFERRED EMBODIMENT

The waveform generating means comprehended by the invention is capable of simulating the internal functions of any electronic system and it is by design adaptable to use with any suitable electronic maintenance trainer. The following detailed description of the invention, by way of example, relates to a particular application; that of a maintenance trainer for the built-in test equipment (BITE) of the AN/TPS-43-E radar. Documentation specifications of the AN/TPS-43E BITE which the computer driven trainer must mimic are available from Westinghouse Corporation. It is to be understood however, that the invention has universal applicability and the particularity with which the ensuing circuits and software are developed and described relative to the AN/TPS-43E radar is not to be interpreted as limiting the invention's scope or application to that specific example.

The hereinafter described maintenance trainer incorporating the simulator of the invention is intended to be used to provide a skill level that constitutes an apprentice level, or a person capable of working under the direction of another more skilled person and not expected to do work on his own.

Circuit card replacement is the highest level of maintenance required of the student and should be the student's capability at the end of the course. The student learns to identify any given circuit which is not working within the radar set covered by the BITE. The student is then required to identify, remove and replace any particular circuit card within a satisfactory time period and with a minimum of mistakes. Methods of training used during instruction are laboratory performance and class demonstration. The student is placed in a BITE maintenance situation with a predetermined dysfunction within the equipment. The student determinines what the dysfunction is using standardized Technical Orders. Satisfactory identification is shown by removing and replacing the dysfunctional circuit card.

General Description of Major Hardware Elements and Software Requirements

Figure 1:
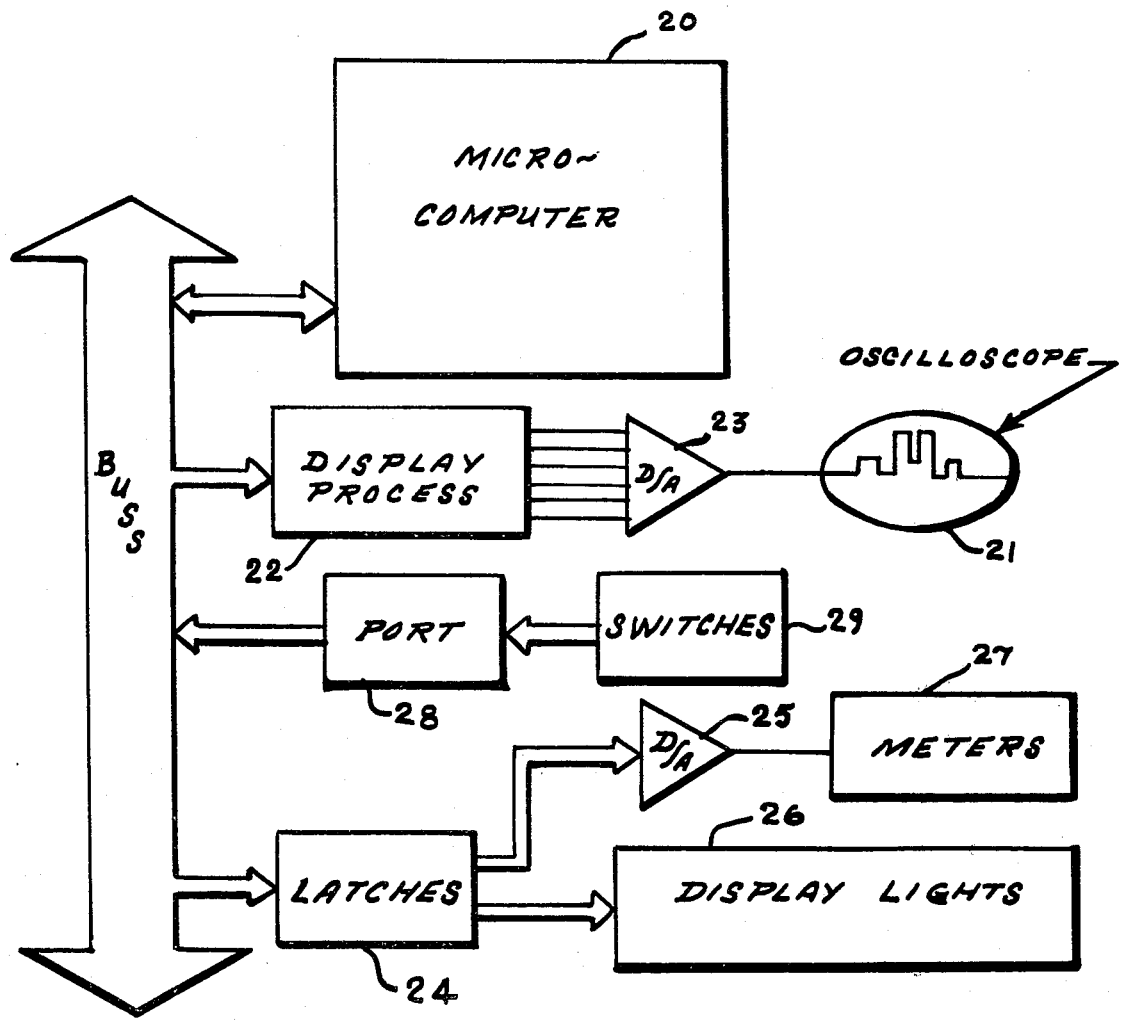
FIG. 1 is a block diagram illustrating a hardware overview of the invention.

The hardware of the invention is organized into four major areas as illustrated by FIG. 1. These areas consist of: microcomputer 20; the associated test equipment comprising oscilloscope 21 and meters; the output circuitry comprising latches 24, digital/analog converters 23, 25, meters 27, display lights 26 and programmable waveform generator 22, and, the input circuitry comprising port 28 and switches 29.

The first major area is the microcomputer 20. The computer's power supply should have the ability to power all the associated external digital equipment as well as its own set of internal digital equipment. The operational clock of the computer should be switch selectable at 2 or 4 MHz to accept slower memories. Faceplate access and rack mountable design are desired to simplify cabinet engineering design. The computer may be one of several commercially available and should be capable of directing all the functions necessary within the trainer to achieve the general performance specifications previously outlined.

The second major area is the associated test equipment. The associated test equipment consists of a Tektronix Triservice 100 Mhz Dual-Trace Oscilloscope and two faceplate meters. The oscilloscope is the actual radar maintenance oscilloscope. Considerable training results by using this instrument; therefore, the maintenance simulator emphasizes using the actual test equipment where economically feasible.

The third group of equipment is the output circuitry which creates the necessary displays on the oscilloscope and faceplate devices. The output devices are designed in accordance with principles of the invention and are hereinafter described in detail.

The devices that output to the faceplate comprise simple addressable latching devices enabled from the input device, described below, and provide controlled value inputs to two digital-to-analog (D/A) converter input meters and 15 indicator lights.

The fourth major group of equipment needed must be able to input those things that the student is investigating via the BITE simulator switches. For the computer to be able to recognize these actions, it is essential to have an input-output (I/O) device utilizing the trainer's faceplate and card cages as if they were the computer's key-board and display. Instead of using a terminal, the functional training equipment concept is implemented by designing the I/O device to sequencially scan the switches, sensing their states. Devices, to input data inlcude various kinds of switches and an A/D converter. There are over 105 inputs available between the faceplate and the card cages. This gives the possibility of 105! combinations and permutations.

The training cabinet or station contains the rest of the equipment. The faceplate is a duplication of the faceplate on the actual radar set.

The Cabinet Electronics are the electronics to which the computer I/O hardware is attached. These include various kinds of lights, relays and connective wiring. These electronics are also able to read a potentiometer's analog data and convert it to digital data compatable to the computer. The faceplate in the cabinet is used as a chassis to hold an A/D converter.

The software required by the invention falls into two classes—that which is commercially available and that which is developed specifically for the invention. By selecting a fairly comprehensive microcomputer system, software available should inlude an ANSI Standards FORTRAN compiler, a Relocatable Assembler, an Extended Basic, a Link Loader, an Editor, a Disk Operating System, a Disk Loaded Monitor (with a disassembler and in-line assembler), and a Power-on Monitor in read only memory (ROM). The latter will allow the user to be able to start a user program witout intervention on a terminal. The developed software consists of the program BITE and some hardware and software maintenance programs.

Of all the software needed for the maintenance trainer, the most useful is a high level compiler. FORTRAN IV meets this requirement better than other options. The reasons FORTRAN proves so valuable are (1) the trainer architecture lends itself particularly well to a word (byte) oriented language, (2) execution time is close to real time (subjective), (3) no assembler learning curve need be encountered, and (4) 32 K memory will hold the object code.

The assembler, which must be conditional, relocatable, and macrocapable will prove unneeded if the compiler is adequate. Various hardware test routines can be assembled by hand with the ROM monitor, or with the disk monitor, which does in-line mnemonic assembly as well as disassembly.

The Link-Loader should aid use of the FORTRAN compiler. One of its most desired features is the listing of undefined variables. This feature identifies all library subroutines used prior to the use of the FORTRAN library (FORLIB), and locates all undefined cells.

The Editor can be similar to on-line editors on Honeywell 6060 systems and the XEROX Sigma 9. The full range of internal commands must be available within EDIT. External system commands are also desirable. While lack of external EDIT commands is a serious liability because there is no recovery from a bad disk write, careful consideration to this drawback can prevent the unintentional loss of large amounts of completed EDIT work.

The Disk Operating System (CDOS) must be a complete I/O system for many common peripherals. CDOS is designed to interface with 5¼ inch and 8 inch floppy disks as well as hard disks. RS-232 and parallel outputs are provided to interface both a printer and a terminal. A single byte modification to CDOS should permit RS-232 signals to the keyboard-terminal to also go to a dot matrix printer with sufficient time delay to allow for a carriage return. This feature is to provide screen records. CDOS must also contain a load-and-go capability once the system has been booted.

The ROM Disk Operating System (RDOS) must actually be a Power-ON Monitor, activated by the reset function when the system is first turned on or when the reset is entered manually to the computer. Such an RDOS will wait for the keyboard to enter up to four RETURNS and use them as data to derive the baud rate of the terminal. Without the returns the cold boot mentioned above shall not occur. When a modified ROM is used for RDOS with the baud rate already established, the entire system shall be cold booted to a user program from power on, or a reset. This particular feature will eliminate the use of a terminal in the trainer.

Among the specifically developed software, a variety of types of programming are needed. The required programs are a program control module, an input device control module, a tree search identify and decide module, an error insertion module and an oscilloscope picture output display/device module.

The program control module is a loop which centralizes the activities of the software. The various functions can be called, as needed, and the student activities will be noted. Improper solutions, or unsafe (simulated) equipment operations, cause the oscilloscope to display the word NO, with no student recovery.

The input control module is a hardware control subroutine which selects the inputs from the training cabinet electronics. This module scans the multiplexed inputs, of the faceplate and card cages, sequentially and stores the information, as found, for later evaluation. Evaluated input scans occur at a rate of no less than 30 times a second.

The tree search identify and decide module is a cascade search. Each of more than six switches, when taken in several possible orders provide up to 26 different pictures. Sixteen switches must be evaluated wherein each switch has from two to ten possible positions. The natural order and multiple choices available at each switch are similar to telephone switching systems, which provides the model. Each switch will be evaluated on a "DO CASE" basis which should progress very rapidly to picture selection.

The error insertion module is a subroutine which applies selected dysfunctions to the displays. The error conditions are dependent and/or independent. Error types include: changing correct pictures, and replacing one display with another.

The picture display program is actually a point display graphics subroutine. It must calculate enough points to produce vectors. Data is passed encoded and PICTUR decodes it during picture generation.

Maintenance training requires that dysfunctions must be put into the equipment (real or simulated) so that the student has something to repair. In the past, designers were precluded from doing this with the real equipment because the malfunctions they wished to show could have done some harm to the actual equipment. With microprocessor controlled programmable errors, there is no particular reason to avoid catastrophic dysfunctions, making an error simulation module feasible. The project-developed software is able to handle a number of trainers. Requirements should be additional LBUF, MESUP and IPUT buffers, plus independent cabinet electronics.

HARDWARE AND CIRCUIT DESIGN DETAILS

The main piece of hardware is the Cromemco Model Z2-D Microcomputer which acts as a switching center for the maintenance trainer of the invention. Virtually all simulator activity is directed by the Microcomputer. All of the Trainer switches are read by the computer and all of the visual outputs are controlled by the computer.

THE PROGRAMMABLE WAVESHAPE GENERATOR P.C. BOARD

Figure 3:
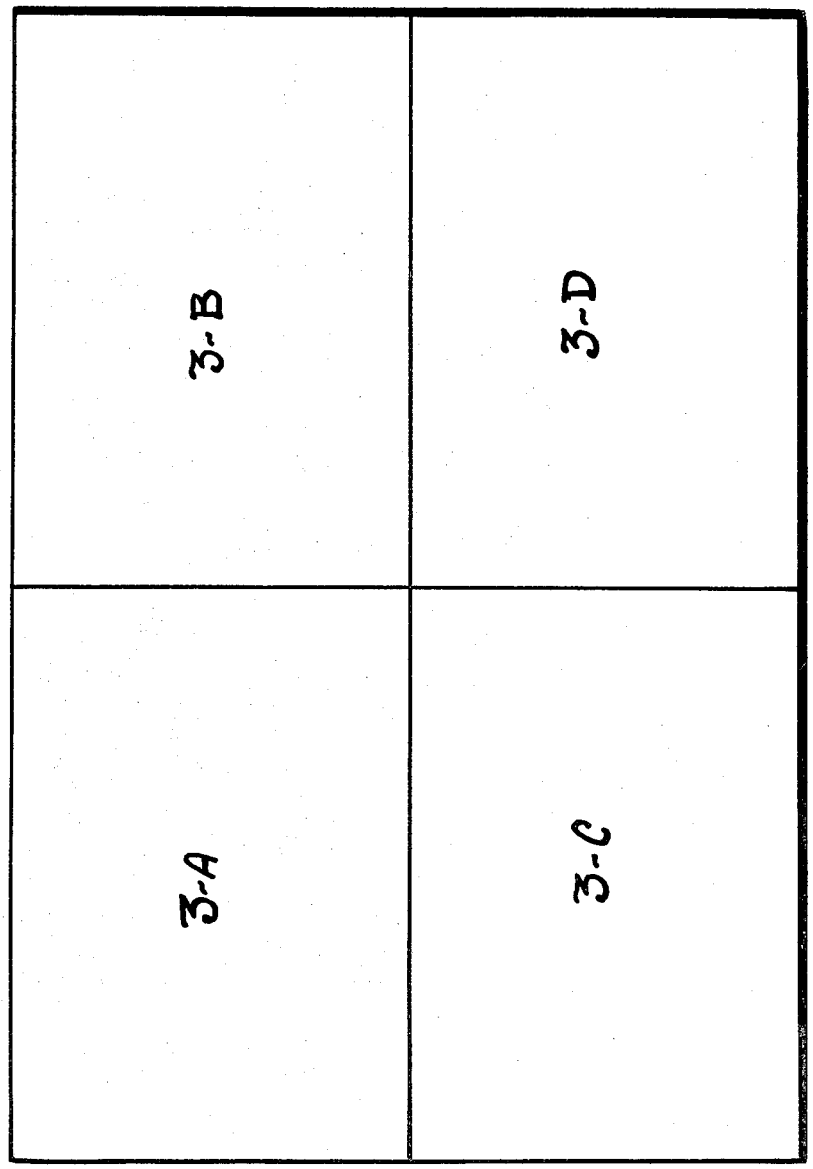
FIG. 3 being comprised of FIGS. 3A-3D is a schematic diagram of the memory circuits of the programmable waveshape generator of the invention.
Figure 4:
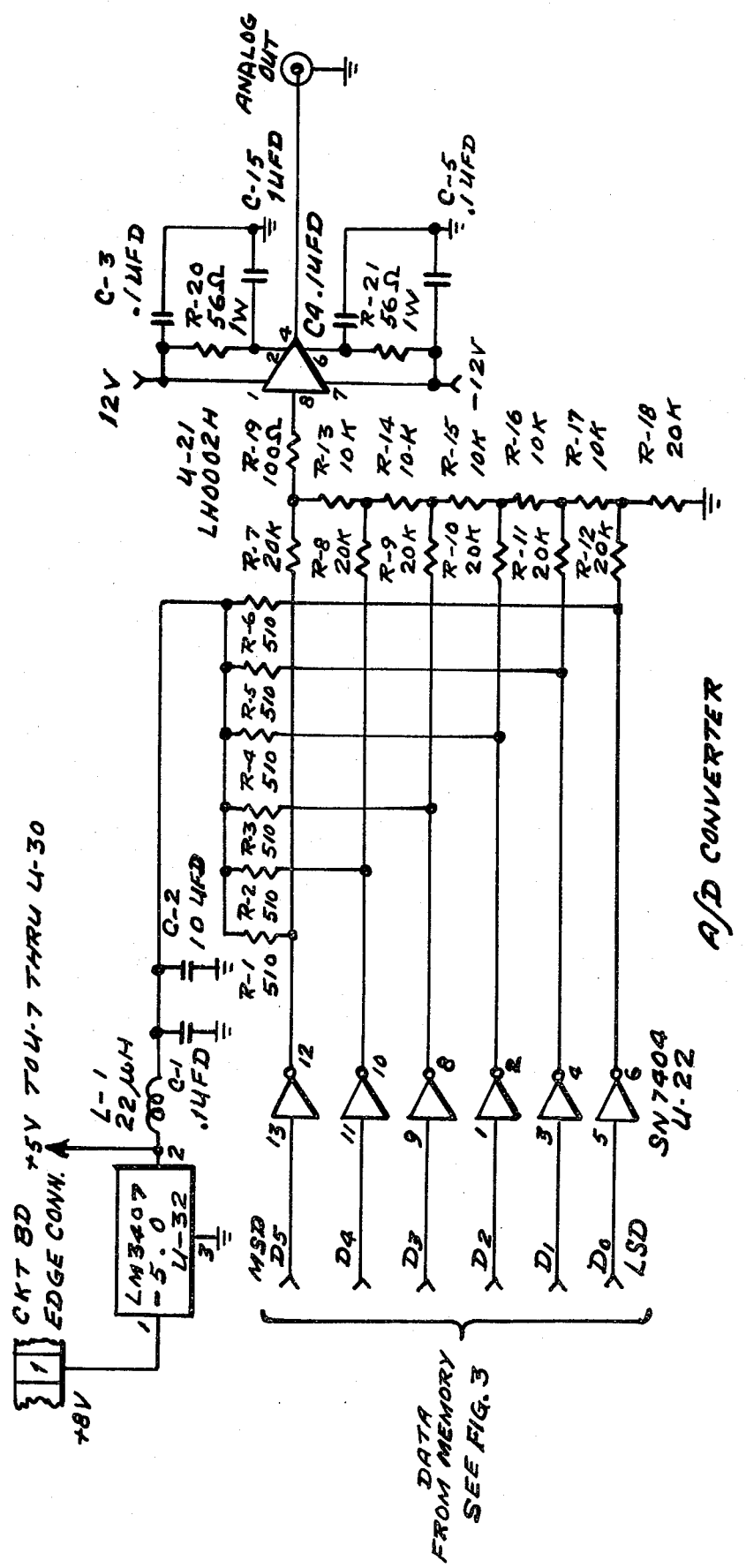
FIG. 4 is a schematic diagram of the digital/analog converter of the programmable waveshape generator of the invention.

The Programmable Waveshape Generator (PWG) Card is located inside the Microcomputer. Refer to FIGS. 2, 3 and 4 which comprise the three schematic drawings of this circuit card. The PWG circuitry is port-addressed. It is capable of generating 64 analog voltages, from 0 to 5 volts in amplitude, in groups from one to 4096 pulses in length, and at rates of either one MHz, or two MHz. It is S-100 bus-compatible (a standard pin out configuration) and may be loaded, under computer program control, at continuous transfer rates of up to two MHz. The PWG, when Loaded and Enabled to run, operates independently of the computer unless action is taken to cause the computer to regain control.

The System Input/Output Interface Card

The System Input/Output (I/O) Interface Card (refer to FIGS. 5 and 6) is a special purpose memory-mapped I/O controller, located inside the microcomputer. Four memory addresses are used to select the operation of the Data-Out-Port (U-7) and Data-In-Port (U-6) integrated circuits. The 8255 (U-7) uses Port A for computer data output. Ports B and C are control lines to the data select circuits. This integrated circuit (IC) also controls the meters and the display light circuits. The 8212 (U-6) is the computer input IC from the data select circuits.

The I/O interface card uses addresses FFF0 through FFFF to acquire control of four input/output states. In an alternative embodiment pin 13 of U-3 may be connected to pin 4 of U-4 with the output of pin 6 of U-3 going to pin 15 of U-5. The A1 input from pin 80 of the PC card edge connector would then be connected to pin 8 of U-7. These changes cause the memory addresses to be FFF0 through FFF3 resulting in better memory management.

The outputs of pins 14-17 of U-7 are used as latch enables (FIG. 6) for U-10 through U-17, in groups of two, respectively. Whatever values are at port A of U-7 (FIG. 5) are fed directly through the enabled latches to the meters and/or lights. When pins 14-17 of U-7 go low, those values in the latches remain, resulting in a continuous display.

The Simulator System Front Panel

The front panel is identical in appearance to the BITE section control panel of the AN/TPS-43E Radar Set. The outputs of the I/O interface card, described in the preceding paragraph, are wired directly to the panel lights and panel meters. The outputs from the switches (highs or lows) are routed through the data select card circuits to the I/O interface card.

Data Select Cards

Figure 7:
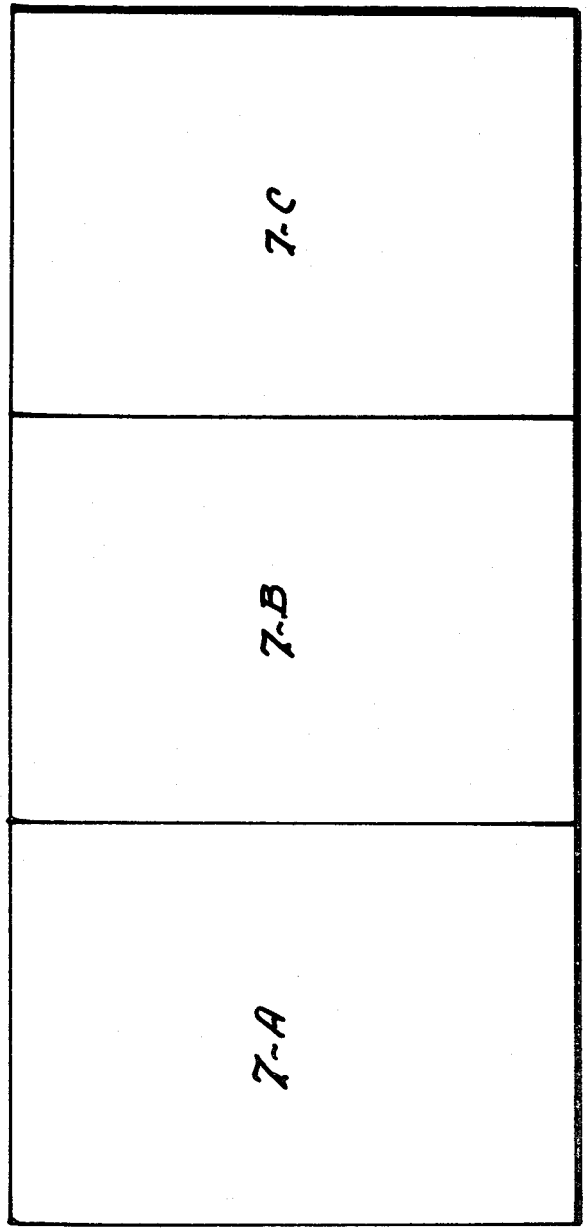
FIG. 7 being comprised of FIGS. 7A-7C illustrates data select circuit card No. 1 of the input/output circuit of the invention.

The two data select cards (DSC), (Cards #1 and #2), mounted on the simulator front panel are identical. Refer to the schematic FIGS. 7 and 8. The circuitry for each card includes five integrated circuit 16 to 1 multiplexers (16 to 1 MUX). When a simulator front panel switch is in an ON position, +5 volts is applied through the switch contacts, providing a logical one (high), as a multiplexer input. Multiplexer input is grounded through a 330 ohm resistor (logical zero) when +5 volts is not applied (switch OFF position).

For circuit tracing applications, edge connected cards and sockets may be fabricated with DSC test points carrying +5 volts (as just described) through a dummy probe wired in series with a 330 ohm resistor in series to ground.

Figure 5:
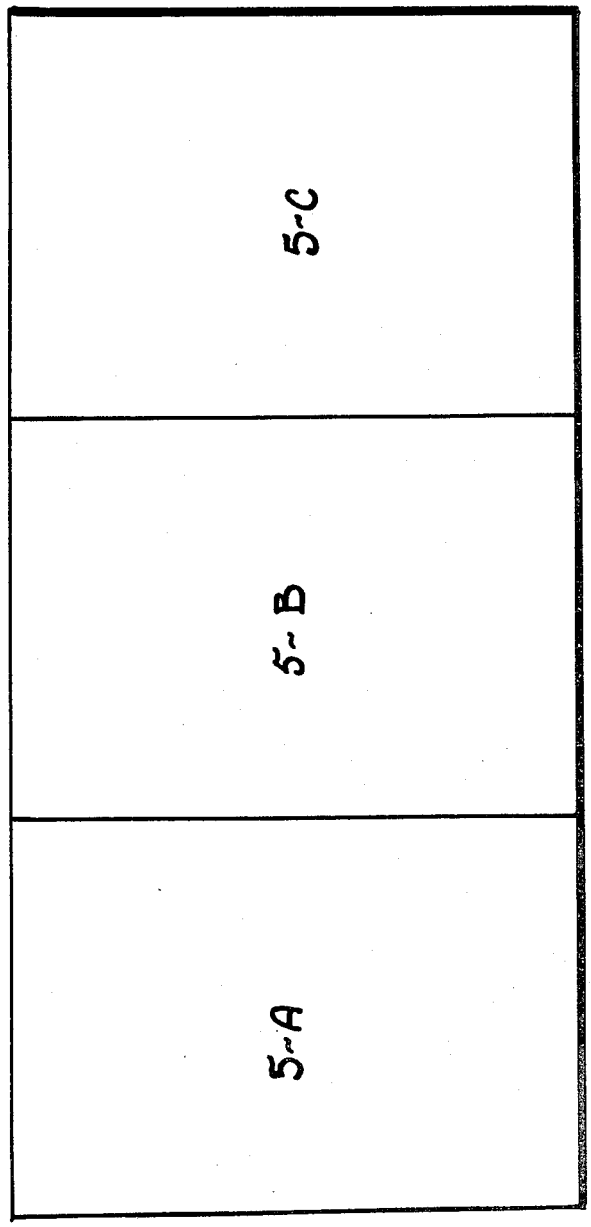
FIG. 5 being comprised of FIGS. 5A-5C is a schematic diagram of the input/output interface control circuits and S-100 port of the invention.
Figure 6:
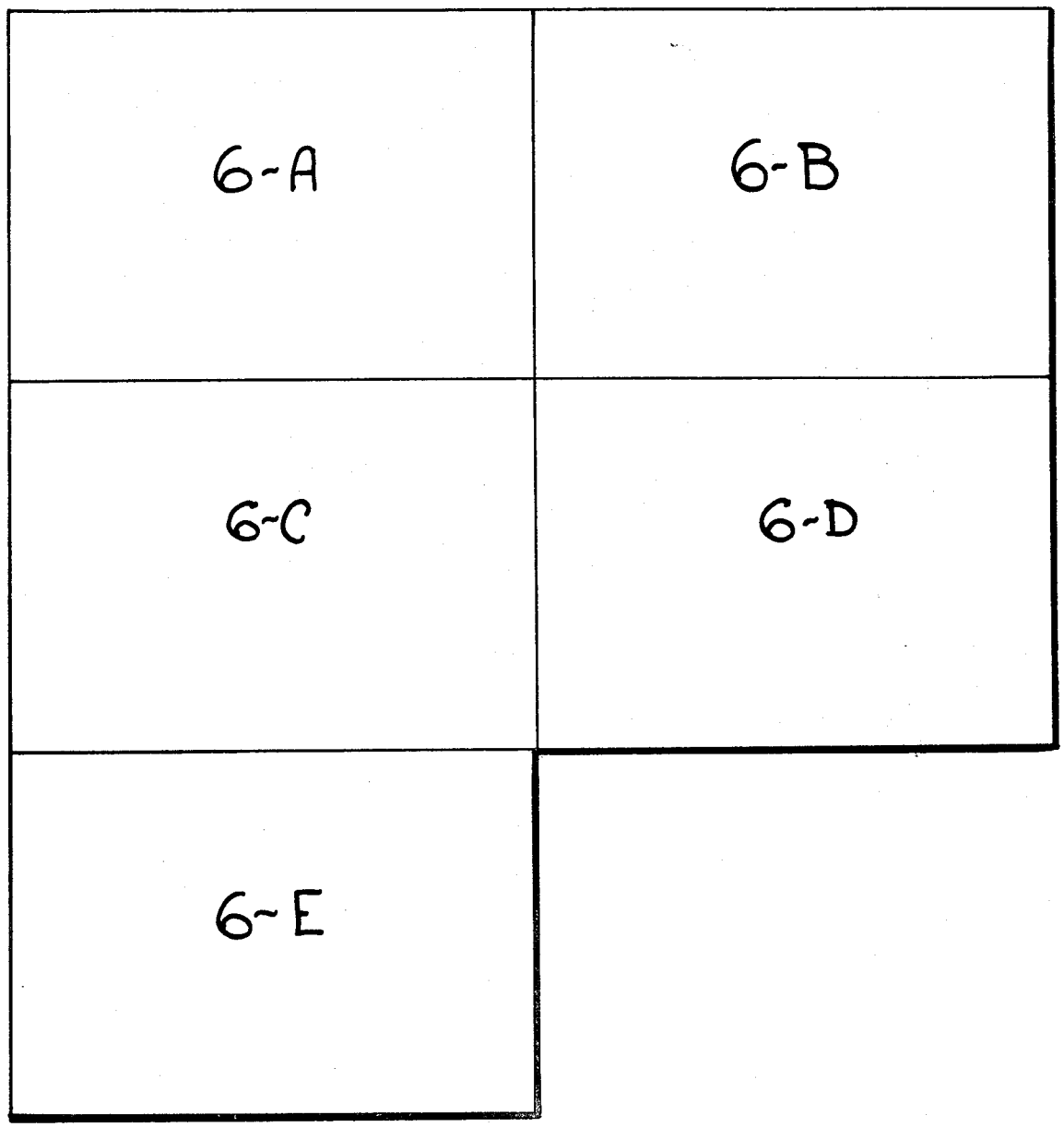
FIG. 6 being comprised of FIGS. 6A-6E is a schematic diagram of the input/output interface-light and meter display circuit of the invention.
Figure 6B:
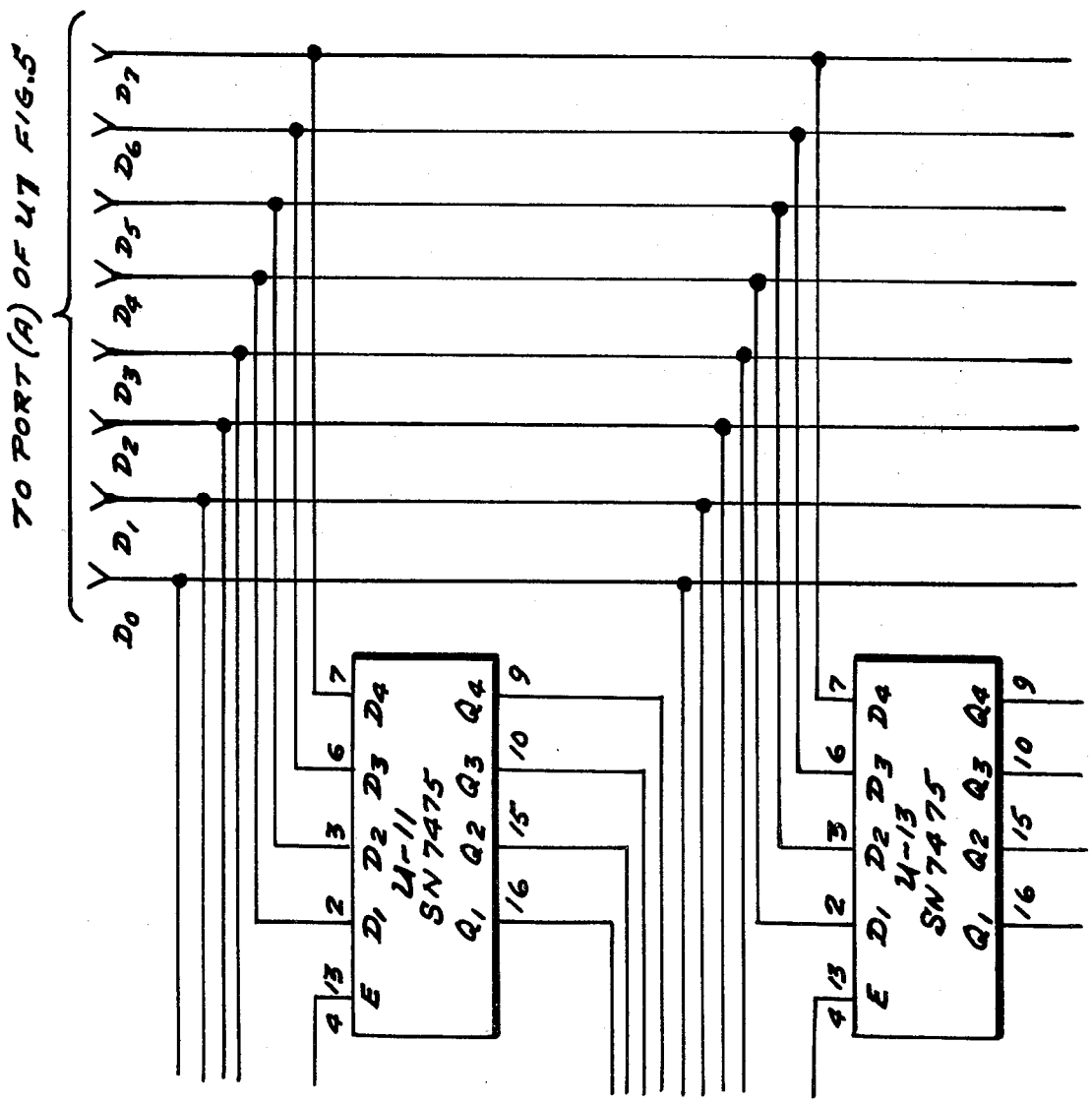

The 16 to 1 MUXs select the line to be read by means of pins 11, 13, 14 and 15 which are controlled by lines 22-25 of port B on U-7 of FIG. 5. When pin 13 of port C goes high, the 16 to 1 MUXs are enabled and pass the logic level of the line selected. Connections from the computer to the DSCs is by way of J-4. Connections from the front panel to the DSCs is by way of J-7 and J-8.

Figure 9:
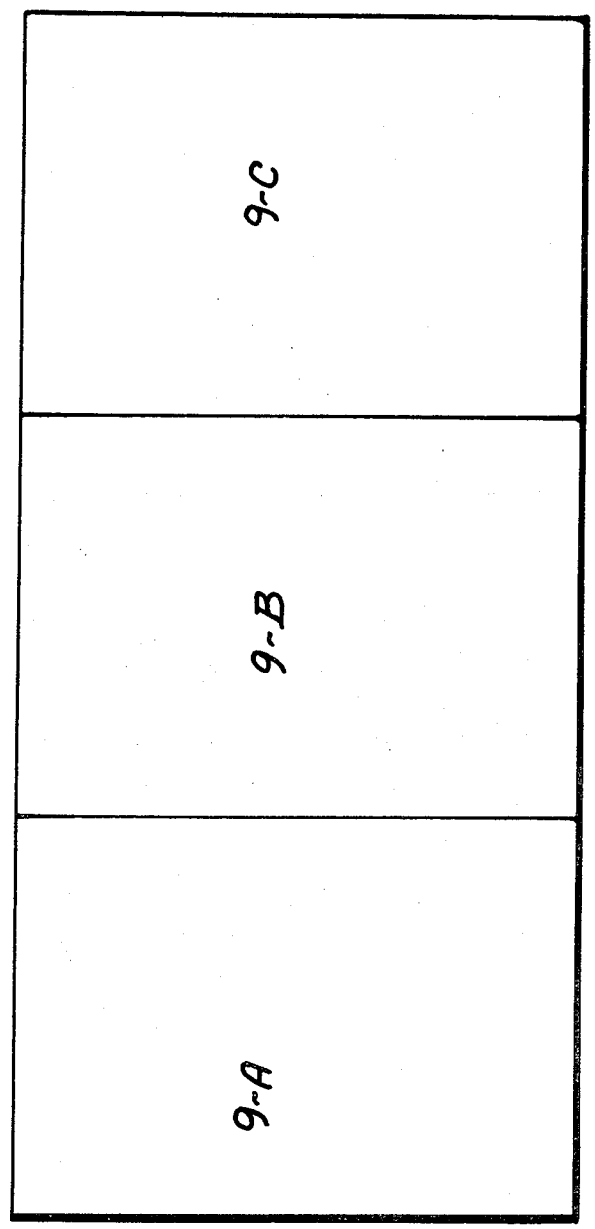
FIG. 9 being comprised of FIGS. 9A-9C illustrates data select circuit card No. 3 of the input/output circuit of the invention.

The third data select card (Card #3) is located in the PC board card rack. The circuitry is similar to that of the data select cards described in the preceding paragraph. (Refer to FIG. 9 for the schematic drawing of this card). Logical ones and zeroes to this card result from the ON or OFF (open or closed) condition of 52 reed switches in the card racks. The trainer card rack simulation is composed of four card racks, into which 52 dummy AN/TPS-43E circuit cards are inserted. Magnets, which are attached to the socket ends of the dummy circuit cards, magnetically close the reed switches when the cards are properly seated. A closed switch applies ground (Logical Zero) to a multiplexer input. If a card is not properly seated, or is not inserted, the reed switch remains open and +5 volts (Logical One) is applied as a multiplexer input. The +5 volts is applied through 2.2K ohm resistors to 80 input lines of the five multiplexers on the data select circuit card.

The Phase Shift Analog/Digital Converter

Figure 10:
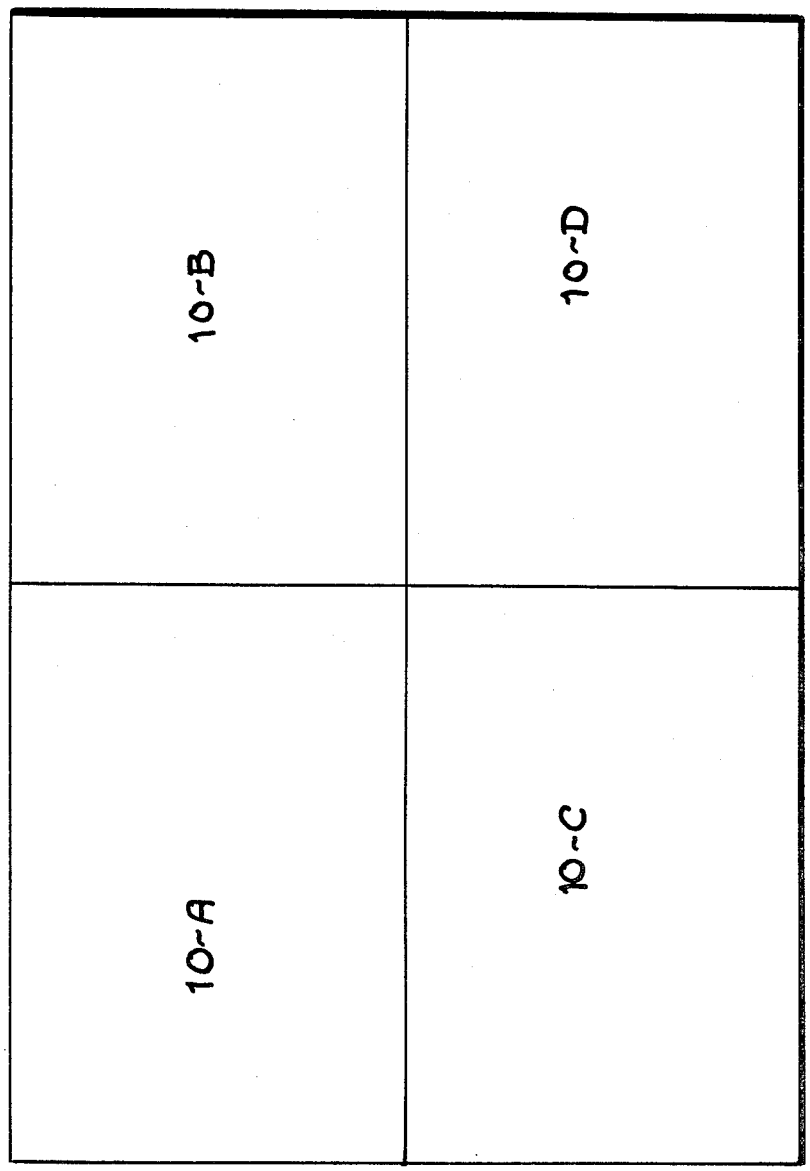
FIG. 10 being comprised of FIGS. 10A-10D is a schematic diagram of the phase shift analog/digital converter of the invention.

The phase shift A/D converter PC card is mounted on the simulator front panel. Refer to FIG. 10 for the schematic drawing of this card. This circuit converts positive voltages of from zero to +5 volts into binary values from 0 to 63. These binary values are read by the microcomputer by way of the data select cards on the simulator front panel.

The microcomputer program hereinafter described does not utilize the data acquired from the phase shift A/D converter. The utilization of this data may be incorporated into a different microcomputer program if the application requires it.

The oscilloscope used during the operation/maintenance of the simulator/trainer is a Tektronix 465M, or equivalent, equipped with a ten-to-one probe. An adapter, probe tip to BNC, Tektronix P/N 013-0084-01, is used to connect the oscilloscope input jack to the programmable waveshape generator analog output jack (J-1) inside the microcomputer.

Refer to the three programmable waveshape generator (PWG) schematic drawings, FIGS. 2, 3 and 4 during the following descriptions. FIG. 3 shows the memory section of the card (U-1 through U-6). Each of these integrated circuits consists of 4 each RAM memories (TMS 4033 integrated circuits) stacked vertically and wired in parallel. The enable control decoder (U-7) is also shown on FIG. 3. FIG. 2 shows the circuits from which U-1 through U-7 receive their inputs (write lines, address lines and data lines). FIG. 4 shows the D/A converter (U-22), which received data from the data port latches (U-8 and U-9) during the data load mode and reads (senses) the data in the IC memories during the run mode. The 6 outputs of U-22 are applied to the summing network (R-1 through R-19). The analog voltage output from the summing network is applied to the input of Op Amp U-21. The output of the Op Amp is connected to J-1, which is the analog output jack for the PWG.

Clock Control Circuitry

The circuitry for the 2 MHz clock, which is used as the timing source for the PWG during the run mode of operation, is located in the lower left section of FIG. 2. The clock circuitry is discussed at this time since the clock output pulses from the clock or write gate (pin 3 of U-30) will be referred to many times in the following circuit description. The frequency of these pulses will be 2 MHz or less and their polarity will be plus at any frequency.

The microcomputer operates at 4 MHz; therefore, the PWG must be able to load at a 4 MHz rate during the MSD, LSD and data load modes. The microcomputer clock and write gate output pulses are both 250 nanoseconds (ns) long. During the run mode, the frequency of these pulses comes from a 2 MHz crystal and is controlled by the ÷ by 2 clock circuit to be 1 MHz or 2 MHz. The microcomputer in this trainer is programmed to send trigger pulses to the ÷ by 2 clock circuit to change the running frequency of the PWG clock pulses from 2 MHz to 1 MHz and vice versa. These clock frequency changes are caused by the design limitations of the trainer. The ÷ by 2 clock circuit is used during the run mode of operation to control the frequency at which the memory is read (1 MHz to 2 MHz). The waveshape pulse width seen on the oscilloscope connected to analog output jack J-1 is an indication of the frequency which is being used.

The state (set or clear) in which the ÷ by 2 control FF (U-11A) is operating determines the frequency of the clock pulses from clock or write gate pin 8 of U-30. The state of this FF can be changed by triggers from the microcomputer on edge-connector pin 83. These triggers are applied to pin 1 of the ÷ by 2 clock port NAND gate U-11B.

The input to pin 2 of ÷ by 2 clock port is the latch strobe, from latch strobe gate U-20 (pin 1), which will be described later in this discussion. When these two inputs to the ÷ by 2 clock port are Hi, the output at pin 3 goes Lo. This Lo is applied to pin 12 of the ÷ by 2 control FF at the same time a Lo fron U-7 (pin 4) occurs which enables Q' of U11A for a 1 MHz operation. Each input pulse triggers the ÷ by 2 control FF to change states (set to clear, or clear to set).

At the beginning of the turn-on/turn-off procedures, the output of latch strobe gate U-20 (pin 1) is a steady-state Lo, which is applied to pin 2 of the ÷ by 2 clock port and also to the set input (pin 10) of the ÷ by 2 control FF. This Lo keeps it in the set state until the first trigger from the ÷ by 2 clock port is applied to pin 12 of the ÷ by 2 control FF. Thus, Q is enabled on initialization to provide 2 MHz operation until a trigger pulse make Q' go Hi.

The run (00$_2$) output transition from Hi to Lo causes the ÷ by 2 control FF to change states when pin 12 is Lo also. Pin 4 of U-7 is high during the run state; therefore, when a new waveshape begins loading it goes low and clears U-11A for 2 MHz operation. The clear mechanism insures a baseline starting value in U-11A for each new data load. When a load is completed, a run mode (OO$_2$) signal, sent to port 7F (Hex), leaves the 2 MHz controls as is while an identical signal sent to FF (Hex) puts the ÷ by 2 control to 1 MHz operation. Each of the inputs described above triggers the ÷ by 2 control FF to change states and each change causes the output pulses from the clock or write gate to change frequency.

The PWG does not change frequency during the run mode. The state (set or clear) of the ÷ by 2 control FF at the beginning of the run mode will determine the timing pulse frequency (2 MHz or 1 MHz) during the run mode. The 2 MHz clock oscillator is crystal-controlled by crystal Y-1.

The 2 MHz clock pulses from pin 2 output of U-23 are applied to pin 10 of the clock gate (U-11B) and to pin 3 of the ÷ by 2 clock divider FF (U-11A). The other input to clock gate pin 9 (U-11B) is the Q' output from pin 9 of the ÷ by 2 control FF (U-11A). The Q' output from the ÷ by 2 control FF (pin 8) is one input to the ÷ by 2 clock gate (pin 4) and the other input (to pin 5) is the Q output (pin 5) of the ÷ by 2 clock dividier FF, which changes states at the ½ PWG clock oscillator frequency (1 MHz). When the ÷ by 2 control FF is set, the Q output from pin 9 (U11A) is Hi and the Q' output from pin 8 is Lo. The clock gate is enabled by the Hi to pin 9 (U11B) while the ÷ by 2 clock gate is inhibited by the Lo to pin 4. Thus, the Hi 2 MHz clock pulses to pin 10 are passed through the clock gate at the original frequency.

The FF (Hex) input trigger to the ÷ by 2 control FF causes it to change from set to clear (Q goes Lo and Q' goes Hi). The clock gate is inhibited by the Lo Q input to pin 9 while the ÷ by 2 clock gate is enabled by the Hi Q' input to pin 4. Since the ÷ by 2 clock divider FF changes states at the 1 MHz clock frequency, the Q output (pin 5) is Hi on alternate clock input pulses. Thus, the input to pin 5 of the ÷ by 2 clock gate is at 1 MHz.

The 1 MHz or 2 MHz clock gate (U-11B) passes either frequency that is applied as an input because one of the unselected clock gates is always outputting a steady state Hi. The clock pulses at output pin 11 are applied to input pin 9 of NAND gates U-30. The other input to this NAND gate (pin 10) is a steady-state Hi from the output (pin 11) of another NAND gate of U-30, which has its inputs (pins 12 and 13) tied together and grounded through the rest line. The clock pulses at the output of U-30 (pin 8) are the timing pulses for the PWG.

Power

At the top of FIG. 2 are shown the DC power circuits for the PWG circuits. Voltage regulator U-31 has +8 VDC input from edge connector pin 1. The output of U-31 is +5 regulated. Resistors R-30 and R-31, and Zener diodes CR-1 and CR-2, are used to reduce and regulate the +18 VDC and −18 VDC inputs to +12 VDC and −12 VDC respectively. The 18 volt inputs are from edge connector pins 2 and 52. These three voltages (+8 VDC, +18 VDC and −18 VDC) are supplied by power supplies in the microcomputer. All of the other inputs to the programmable waveshape generator (PWG) are also from the microcomputer.

Port Addressing

The eight inputs (D-0 through D-7) to data port latches U-8 and U-9 are sources of the data loaded into the memories. When these two latches are enabled by the latch strobe from pin 1 of latch strobe gate U-20, data and/or address instructions can be brought into the PWG and loaded into the PWG memory. The first six of the inputs to U-8 and U-9 (D-0 through D-5) are data input lines and the last two (D-6 and D-7) are used as mode control lines to program control decoder U-7. The inputs from the microcomputer are TTL logic levels (+5 V highs or OV lows). The value "7C" hexadecimal ("7C" Hex), used to address port address detector U-10, along with SOUT from the S-100 buss, causes high at all eight U-10 inputs. The output at pin 8 goes Lo and is applied to input pin 2 of latch strobe gate U-20. The PWR write strobe from edge connector pin 77 is the second input to U-20 (at pin 3). These two Lo inputs cause pin 1 of this NOR gate to go Hi. This is the latch strobe and is used in three places in the PWG. Lo inputs A-0 and A-1 of the "7C" hex address are inverted by two sections of inverter U-26 and applied as Hi inputs to NAND gate U-10. The other "7C" hex address inputs to U-10 are Hi. The PWR write strobe (Lo) and SOUT (Hi) occur at the same time as the "7C" hex address. The latch strobe from pin 1 of U-20 goes to pins 4 and 13 of both data port latches U-8 and U-0. These latches are then enabled to bring data from the microcomputer into the PWG.

PWG Timing Frequencies

The microcomputer operates at a 4 MHz clock rate while the PWG, due to the slower speed of its own memories, must operate at a 2 MHz (or less) clock rate. However, due to the time intervals during non-output instructions in the microcomputer, there is sufficient time for the slower PWG memories to be loaded. The memory address latches and memory address counters must be enabled for longer periods of time (after the port address latches are no longer enabled). This is accomplished by using the latch strobe gate, described above, to generate a 500 ns pulse which is used to keep the memory address latches and counters enabled after the termination of a legal port address of "7C" or "FC" (Hex). The Hi latch strobe is applied to pin 5 of U-25 in the write pulse widening one shot multivibrator (OSMV) circuit, shown on the top left section of the referenced schematic. The OSMV is triggered by the trailing edge of the latch strobe. The OSMV is part of the control logic circuit which is made up of one NAND gate of U-25 and three inverters of U-24. Resistors R-26 and R-25 and capacitor C-7 comprise the RC time constant circuit. Rheostat R-25 is adjusted so that the output pulse from the OSMV is approximately 500 ns in duration. The Hi output of U-25 (pin 6) is inverted through three inverter stages of U-24 in succession. Pin 10 output is a Hi 500 ns pulse and pin 8 is a Lo 500 ns pulse. The Hi at pin 10 is the write strobe which is applied to input pin 9 of write gate U-25. The other input to the write gate is the data line ($10_2$) from pin 6 of the program control decoder ($\frac{1}{2}$ of U-7) which is Lo during the data load mode. The data line input is inverted by one inverter of U-23 and pin 8 of ouput of U-23 is applied to pin 10 of the write gate as a Hi.

Program Control Decoder

Lines D-6 and D-7 from the microcomputer to data port latch U-8 are mode control lines to the PWG. When U-8 is enabled by the latch strobe, the outputs (pins 9 and 10) will be in one of four possible combinations of highs and lows, ($11_2$, $01_2$, $10_2$ or $00_2$), which are applied as inputs to pins 2 and 3 of program control decoder U-7. The outputs of U-7 are used to select one of the four modes in which the PWG operates. The PWG can be in the run mode ($00_2$); it can be in the data accepting mode ($10_2$); it can be accepting an address load of the least significant digit ($01_2$); or it can be accepting an address load of the most significant digit ($11_2$). The outputs of U-7 are Hi until selected. The mode selected will cause that mode output line to go Lo. The four modes are selected in the following sequences: MSD ($11_2$), LSD ($01_2$), Data ($10_2$) and Run ($00_2$).

Memory Address Latches

Since only six data lines from the data port latches are used to load 12 bits of address into the MSD and LSD memory address latches, the 12 bits are loaded in two groups of six each. This is done by enabling the MSD memory address latches (U-27 and $\frac{1}{2}$ of U-28) during the MSD mode ($11_2$), and the LSD memory address latches (U-29 and the other $\frac{1}{2}$ of U-28) during the LSD mode. When the input combination from U-8 ($11_2$) causes the MSD load output of the program control decoder to go Lo, this Lo is applied as an input to Pin 11 of MSD load gate U-20. The inverted write strobe (Lo) from pin 8 of inverter U-24 is the other input (pin 12). These two Lo inputs causes the output of the NOR gate (pin 13) to go Hi. This Hi is applied to pins 4 and 13 of U-27 and to pin 4 only of U-28 (memory address latches). U-27 and $\frac{1}{2}$ of U-28 are then enabled to load six MSD address bits from the six output of the data port latches.

When the program control decoder is sequenced to the LSD load mode ($01_2$) by the microcomputer the MSD load output goes Hi and pin 13 of MSD load gate U-2 goes Lo, so that the previously loaded memory address latches (U-27 and ½ of U-28) are no longer enabled. The LSD load output goes Lo. This Lo LSD output (01$_2$) is applied to pin 8 of the LSD load gate U-20. The reinverted write strobe (Lo) from pin 8 of inverter U-24 is used as the second input to this NOR gate (at pin 9) also. The resultant Hi output at pin 10 is applied to pins 4 and 13 of U-29 and to pin 13 only of U-28. The second half of U-28 and all of U-20 are then enabled to load six LSD address bits from the same six outputs of the data port latches. The 12 output lines of the three memory address latches are connected to 12 inputs of the memory address counters (U-17, U-18 and U-19). These counters are inhibited from receiving the 12 address bits from the latches by the Lo input from pin 4 of NOR gate U-20 (load or last count gate). When the output of the LSD load gate transitions from Hi to Lo, after approximately 500 ns, this Lo inhibits the LSD memory address latches (U-29 and ½ of U-28) and is also applied to input pin 5 of the load of last count gate (U-20). The input to pin 6 is normally Lo from pin 12 of the last count inverter (U-23). These two Lo inputs cause a transition from Lo to Hi at output pin 4. This Hi is applied to pins 11 of the three memory address counters as an enabling pulse and the 12 address bits from the memory address latches are loaded into the three memory address counters. The address numbers from the three counters will determine the duration of the waveshapes observed on the oscilloscope at analog output jacket J-1 when the PWG is in the run mode.

Memory Address Counters

The three counters are wired in series so that, when downcounting, the outputs form a series of 12 bit numbers, starting with the maximum binary address value and downcounting to zero. The Hi clock pulses from pin 3 of U-30 (clock or write gate) are applied to pin 4 of U-19. (Refer to paragraph on clock control circuitry for the description of the generation and control of the clock pulses.) Each pulse downclocks the three counters to a different binary address value. The SM74193 counters are designed to be used in multidecade operations, without additional logic, by using the borrow output of one counter as the downclock input to the following counter. When U-19 has counted to 00, a Hi from U-19 (pin 13) to U-18 (pin 4) starts the countdown of U-18. When U-18 counts down to 00, a Hi from U-18 (pin 13) to U-17 (pin 4) starts the countdown of U-17. When U-17 counts down to 00, all of the 12 outputs of the counters are Lo. These outputs are inverted by U-14 and U-15 and applied as Hi inputs to multiple NAND gate U-16, the last count detector. The Lo output at pin 9 of U-16 is inverted by last count inverter U-23 and is applied as a Hi to U-20, pin 6, the load or last count gate. The resultant Lo output at pin 4 of U-20 is applied to pins 11 of the three memory address counters. This Lo inhibits the counters from being loaded from the three memory address latches, as described in paragraph 2-13, until the LSD load gate output (U-20, pin 100) transitions to Lo.

The output of the last count inverter is also applied to sync output jack J-2 and is used to synchronize the oscilloscope. The countdown pulses used to downcount the memory address counters are Hi outputs of clock or write gate U-30 at pin 3.

Memory Load Control

It was stated earlier that the PWG, when loaded and in the run mode, could operate independently of the microcomputer. During the data load mode, the data line (10$_2$) from the program control decoder is Lo. This Lo is applied to input pin 9 of inverter U-23. The Hi output of U-23 at pin 8 is one input (pin 10) to write gate U-25. The write strobe (alternately Hi or Lo) from pin 10 of U-24 is the other input (to pin 9) of the write gate. Pin 8 output of the write gate is therefore alternately Lo or Hi. It goes Lo in coincidence with the leading edge of the 500 nanosecond write strobe. Clock gate U-25 is inhibited by the Lo at pin 13 from inverter U-23 (pin 10). The input to this inverter (pin 11) is the Hi run (00$_2$) output of the program control decoder.

The PWG clock pulses at input pin 12 of the clock gate, from U-30 pin 8, are not passed through the clock gate. The output of the clock gate at pin 11 is the input to pin 2 of clock or write gate U-30 and remains Hi during the data mode. The input to pin 1 of the clock or write gate is the output of the write gate (pin 8). When this input goes Lo, the output at pin 3 goes Hi, in coincidence with the leading edge of the write strobe. The output pulses at pin 3 of the clock or write gate are the pulses used to downclock the memory address counters, and are generated and controlled by the microcomputer program. However, during the run mode there are no inputs, other than the three power supply voltages, from the microcomputer.

The write gate (U-25) is inhibited by a steady state Lo at pin 9 from pin 10 of U-24 (there are no write strobes during the run mode). The data line (10$_2$) input to pin 9 of inverter U-23 is Hi in the run mode. The Lo output of the inverter (pin 8) is applied to input pin 10 of write gate U-25 resulting in a steady state Hi at output pin 8. This Hi is applied as an input to pin 1 of clock or write gate U-30, and also to input pins 4 and 5 of NAND gate U-30 in the write delay OSMV circuit. Since this is a steady state voltage, there are no write pulses generated in the write delay OSMV circuitry during the run mode. Clock gate U-25 is enabled by the Lo output of the run (00$_2$) line from program control decoder U-7 during the run mode. This Lo output is inverted to a Hi by inverter U-23. The Hi output at pin 10 is applied to pin 13 of clock gate U-25. The Hi PWG clock pulses (1 MHz or 2 MHz) from pin 8 of U-30 are applied to pin 12 of the clock gate. The clock gate output (pin 11) goes Lo with each pulse. These Lo pulses are applied to pin 2 of clock or write gate U-30. The Hi output pulses at pin 3 are the same frequency as the PWG clock pulses (1 MHz or 2 MHz). These are the downclock pulses used to downclock the memory address counters. They are generated and controlled without inputs from the microcomputer. During the data mode, the downclocking of the memory address counters assure that each data bit is loaded into a different address in the memory. During the run mode, the downclocking assures that the data bits in the memory are correctly addressed for reading.

Write Delay One Shot Multivibrator (OSMV)

During the data mode, the output pulses from pin 8 of write gate U-25, described in paragraph 2-15, are also used to trigger the write delay OSMV. This output is applied to input pins 4 and 5 and NAND gate U-30 which acts as an inverter. The output at pin 6 (Hi) is applied to pin 2 of U-25, the OSMV NAND gate. The OSMV is triggered by the trailing edge of the pulse (negative-going), so the OSMV output pulse is delayed approximately 500 ns after the leading edge of the input pulse.

The OSMV circuit is made up of NAND gate U-25 and two inverters of U-24. The RC time constant circuitry is identical to that of the pulse widening OSMV described above. Rheostat R-22 is adjusted so that the output pulse is approximately 500 ns in duration. The Hi output at pin 4 of the second inverter is applied to the inputs of three inverters (U-26) in parallel. These three inverter/buffers are needed to supply the driving power to the write lines to the 24 random access memories (RAMs).

Each inverter/buffer output is applied to the write (pin 3) input of eight RAMs in parallel. The inputs occur after the RAMs are addressed and enable all 24 RAMs to be loaded with data from the data port latches (U-8 and U-9). Lo write input pulses occur 500 ns after the down clock pulses to the memory address counters described earlier. The write delay OSMV is used to compensate for transit time losses in the memory address latches and counters, and to assure that there is sufficient time for the RAMs to be correctly addressed for incoming data and for that data to be correctly loaded into the memory.

Memory Loading

It was explained that the memory address latches (U-27, U-28 and U-29) were enabled to accept address data by the Hi outputs from the MSD and LSD load gates, pins 13 and 10 respectively of the two NOR gates of U-20. Both of these outputs are Lo during the data mode since the MSD ($11_2$) and the LSD ($01_2$) outputs from program control decoder U-7 are Hi. Therefore, the memory address latches are inhibited from receiving data of any kind. Any data in the data port latches (U-8 and U-9) will go directly to the RAMs.

Data from U-8 and U-9 is routed to the RAMs on data lines D-0 through D-5, with each of the six data lines connected to the pins 11 (DIN) of one IC (four each TMS4033 RAMs stacked and wired in parallel). The 12 outputs of the memory address counters (U-17, U-18, and U-19), after being inverted by 12 inverters of U-14 and U-15, are each applied to both inputs of one of the 12 NAND gates of memory address drivers U-11, U-12 and U-13. Address lines 0 through 9 from the memory address drivers are wired so that each address line goes to the same input pin of each of the 24 RAMs in parallel. The other two outputs from the memory address drivers (U-11, pins 3 and 6) on lines 10 and 11, are applied as control inputs to enable control decoder U-7 (pins 13 and 14).

One half of U-7 was described in paragraph 2-10 as the program control decoder. This half of U-7 operates in the same manner. The inputs to pins 13 and 14 are four possible combinations of highs and lows ($00_2$, $01_2$ $10_2$ and $11_2$). The four outputs at pins 9 through 12 are Hi until selected by one of the binary inputs. At that time, the selected output goes Lo. The four outputs are the Row-Addressing Strobes, with each output connected to pins 13 (CE) of the six RAMs in each of the four rows. The selected Lo output enables six RAMs in one row to load data. Six data bits on the six data line (D-0 through D-5) are loaded into six RAMs in the selected row. Since all 24 RAMs are addressed identically from the address lines at each address, the electrical locations of the six memory cells in six selected RAMs is also identical. A data bit on any one of the six data input lines can be loaded into only one specific RAM, as determined by the enable control decoder configuration. Each of the 1024 memory cells in each RAM is individually addressed and selected for loading by the combinations of address line inputs from the memory address drivers. The delayed write strobe assures that there is sufficient time for the selected/addressed memories to be loaded.

Oscilloscope Monitoring

As the data from the data port latches (U-8 and U-9) is being loaded into the RAMs, it is also applied to the input of six inverters of U-22 in the D/A converter. The outputs of the six inverters are applied to the summing network, composed of resistors R-1 through R-19.

This network is provided with +5 VDC from voltage regulator U-22, which is supplied with +8 VDC from the microcomputer through the PWG circuit board edge connector. The output of the summing network is applied to input pin 8 of operational amplifier (Op Amp) U-21. The output of the Op Amp at pin 4 is connected to analog output jack J-1 which is the monitor point (oscilloscope display) for the trainer/simulator.

The D/A circuit is identical to that in the AN/TPS-43E radar system and has the same response time. The waveshape on the oscilloscope are made up of 64 analog voltages of from 0 volts to 5 volts in amplitude. During the run mode of operation, data loaded into the memory is read sensed by the D/A circuit and applied to the oscilloscope through the same circuitry. As in the AN/TPS-43E radar system, the oscilloscope display is an indication of the positions of all of the switches in the system, as read by the microcomputer.

Run Mode

The binary inputs to program control decoder U-7 from the microcomputer ($11_2$, $01_2$, $10_2$ and $00_2$) determine the mode in which the PWG is operating at all times. After the data has been loaded into the memories, inputs to the program control decoder ($00_2$) from the microcomputer switch the PWG to the run mode. The run ($00_2$) output from U-7 goes Lo and the other U-7 outputs are Hi.

The three memory address latches (U-27, U-28 and U-29) continue to be inhibited from receiving additional address and the address already in these latches is controlled by the PWG clock (1 MHz or 2 MHz). This frequency (1 MHz or 2 MHz) is controlled by the ÷ by 2 clock circuitry. There are no microcomputer inputs so the PWG is operating independently of the microcomputer.

The clock pulses from clock or write (U-30, pin 3) count down the memory address counters (U-17, U-18 and U-19), as described above, but the clock pulses are generated in the PWG clock oscillator circuit and the frequency (1 MHz or 2 MHz) of the pulses is controlled by the ÷ by 2 clock circuitry. The counters count down one digit on each clock pulse, from the maximum binary address value down to zero. The combination of Hi and Lo outputs on the 12 output lines changes at each down count and each different combination becomes a different address; to selected memory cells; in selected RAMs; in selected rows of RAMs.

Since there are no inputs from the microcomputer during the run mode, there are no outputs from the write pulse widening OSMV circuit and consequently, no input to pin 9 of write gate U-25 which is therefore inoperative. The output of the write gate (pin 8) was used to trigger the write delay OSMV during the data load mode, to generate the delayed write strobes to the memory. The write strobes are not required during the run mode. The Lo write strobes enabled the addressed locations to be loaded with data during the data mode. The write lines inputs to the RAMs remain Hi during the run mode. This enables the RAMs to be read (sensed) so that data already loaded into the addressed locations is read as each location is addressed during the run mode. This data is routed through the output lines (D-0 through D-5) to the D/A converter circuitry, which was described above. As in the data read mode, the D/A converter output goes to analog output jack J-1 for oscilloscope monitoring. On the last output all the counter values are zero. At this time a pulse from U-16 reloads the counters and also strobes J-2, the sync line of the oscilloscope. Note that $A_o$-$A_3$ of FIG. 2c are jumper reconnectable to provide up to six unique addresses for up to six different parallel boards each running independently of the other. Note also on FIG. 2A point X Y jumper can be cut to disable the on board clock. Point X may now be connected to point Y' from a different PWG thereby permitting single clocking of two boards, or more.

Software Locally Developed

The software created for the maintenance trainer are: the application program in FORTRAN, the support programs in FORTRAN and BASIC and the maintenance programs in BASIC and direct machine code. The application program is a structured design which easily accomodates testing of program modules. The other programs are very simple and do not require the elaborate planning afforded to the application program.

Figure 11:
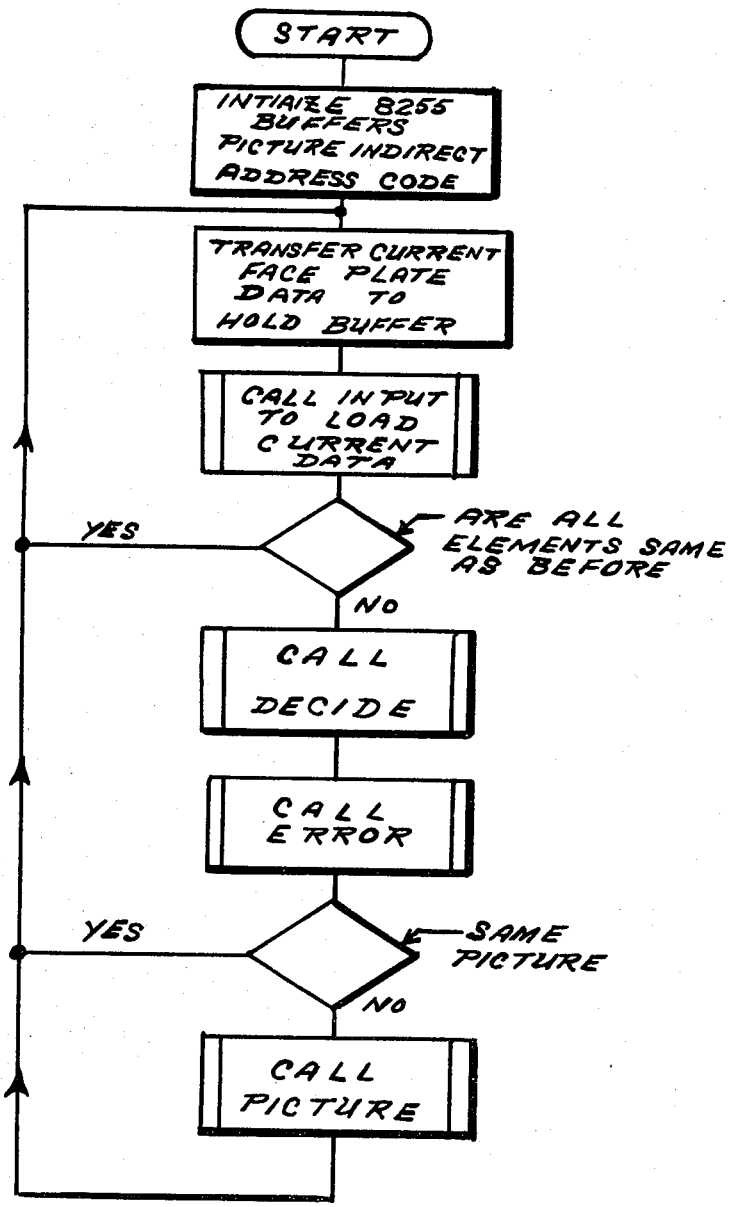
FIG. 11 is the control module (TPSPGM) flow chart.

First consider the control (TPSPGM) module (FIG. 11). This particular module has the purposes of bringing the program on line and controlling all other modules, i.e., to provide a central source of control over the other modules. Without this, the structuring of the program would have been impossible. The software design is intended to have a structure that is not ambiguous to the user. Since software maintenance consumes manpower, and the user expects that the maintenance of the maintenance simulator should be low, a modular design provides "to the module" problem identification.

The input module (INPUT) is a relatively simple subprogram. Its purpose is to go to the necessary ports and memory addresses to acquire information from the trainer itself. Information acquisition actually is broken into two parts. First is the acquisition of data from the faceplate and second, from the equipment of the card cage.

From the faceplate, the computer selects information about the settings of the various switches so that it can determine what particular display needs to be output to the oscilloscope. From the card cages, the computer must determine which card, if any, has been replaced to simulate fault repair. The computer will then respond by presenting a corrected picture. The data acquisition module must distinguish between the faceplate and the card cages in order to be able to get data from these two groups in the correct order.

Figure 12:
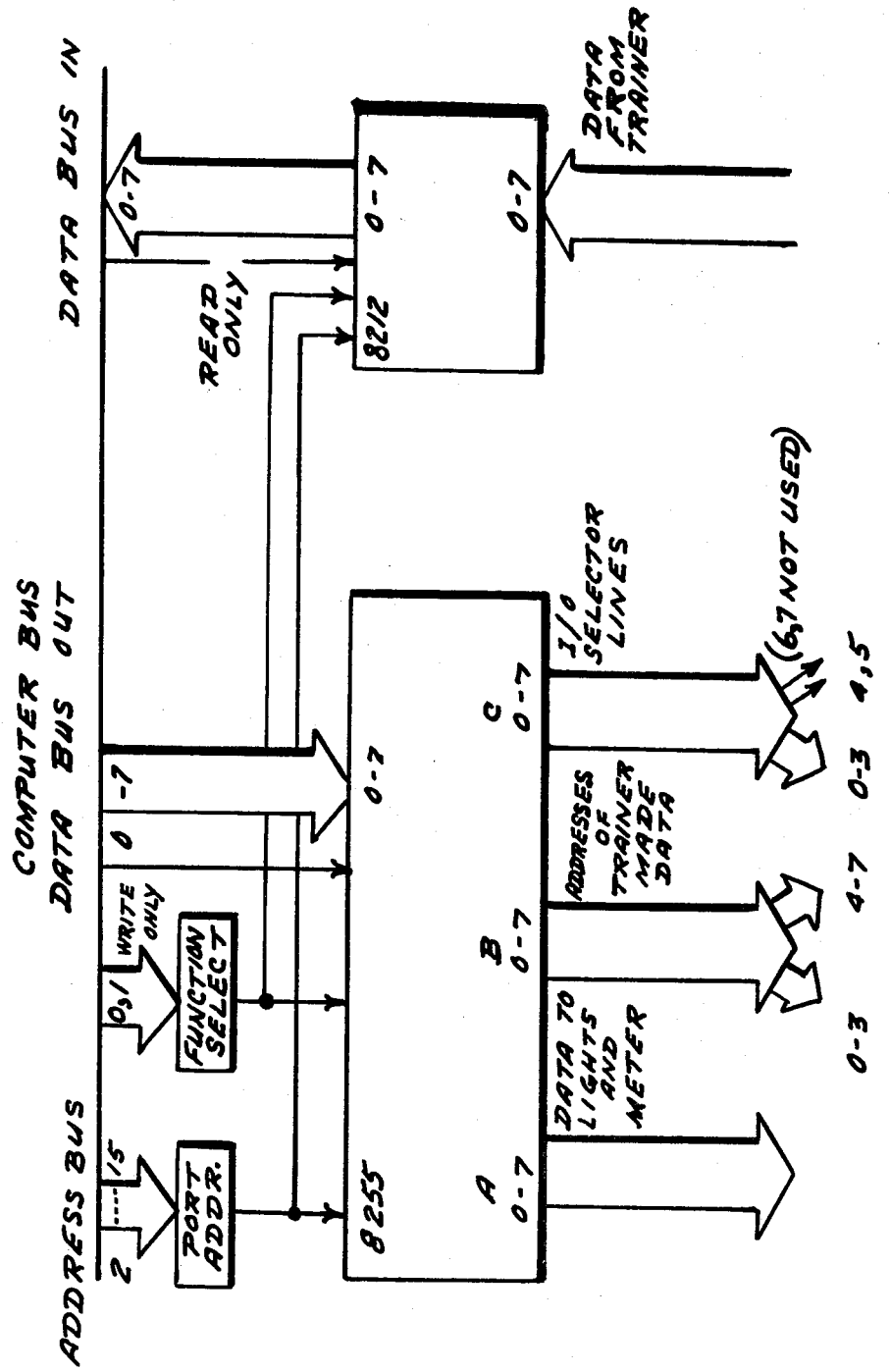
FIG. 12 is a block diagram of the input/output controller.

Due to hardware constraints, it is necessary for the acquisition module to make two searches, one search of the faceplate and one search of the card cages. (See FIG. 12.) Each search consists of reading a set of 16 eight-bit bytes representing 128 bit positions controlled by eight 1 of 16 multiplexers (MUX) in parallel. A search is initiated by enabling a data set with a bit in port C and addressing that set via port B. Two sets of data are currently searchable, where the first data set uses all 128 bits and the second data set contains only 55 bits used out of 80 possible wired positions. Once a data set is enabled and a byte within it addressed, it is read from the 8212 at port C.

The ports described thus far are memory mapped rather than actual port addresses. Memory addresses serve to activate the 8255, which is a software programmable I/O device. In systems which do not have large memory requirements, and do have extensive I/O requirements, this procedure is very convenient. For the purpose of training program considered here both memory map and port addressing are used in the hardware. The reason for using memory map addressing for I/O and regular port addressing elsewhere for the output of the oscilloscope is to demonstrate that it can be done both ways. The data acquisition module serves as a method of getting information into the computer. The next thing that is necessary is evaluation modules.

Figure 13:
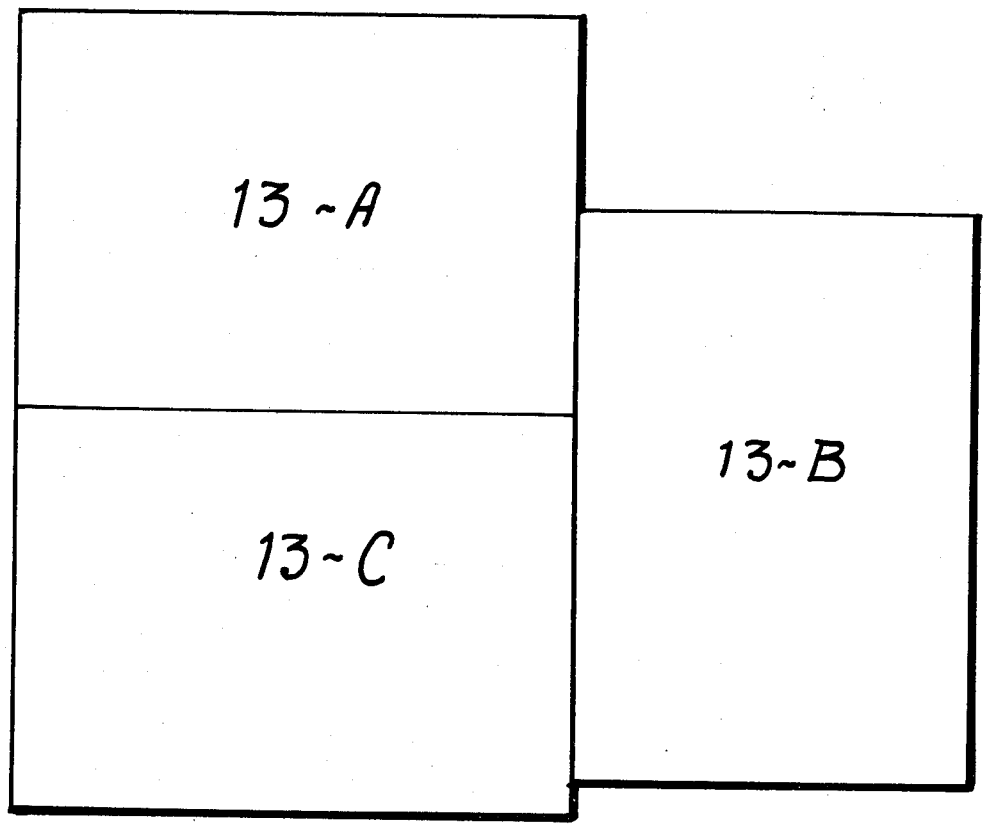
FIG. 13 being comprised of FIGS. 13A-13D is a DECIDE flow chart.

The evaluation module(s) (DECIDE and ADMEN) is (are) designed to look through all the information that has been collected by the data acquisition module. Decisions are made by cascade logic evaluation. This equates to a tree search wherein the keys to the branching are taken from the faceplate switch positions. The general flow, shown in FIG. 13, is a series of, at most, ten decisions leading to correct picture determination. Of those ten decisions, five were 'Do Case' decisions, which represent the cascade concept utilized. Most of the pre-decision evaluation is done in terms of Boolean logic programming as opposed to arithmetic programming. The reason for using LOGICAL code is speed.

The computer uses an eight-bit data word. If arithmetic means of dealing with these words are chosen, the lead bit is reserved for a sign bit. If that one bit happens to be turned on, automatic two's complement arithmetic takes place making it very difficult to control using simple code. By making everything single-bite LOGICAL, the computer effectively converts every LOGICAL word manipulation in the computer to eight-bit paralleled gating, such as an eight-bit AND, OR, or NOT gate. By performing logical AND, logical ORs, exclusive ORs, and inversions, each point is testable using relatively fast straight-forward logic. Another good feature of LOGICAL code is that it is very easily followed by electronic maintenance people who, presumably, are going to be the ones who will look at this program and see whether it is functioning. Boolean logic then is the basis of the evaluation module.

DECIDE and ADMEN conserve memory by examining 32 eight-bit words which form a 32×8 array of switch conditions on the trainer. Determination that a particular word bit is turned on is accomplished by doing a logical AND with a word that contains only that bit turned on—a true return means that the bit tested is turned on. Conserving memory space is essential since the trainer has a 32,000 word computer and a training program space of approximately 25,000 words. There is not much space for extensive arrays when the 7,000 word disk operating system and a 22,000 to 24,000 word program must co-exist there. The evaluation module determines which picture will be displayed by looking at all the switches and then supplying the necessary information to the display module PICTUR. Prior to picture display TPSPGM calls ERROR.

ERROR is called to determine if the student should be given a malfunction dependent on the current settings of the BITE. If such an error should be required, it is inserted into the text of the picture buffer (IODAT) or is passed directly to PICTUR as a systemic error.

Figure 14:
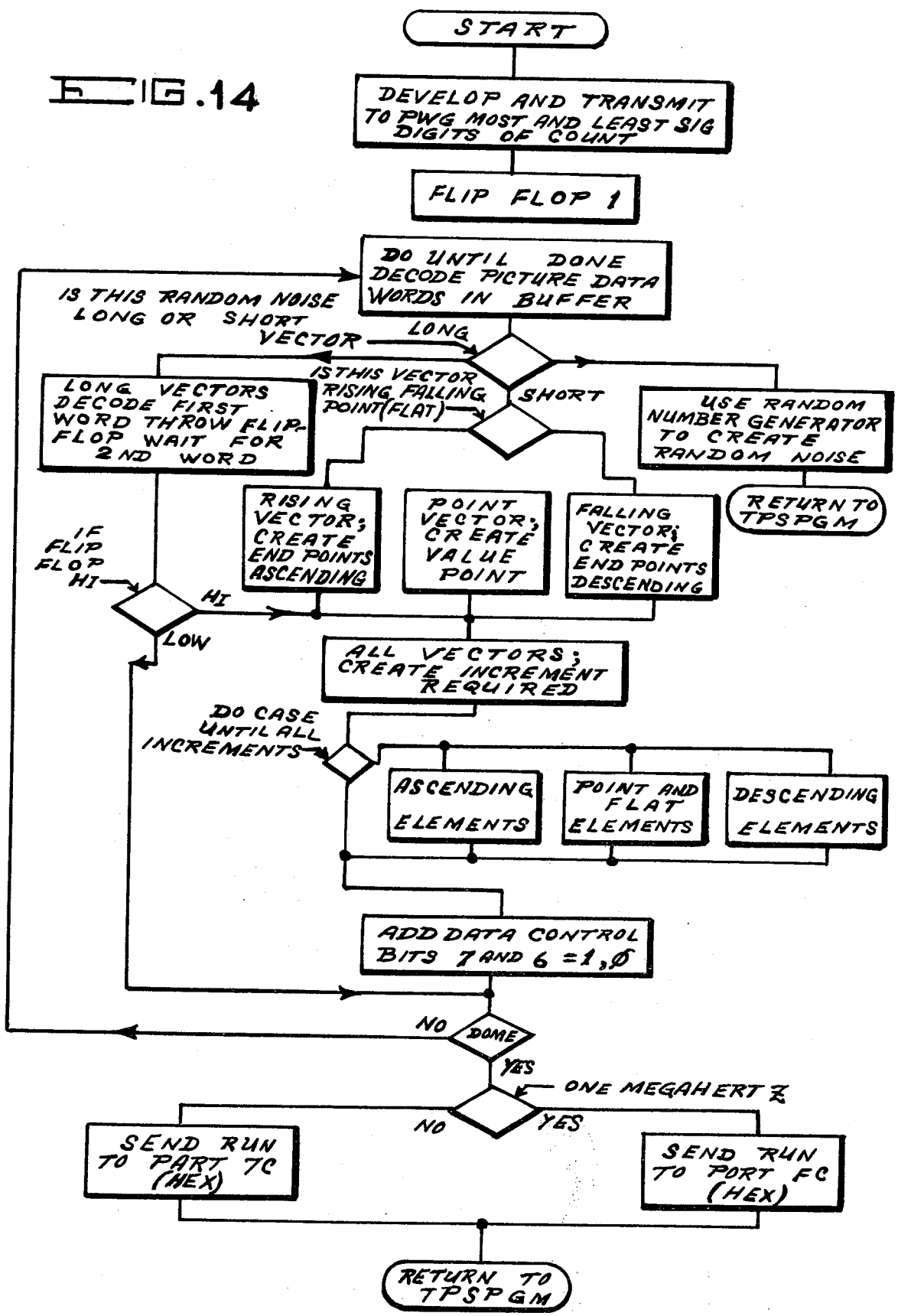
FIG. 14 is a PICTUR flowchart.

The data display module (PICTUR) is a subprogram which functions to create pictures that can be displayed on the oscilloscope (FIG. 14). It is broken into three major areas: point-by-point displays, point-to-point vectors, and random point displays.

Area one is the point-by-point displays. This area is specifically intended to allow any individual voltage to be displayed on the oscilloscope followed by another one of a different level without any regard to vector calculation. Therefore, an arbitrary point pattern can be displayed.

Area two is the vector display component of this module, which allows display of a line which rises or falls from a baseline of (and to) any of nine predetermined heights (maximum of 4 volts, minimum of zero volts). Display of a level line of any length (e.g., from ½ microsecond (us) to 2450 us) at any given voltage desired (e.g., at any of 64 possible voltage levels between zero and 5 volts) is also available. Area one is the special case of the level line where length equals one clock pulse. Each of these is a vector so that only the beginning and the end points need be given and the rest will be calculated, assembled, and transmitted to the PWG.

The reason for this method is that most of the picture lines to be generated can be done using groups of two byte, single integer word. On the rare occasion when a line cannot be done this way, as yet not encountered, an option exists which uses two integer words (of 16 bits each), prefixed with a negative sign, to provide any vector whatsoever.

Area three is a random number generator (RNG) used to create digital noise. The RNG is a simple multiplying type which provides random values from ½ volt to 3 volts in ½ volt steps. The picture module puts a particular picture into the display hardware and allows insertion of any ERROR chosen dysfunction.

As an example, consider a digital to analog converter. Input is 1 of 64 discrete voltage levels encoded in 6 parallel bits. If one of the parallel bit drivers is on, then that driver's output is continuously high regardless of what the input to it is. Thus a malfunction exists that should be demonstratable. One place to inject this malfunction is during the creation of the picture by logically ORing in that bit before data transmission. All the rest of the data will be correct but the error bit will always be on and behave exactly as the actual equipment will when broken as described above.

Another example malfunction exists when a bit is turned off continuously. This is mimicked by using a one's complement of the bit to be removed, logically ANDed with the data. By guaranteeing that the data is logically ANDed with a zero in a particular bit, assurances are made that all of what is in the original picture passes except for the chosen bit. The errors described above are common failures within the actual equipment.

The support software consists of a short program which creates a unique disk record within an error file. Each record is a specific problem which the student will be required to solve. The program consists of two data sets, created using the editor, that are immediately put to disk. The program then terminates. This program is simple enough to preclude serious problems in its own maintenance. FORTRAN was chosen because BASIC files are not compatible with the FORTRAN application program.

The data statement NAME is filled with the file name. The ERRS??DAT is the file name with the ?? being the particular record number under consideration. The application program will take the octal number of the faceplate's thumb wheel switch and insert an alphanumeric representation of it into the error file-record request.

The data statement IPUT is a coded error record. The nature of the error routine is that multiple dependent and independent dysfunctions are easily created, given the correct error file. The first element in the file is the length of the file, in addressable words. The next seven elements are seven different switches and their associated positions. Because the list is constant, the switch numbers are implied and only the positions appear on the list. The appearance of a zero indicates a "don't care" switch position. The last three values are the error type, card to be replaced, and picture affected respectively.

Of the last three values, the first has a dual role. If it is greater than 49 it is used as a selector of a bit stuck on, or off, as described above. The formula used is:

$$\text{Bit \#} = \text{Value} - 56 \quad (2)$$
$$\text{where } 49 \leq \text{Value} \leq 63.$$

When this value is coded less than 50, it is taken as the assignment of a new picture, not in the normal set, in place of the one usually found at this switch setting. A separate list is required for each picture affected. The length of the record is 91 words composed of a maximum of nine error lists of ten elements each, plus the record size itself.

Currently, there are over 30 different error records on the system. The potential is for 63, with the 00 record being the null record for normal operation. All error records were decided upon and encoded by instructor personnel.

The second support program is the picture code generator. This program is written in BASIC to provide ease of use and/or possible maintenance. There are five elements within the program covering points, vectors, and random noise pictures. Due to the extensive documentation within the program all that needs to be said here is that the output is a picture code printout which must be inserted manually into the application program prior to compilation.

The specific for any given utilization of the invention can be developed as indicated in the flow charts of the drawings and in accordance with procedures outlined herein. By way of example, the following program listings entitled *Application Program Bite, Student Error File Program,* and *Picture Code Generator,* represent the software for a typical application. Such program listings are not to be construed in any limiting sense, the above described device for generating simulated waveforms having inherent versatility that renders it capable of accommodating many different programs for many different applications.

APPLICATION PROGRAM BITE

```
    BLOCK DATA KEEPER
  LOGICAL*1  LNBIT(8), LBUF(32), IPUT(91)
    DIMENSION IODAT(100), IPICT(450), LIST(27)
    COMMON/POOL/LASTP, ISW, INIT, LIST, LNBIT, LBUF, IODAT, IPICT,
 *IPRG, IGOA, IGOB, IGOC, IPUT, I, II, III, IV, IIII, IX, IPRT, LUBIT
    DATA LNBIT/Z'01',Z'02',Z'04',Z'08',Z'10',Z'20',Z'40',Z'80'/,
 *  IPRG/Z'FFF3'/, IGOA/Z'FFF0'/, IGOB/Z'FFF1'/, IGOC/Z'FFF2'/,
 *  IPRT/2/,
 A  IPICT/4, 2400, 1, 5804, 15827, 25840, 17400,
 B  10, 2400, 1, 5209, 5209, 5209,
 *  5209, 15855, 25290, 25290, 25290, 25290, 17400,
 C  4, 2400, 1, 6609, 15855, 26690, 15800,
 D  18, 2400, 1,
 *  5209, 5209, 5209, 5209, 5209, 5209, 5209, 5209,
 *  15855, 25290, 25290, 25290, 25290, 25290,
 *  25290, 25290, 25290, 15800,
 E  26, 246, 1, 11600, 10155, 10100,
 *  10155, 10155, 10155, 10100, 10155, 10155, 10155, 10155, 10155,
 *  10155, 10155, 10155, 10100, 10155, 10155, 11555,
 *  10100, 12555, 10100, 13655, 20190, 15200, 13600,
 F  25, 246, 1, 12000, 13655, 10100, 12555, 10100, 11555,
 *  10155, 10155, 10100, 10155, 10155, 10155, 10155, 10155, 10155,
 *  10155, 10100, 10155, 10155, 10155, 10100, 10155, 15200, 13100,
 G  7, 256, 1, 13200, 11800, 10355, 12455, 15155, 12800, 15200,
 H  7, 256, 1, 11700, 15200, 15155, 12455, 10355, 11800, 14400,
 I  2, 128, 1, 0, 0,
 J  14, 128, 1, 10122, 10216, 10122, 10128, 10122, 10116,
 *  10122, 10128, 10122, 10128, 10122, 10128, 11528, 15228,
 K  11, 32, 1, 10219, 10209, 10203, 10109, 10303, 10155, 10103,
 *  10211, 10319, 10111, 11419,
 L  2, 4, 1, 10203, 10255,
```

M 2,4,1,10255,10203,

N 3,32,1,11500,10155,11600,

O 2,60,1,13000,13000,

P 84,3458,1,

* 10163,14600,04009,11055,15155,15200,

* 10163,14600,04309,10755,15155,15200,

* 10163,14600,05109,15155,15200,

* 10163,14600,04607,01479,14055,15200,

* 10163,14600,04606,02469,13055,15200,

* 10163,14600,04605,03759,11755,15200,

* 10163,14600,05207,15200,

* 10163,14600,05204,15200,

* 10163,14600,04007,11043,15143,15200,

* 10163,14600,10600,03404,11033,15133,15200,

* 10163,14600,11100,02903,11022,15122,15200,

* 10163,14600,11900,02102,11013,15113,15200,

* 10163,14600,12600,01401,11007,15107,15200,

* 10163,14600,13200,10800,11003,15103,15200,

Q 84,3458,1,

* 10163,15200,15155,11055,24090,14600,

* 10163,15200,15155,10755,24390,14600,

* 10163,15200,15155,25190,14600,

* 10163,15200,14055,21492,24620,14600,

* 10163,15200,13055,22496,24660,14600,

* 10163,15200,11755,23795,24650,14600,

* 10163,15200,25270,14600,

* 10163,15200,25240,14600,

* 10163,15200,15143,11043,24070,14600,

* 10163,15200,15133,11033,23440,10600,14600,

* 10163,15200,15122,11022,22930,11100,14600,

* 10163,15200,15113,11013,22120,11900,14600,

* 10163,15200,15107,11007,21410,12600,14600,

* 10163,15204,15103,11003,10800,13200,14600,

R 6,246,1,11600,03009,13055,15155,15200,12000,

```
S  6, 246, 1, 11600, 15155, 13055, 23090, 15200, 12000,
T  2, 16, 1, 10855, 10855,
U  2, 16, 1, 10800, 10855,
V  2, 8, 1, 10400, 10455,
W  2, 8, 1, 10428, 10428,
X  2, 4, 1, 10228, 10229,
Y  2, 4, 1, 10229, 10228,
Z  18, 263, 1, 15000, 00109, 20190, 00109, 25090, 00109, 20190,
*  00109, 20190, 15000, 00109, 20190, 00109, 15052, 20190,
        SUBROUTINE ERROR(MESUP, ICLST)
        LOGICAL KBIT
        LOGICAL*1 ICLST(14)
        DIMENSION MESUP(101)
        LOGICAL*1  LNBIT(8), LBUF(32), IPUT(91)
        DIMENSION IODAT(100), IPICT(450), LIST(27)
        COMMON/POOL/LASTP, ISW, INIT, LIST, LNBIT, LBUF, IODAT, IPICT,
       *IPRG, IGOA, IGOB, IGOC, IPUT, I, II, III, IV, IIII, IX, IPRT, LUBIT
        DATA KINIT/1/, MPICT/0/, ICWAS/0/, IWAS/0/, KOOL/0/
        ASSIGN 1234 TO NO
        ISW=0
C
        KINIT=INIT
C
1       JZ=MESUP(1)
        DO 2 KIX=2, JZ, 10
          IVZ=MESUP(KIX)
          IIIZ=MESUP(KIX+1)
          IZ=MESUP(KIX+2)
          LUBIZ=MESUP(KIX+3)
          IXZ=MESUP(KIX+4)
          IIZ=MESUP(KIX+5)
          IIIIZ=MESUP(KIX+6)
          IF(IVZ.NE.IV.AND.IVZ.NE.0)GO TO 2
          IF(IIIZ.NE.III.AND.IIIZ.NE.0)GO TO 2
          IF(IZ.NE.I.AND.IZ.NE.0)GO TO 2
```

```
        IF(LUBIZ. NE. LUBIT. AND. LUBIZ. NE. 0)GO TO 2
        IF(IXZ. NE. IX. AND. IXZ. NE. 0)GO TO 2
        IF(IIZ. NE. II. AND. IIZ. NE. 0)GO TO 2
        IF(IIIIZ. NE. IIII. AND. IIIIZ. NE. 0)GO TO 2
C
        IF(IVZ+IIIZ+IXZ+LUBIZ+IZ+IIZ+IIIIZ. EQ. 0)GO TO 2
C
        ISOLN=MESUP(KIX+8)
        MBIT=MESUP(KIX+9)
        MPICT=MESUP(KIX+7)
        KINIT=LIST(MPICT)
        GO TO 1000
2       CONTINUE
C
C
1000    IIS=1
        IF(LBUF(29). AND. LNBIT(5))IIS=0
        ICIS=0-IIS
        DO 99 K=17,30
          IF(LBUF(K). XOR. ICLST(K-16))GO TO 98
          GO TO 99
98        ICIS=ICIS+1
          IF(LBUF(ISOLN). AND. LNBIT(MBIT))GO TO 991
          GO TO 99
991       DO 22 KIX=2,JZ,10
            IF(ISOLN. EQ. MESUP(KIX+8). AND. MBIT. EQ. MESUP(KIX+9))GO TO 221
            GO TO 22
221         LIX=KIX+9
            DO 222 JIX=KIX,LIX
222         MESUP(JIX)=0
22        CONTINUE
99      CONTINUE
C
        IF(ICWAS. NE. ICIS. AND. IIS. EQ. 0)GO TO NO
```

```
            IF(ICIS.EQ.ICWAS)GO TO 80
            KOOL=KOOL+ICIS
            IF(KOOL.GT.1)GO TO NO
C
80          ICWAS=ICIS
            IWAS=IIS
            IF(ICIS)1401,1401,801
801         KINIT=LIST(15)
            GO TO 1401
1234        KINIT=LIST(26)
            GO TO 1402
*
1401        IF(KINIT.EQ.INIT)GO TO 10000
C
            IF(MPICT.GT.49)GO TO 1500
            GO TO 1402
1402        L=IPICT(KINIT)+3
            DO 99998 ID=1,L
            IP=KINIT+ID-1
99998       IODAT(ID)=IPICT(IP)
            GO TO 9999
1500        ISW=56-MPICT
9999        LASTP=KINIT
10000       RETURN
            END
CCCCCCCCCCCCCCCCCCCCCCCCCCCCCCCCCCCCCCCCCCCCCCCCCCCCCCCCCCCCCC
            SUBROUTINE PICTUR
            INTEGER*1 INTWD,ISTIK
            LOGICAL*1 LWD,MIKE,IKE,KWD
            LOGICAL*1  LNBIT(8), LBUF(32), IPUT(91)
            DIMENSION IODAT(100), IPICT(450),LIST(27)
            COMMON/POOL/LASTP,ISW,INIT,LIST,LNBIT,LBUF,IODAT,IPICT,
           *IPRG,IGOA,IGOB,IGOC,IPUT,I,II,III,IV,IIII,IX,IPRT,LUBIT
                EQUIVALENCE (LWD,INTWD),(KWD,ISTIK)
```

```
      DATA NPORT/Z'007C'/,IPORT/Z'00FC'/,P5/.05/

IA2=IODAT(2)

C
C     GET COUNT OF PULSES TO BE LOADED
C

MSB2=IA2/64

IB2=MSB2*64

LSB2=IA2-IB2
CSPLIT COUNT INTO TWO 6 BIT PARTS MOST AND LEAST SIG BITS
C
C

INTWD=MSB2

MIKE=LWD

INTWD=LSB2

IKE=LWD
C16 TO 8 BIT WORDS
C
C

MIKE=MIKE.OR.LNBIT(8).OR.LNBIT(7)

IKE=IKE.OR.LNBIT(7)
CTHAT PUTS THE CONTROLS IN
C
C

CALL OUT(NPORT,MIKE)

CALL OUT(NPORT,IKE)

IA2=IODAT(1)+3

MSB2=IODAT(2)
C
      DO 1 ID=4,IA2

K=IODAT(ID)

IF(K.EQ.0)GO TO 99999

N=K/10000

L=K-N*10000

M=L/100
```

```
            L=L-M*100
            LL=L
            K=L/10
            L=L-K*10
            IF(M.GT.50)M=50*(M-50)
C    A FIVE DIGIT POSITIVE INTEGER NUMBER ( <=32767) DECODES THUS:
C  N////  -> A'/', '-', OR'\' LINE WITH 0,1, OR 2 VALUE
C  /MM//  -> A LINE OF LENGTH 0 TO 50 OR A LINE LENGTH 50, TIMES THE
C             DIFFERENCE OF 50 TO 100
C  ///KL  -> A LINE FROM FROM ONE OF NINE EQUALLY INCREMENTED LEVELS (K)
C             TO ANOTHER SUCH LEVEL (L) DERIVED FROM THE SPACE REMAINING
C             ABOVE (OR BELOW) THE START LEVEL
            ZK=K
            ZK=ZK*6.3+P5
            ZL=L
      IF(N-1)101,104,103
101         ZL=(ABS(56.7-ZK)/9.)*ZL+P5+ZK
            GO TO 102
103         ZL=ZK-((ZK/9.)*(9-ZL)+P5)
102         ZM=M
            IF(M.EQ.0)ZM=1.
            Z=ABS(ZK-ZL)/ZM
                  ISTIK=IABS(ISW)
104         DO 55 J=1,M
              ZJ=J
C
C
            IF(N.EQ.0)INTWD=ZK+Z*ZJ+P5
            IF(N.EQ.1)INTWD=LL
            IF(N.EQ.2)INTWD=ZK-Z*ZJ-P5
C
C
                  MIKE=KWD
            IF(ISW)5500,5533,5522
```

```
5500            MIKE=MIKE.AND..NOT.(LNBIT(ISTIK))
                GO TO 5533
5522            MIKE=MIKE.OR.LNBIT(ISTIK)
5533            MIKE=.NOT.(LNBIT(7).OR.MIKE)
                CALL OUT(NPORT,MIKE)
55          CONTINUE
1       CONTINUE
        WRITE(5,69)MIKE,ISW
69      FORMAT(1X,'MIKE=',I8,/,'ISW=',I8,/)
C       SWITCH FOR ONE VERSES TWO MHZ OPERATION
C
        IF(INIT.GT.LIST(4))GO TO 6
        CALL OUT(IPORT,0)
        RETURN

C THIS IS THE RANDOM NOISE GENERATOR
99999   ISEED=12345
        DO 5 ID=1,MSB2
        ISEED=ISEED*31623
        RAN=ABS(ISEED*(1./(2.**15-1.)))
        RAN=RAN*31.5+2.
        IID=RAN
        IF(MOD(IID,2).EQ.0)GO TO 5
C               DIG NOISE NEEDS A "SQUARED LOOK"
C
        INTWD=IID
        IKE=LWD
        IKE=.NOT.(LNBIT(7).OR.IKE)
5       CALL OUT(NPORT,IKE)
6       CALL OUT(NPORT,0)
        RETURN
        END
```

```
      LOGICAL*1 JBITS, IPANL(9), NAME(11), NUMB(10), ICLST(14)
      DIMENSION MESUP(101)
    LOGICAL*1   LNBIT(8), LBUF(32), IPUT(91)
      DIMENSION IODAT(100), IPICT(450), LIST(27)
      COMMON/POOL/LASTP, ISW, INIT, LIST, LNBIT, LBUF, IODAT, IPICT,
     *IPRG, IGOA, IGOB, IGOC, IPUT, I, II, III, IV, IIII, IX, IPRT, LUBIT
      DATA IPANL/64, 7, 6, 128, 1, 0, 128, 3, 2/, JBITS/Z'3F'/,
     *NAME/'E','R','R','O','R','S',' ',' ','D','A','T'/,
     *NUMB/'0','1','2','3','4','5','6','7','8','9'/
C
C*INITIALIZE THE BITE I/O FACEPLATE WITH PORTS A, B, AND C OUTPUT ONLY.*
C
      CALL POKE(IPRG, 128)
C
      CALL POKE(IGOA, 0)
      DO 4 ID=2, 16, 2
        K=ID+1
          CALL POKE(IPRG, K)
          CALL POKE(IPRG, ID)
4     CONTINUE
          CALL POKE(IPRG, 9)
          CALL POKE(IPRG, 11)
      DO 5 ID=1, 9, 3
          CALL POKE(IGOA, IPANL(ID))
          CALL POKE(IPRG, IPANL(ID+1))
5         CALL POKE(IPRG, IPANL(ID+2))
C
C*GET ERROR FOR STUDENT TO FIX*
C
      CALL INOUT
      IF(LBUF(5).AND.LNBIT(8))IPRT=1
      IF(LBUF(5).AND.LNBIT(7))CALL POKE(31871, 197)
      LBUF(1)=LBUF(3).AND.JBITS
```

```
            L=LBUF(1)
            IF(L.EQ.0)GO TO 101
            KL=L/10
            JL=L-KL*10
            NAME(7)=NUMB(KL+1)
            NAME(8)=NUMB(JL+1)
            CALL OPEN(6,NAME,0)
            READ(6,2323)(MESUP(ID),ID=1,91)
 2323       FORMAT(9(10I5,1X,/),1I5)
            DO 7 ID=1,101
 7          MESUP(ID)=MESUP(ID)/10
            ENDFILE 6
C
            DO 6 ID=1,14
 6          ICLST(ID)=LBUF(ID+16)
C
            WRITE(5,1232)(MESUP(ID),ID=1,91)
 1232       FORMAT(1X,1I5,/,9(1X,10I5,3X,/))
 101        DO 10 ID=1,100
 10         IODAT(ID)=0
            ID=0
            ISW=0
            DO 20 K=1,450
            IF(IPICT(K).NE.1)GO TO 20
            ID=ID+1
            LIST(ID)=K-2
 20         CONTINUE
            DO 3 ID=1,32
            LBUF(ID)=.FALSE.
 3          IPUT(ID)=.FALSE.
C
C****THIS IS WHERE THE FACE PLATE AND CARD SWITCHES ARE READ.****
C
```

```
100      CONTINUE
C
         DO 2 IJK=1,32
         IPUT(IJK)=LBUF(IJK)
2        CONTINUE
         CALL INOUT
C
C----THE SWITCHES ARE NOW READ---
C****THIS IS WHERE THE FACE PLATE AND CARD SWITCHES ARE ANALYZED.***
         LOOK=0
C
         DO 1 ID=1,32
         IF(LBUF(ID) .XOR. IPUT(ID))LOOK=1
1 CONTINUE
         IF(LOOK.EQ.0)GO TO 100
         CALL DECIDE
         IF(L.NE.0)CALL ERROR(MESUP,ICLST)
         IF(LASTP.EQ.INIT)GO TO 100
         CALL PICTUR
         IF(LASTP.EQ.LIST(26))GO TO 9999
         LASTP=INIT
C
C START AGAIN AND LOOK AT THE FACE PLATE AND SWITCHES
         GO TO 100
C
9999     STOP
         END
CCCCCCCCCCCCCCCCCCCCCCCCCCCCCCCCCCCCCCCCCCCCCCCCCCCCCCCCCCCC
         SUBROUTINE INOUT
         INTEGER*1 INTWD,NBIT(8)
         LOGICAL*1 LWD
         LOGICAL LLWD
```

```
      DIMENSION IB1(2), IB2(2)
LOGICAL*1 LNBIT(8), LBUF(32), IPUT(91)
    DIMENSION IODAT(100), IPICT(450), LIST(27)
    COMMON/POOL/LASTP, ISW, INIT, LIST, LNBIT, LBUF, IODAT, IPICT,
   *IPRG, IGOA, IGOB, IGOC, IPUT, I, II, III, IV, IIII, IX, IPRT, LUBIT
      DATA IB1/10,8/, IB2/11,9/
C
C
C
            J=0
      DO 400 ID=1,2
            DO 401 IK=1,16
            J=J+1
            K=IK-1
            K1=K
               IF(ID.EQ. 1)K1=K*16
            CALL POKE(IGOB,K1)
            CALL POKE(IPRG, IB1(ID))
            LBUF(J)=PEEK(IGOC)
            CALL POKE(IPRG, IB2(ID))
401         CONTINUE
400   CONTINUE
      GO TO (500,501), IPRT
500   DO 5 ID=1,32
      LWD=LBUF(ID)
      IF(LWD.EQ. IPUT(ID))GO TO 5
      IZ=LWD
         DO 4 IY=1,8
            NBIT(IY)=0
            IF(LWD.AND. LNBIT(IY))NBIT(IY)=1
4     CONTINUE
      WRITE(5,1233)(LNBIT(IXX), IXX=1,8)
      WRITE(5,1232)(NBIT(IY), IY=1,8),LWD, ID
1233  FORMAT(/,1X,8I7)
```

```
1232    FORMAT(1X,10I7)
5       CONTINUE
501     RETURN
 *      END
CCCCCCCCCCCCCCCCCCCCCCCCCCCCCCCCCCCCCCCCCCCCCCCCCCCCCC
        SUBROUTINE DECIDE
        INTEGER*1 LEN
        LOGICAL*1 LTEST, MTEST, LENTH, LENT
        LOGICAL*1  LNBIT(8), LBUF(32), IPUT(91)
        DIMENSION IODAT(100), IPICT(450), LIST(27)
        DIMENSION MTIPS(4)
        COMMON/POOL/LASTP, ISW, INIT, LIST, LNBIT, LBUF, IODAT, IPICT,
       *IPRG, IGOA, IGOB, IGOC, IPUT, I, II, III, IV, IIII, IX, IPRT, LUBIT
        EQUIVALENCE (LEN, LENT)
        DATA LENTH/Z'3F'/
        ASSIGN 9999 TO IFLAT
        ASSIGN 4500 TO IAD
        ASSIGN 99999 TO LESGO
C
C
C
C             /* TURN ON THE BITE TESTER */
C//*S1*//
        IF(LBUF(4) .AND. LNBIT(8))GO TO 3700
        CALL CLEAR
        GO TO IFLAT
C
C
C
C//*S37*//       /*USES POSNS 9&10...LBUF(9) HOLDS POSNS 1-8 OF S37*/
3700    IF(LBUF(9))GO TO IFLAT
C/*POSNS 1 THRU 8 OF SW37 ARE INVALID*/
C
C
```

```
C                   /*ELSE GO TO S37 POSN 9 OR 10*/
C/*FIND OUT POSN OF SW45*/
        LTEST=LBUF(15)
        DO 451 IV=1,7
        IF(LTEST.AND.LNBIT(IV))GO TO 452
451     CONTINUE
        IV=0
452     IV=IV+1
C
C
C
        LTEST=LBUF(7)
        DO 460 III=4,6
460         IF(LTEST.AND.LNBIT(III))GO TO 461
        III=3
461     III=III-2
C
C       /(S46) PATTERN SETS III/
        MTEST=LBUF(8)
        DO 3800 II=1,7
3800            IF(MTEST.AND.LNBIT(II))GO TO 4100
        II=II+1
C
C       (S38) CHANNEL SEL SET=II
C
C
C
C       MTI/SCH(S41) NEED TO SET DP AND CHAN SEL
C       (S41) SETS ALL MTI/SCH FUNCTIONS
4100    LTEST=LBUF(12)
        DO 4141 I=3,8
4141        IF(LTEST.AND.LNBIT(I))GO TO 4142
```

```
            I=2
4142    I=I-1
C
C
C
        MTEST=.FALSE.
        LTEST=MTEST
        IF(LBUF(31).AND.LNBIT(5))MTEST=.TRUE.
        IF(LBUF(32).AND.LNBIT(5))LTEST=.TRUE.
        DO 41022 IIII=1,4
C
C
C
41022   MTIPS(IIII)=0
        IF(LBUF(2).AND.LNBIT(1))MTIPS(1)=2
        DO 41020 IIIX=1,3
        IIII=9-IIIX
41020   IF(LBUF(1).AND.LNBIT(IIII))MTIPS(IIIX+1)=IIIX+2
C
C
        IF(IV.NE.3.OR.IV.NE.4)CALL CLEAR
        GO TO(9999,9999,4630,4640,45000,45000,4500,4500),IV
45000   CONTINUE
C/*S3709-3710*//    /*MUST NOT BE IN MTI/SEARCH FOR A/D MEMORY*/
        IF(LBUF(2).AND.LNBIT(4))GO TO IAD
C                   /*ELSE DO MTI/SEARCH(S3710)-BELOW-*/
C
        GO TO (4101,4102,4103,4104,4150,4150,4150),I
C/*MTI DECODER*/
4101    GO TO(9999,4651,4651,4651,4651,4651,4651,9999),II
C
C
C/*THE II AND III 'GO TO'S' CAN BE EXTENDED TO SHOW ERRORS*/
4651    GO TO(1080,1090,1080,1100),III
```

```
C
C
C/* MTI PEAK SELECT*/
C
C       CHAN SEL MUST= PROCESSOR CHAN OTHERS NOT REQ
C
4102    CONTINUE
        DO 41023 IIII=1,4
41023   IF(MTIPS(IIII).EQ.II)GO TO 41024
        GO TO IFLAT
41024 GO TO (1080,1090,1080,1100),III
C
C
C/*THRESHOLD*/*MTI*/* MTI? OR INTEGRATORS?*/
4104    KLEN=0
        IF(IV.EQ.6)GO TO 4505
        IF(IV.NE.5)GO TO IFLAT
        DO 46540 IIII=1,4
        IF(MTIPS(IIII).NE.0)GO TO 4654
46540   CONTINUE
        GO TO IFLAT
4654    GO TO(9999,9999,9999,1130),III
C
C
C/*INTEGRATOR(MTI(THRESHOLD OR INTEGRATOR))*/
C/*INTEGRATOR*/
4103    IF(MTEST)GO TO(1150,9999,1160,9999),III
        GO TO(1170,9999,1180,9999),III
C
C
C/*MTI/THRESHOLD*/*INTEGRATOR*/
4505    IF(MTEST)GO TO(1040,9999,1050,9999),III
        GO TO(1060,9999,1070,9999),III
C
```

```
C
C*/MTI INTEGRATOR*/
C-----------------
C/*SEARCH BEGINS HERE*/
4150    IF(IV.NE.6)GO TO IFLAT
C
C
        DO 41500 IIII=1,5
        IF(LBUF(1).AND.LNBIT(IIII))GO TO 41501
41500   CONTINUE
        GO TO IFLAT
41501 J=I-6
        LENT=LBUF(3).AND.LENTH
        IF(KLEN.NE.LEN)LASTP=0
        KLEN=LEN
        KLEN=1+KLEN*.25
        KLEN=KLEN*100
        IF(J)4155,4156,4157
C
C/*SEARCH INTEGRATOR*/
4155    GO TO (9999,4655,4655,4655,4655,4655,4655,9999),II
4655    IF(LTEST)GO TO(1150,9999,1160,9999),III
        GO TO (1170,9999,1180,9999),III
C
C/*SEARCH THRESHOLD*/
4156    GO TO (9999,4656,4656,4656,4656,4656,4656,9999),II
4656    IF(LTEST)GO TO(1040,9999,1050,9999),III
        GO TO (1060,9999,1070,9999),III
C
C/*SEARCH PEAK SELECT*/
4157    GO TO(9999,4657,4657,4657,4657,4657,4657,9999),II
4657    IF(LTEST)GO TO(1040,9999,1050,9999),III
```

```
       GO TO(1060,9999,1070,9999),III
C      /*THIS ENDS MTI/SEARCH*/

/*THIS BEGINS A/D MEMORY*/

4500  CALL ADMEM
       GO TO LESGO

4600  CONTINUE
 4640  CALL HGT
       GO TO LESGO
C
 1040  INIT=LIST(5)
       GO TO LESGO
 1050  INIT=LIST(6)
       GO TO LESGO
 1060  INIT=LIST(7)
       GO TO LESGO
 1070  INIT=LIST(8)
       GO TO LESGO
 1080  INIT=LIST(9)
       GO TO LESGO
 1090  INIT=LIST(10)
       GO TO LESGO
 1100  INIT=LIST(11)
       GO TO LESGO
 1130  INIT=LIST(14)
       GO TO LESGO
 9999  CONTINUE
 1140  INIT=LIST(15)
       GO TO LESGO
 1150  INIT=LIST(16)
       GO TO LESGO
```

```
1160      INIT=LIST(17)
          GO TO LESGO
1170      INIT=LIST(18)
          GO TO LESGO
1180      INIT=LIST(19)
C
99999 IF(LASTP.EQ.INIT)RETURN
          L=IPICT(INIT)+3
          DO 99998 ID=1,L
          IP=INIT+ID-1
99998 IODAT(ID)=IPICT(IP)
          IF(INIT.GT.LIST(8).OR.INIT.LT.LIST(5))GO TO 1111
          K1=KLEN/100.+1.05
          IF(INIT.NE.LIST(5))GO TO 1051
          DO 1042 N=1,K1
1042      IODAT(N+4)=10100
          GO TO 1111
1051      IF(INIT.NE.LIST(6))GO TO 1061
          DO 1052 N=1,K1
          NN=27-N
1052      IODAT(NN)=10100
          GO TO 1111
1061      IF(INIT.NE.LIST(7))GO TO 1071
          IODAT(5)=IODAT(5)-KLEN
          IODAT(6)=IODAT(6)+KLEN
          GO TO 1111
1071      IODAT(8)=IODAT(8)+KLEN
          IODAT(9)=IODAT(9)-KLEN
1111      RETURN
          END
CCCCCCCCCCCCCCCCCCCCCCCCCCCCCCCCCCCCCCCCCCCCCCCCCCCCCCCC
          SUBROUTINE ADMEM
          LOGICAL*1 LTEST,MTEST,LENTH,LENT
          LOGICAL*1 LNBIT(8), LBUF(32),IPUT(91)
```

```
      DIMENSION IODAT(100), IPICT(450), LIST(27)
      COMMON/POOL/LASTP, ISW, INIT, LIST, LNBIT, LBUF, IODAT, IPICT,
     *IPRG, IGOA, IGOB, IGOC, IPUT, I, II, III, IV, IIII, IX, IPRT, LUBIT
      ASSIGN 1111 TO LESGO
      ASSIGN 9999 TO IFLAT
      IF(LBUF(2).AND.LNBIT(4))GO TO 400
      GO TO 9999
400   LTEST=LBUF(11)
      DO 430 IX=1,8
      IF(LTEST.AND.LNBIT(IX))GO TO 431
430   CONTINUE
      IX=IX+1
431   LUBIT=1
      IF(LBUF(8).AND.LNBIT(8))LUBIT=2
C
      GO TO(9999,9999,9999,9999,9999,9999,4507,4508),IV
4507  GO TO(9999,9999,9999,4304,4305,4306,9999,4307,4308),IX
4508  GO TO(4301,4302,4303,9999,9999,9999,9999,9999,9999),IX
C/*HEIGHT A-D*/
4301  GO TO(1030,1020),LUBIT
C/*SEARCH A-D*/
4302  GO TO(9999,4352,4352,4352,4352,4352,4352,9999),II
4352  GO TO(1010,1000),LUBIT
C/*MTI A-D*/
4303  GO TO(9999,4353,4353,4353,4353,4353,9999),II
4353  GO TO(1030,1020),LUBIT
C/*    MEMORIES   */
C/*HEIGHT EVAL MEM*/
4304  GO TO(9999,1190,1200,1210),III
C/*CANC #1 AND 2 */
4305  CONTINUE
4306  GO TO(9999,4345,4345,4345,4345,4345,4345,9999),II
```

```
4345      GO TO(4355,4365),LUBIT

4355      GO TO(9999,1190,1110,1120),III

4365      GO TO(1220,1220,1230,1240),III

C/*SEARCH INT MEM*/

4307      GO TO(9999,4357,4357,4357,4357,4357,9999),II

4357      GO TO(9999,1190,1110,1120),III

C/*MTI INT MEM*/

4308      GO TO(9999,1190,1110,1120),III

C

C

CTHIS ENDS A-D/MEMORY

C

C

1000      INIT=LIST(1)
          GO TO LESGO

1010      INIT=LIST(2)
          GO TO LESGO

1020      INIT=LIST(3)
          GO TO LESGO

1030      INIT=LIST(4)
          GO TO LESGO

1110      INIT=LIST(12)
          GO TO LESGO

1120      INIT=LIST(13)
          GO TO LESGO

9999      CONTINUE

1140      INIT=LIST(15)
          GO TO LESGO

1190      INIT=LIST(20)
          GO TO LESGO

1200      INIT=LIST(21)
          GO TO LESGO

1210      INIT=LIST(22)
          GO TO LESGO
```

```
1220    INIT=LIST(23)
        GO TO LESGO
1230    INIT=LIST(24)
        GO TO LESGO
1240    INIT=LIST(25)
1111    RETURN
        END
CCCCCCCCCCCCCCCCCCCCCCCCCCCCCCCCCCCCCCCCCCCCCCCCCCCCCCCCCC
        SUBROUTINE CLEAR
        DATA I/Z'FFF0'/,J/Z'FFF3'/
        CALL POKE(I,0)
        CALL POKE(J,5)
        CALL POKE(J,4)
        RETURN
        END
        SUBROUTINE HGT
        LOGICAL*1 LTEST
        LOGICAL*1 LNBIT(8), LBUF(32), IPUT(91)
        DIMENSION IODAT(100), IPICT(450), LIST(27)
        LOGICAL*1 IPATN(4), JPATN(4), KPATN(4), LPATN(4)
        COMMON /POOL/ LASTP, ISW, INIT, LIST, LNBIT, LBUF, IODAT, IPICT,
       *IPRG, IGOA, IGOB, IGOC, IPUT, I, II, III, IV, IIII, IX, IPRT, LUBIT
        DATA IPATN/Z'6E',Z'56',Z'29',Z'95'/,
       *     JPATN/Z'31',Z'76',Z'5C',Z'25'/,
       *     KPATN/Z'22',Z'5E',Z'4B',Z'E1'/,
       *     LPATN/Z'1A',Z'44',Z'35',Z'A6'/
        IF(IV.EQ.3)GO TO 1000
        CALL POKE(IGOA,IPATN(III))
        GO TO 9999
C
1000    IF(LBUF(16).AND.LNBIT(8))GO TO 167
        IF(LBUF(15).AND.LNBIT(8))GO TO 157
        CALL POKE(IGOA,KPATN(III))
        GO TO 9999
```

```
C
167     CALL POKE(IGOA,LPATN(III))
        GO TO 9999
C
157     CALL POKE(IGOA,JPATN(III))
C
9999    CALL POKE(IPRG,5)
        CALL POKE(IPRG,4)
        INIT=LIST(15)
        RETURN
        END
CCCCCCCCCCCCCCCCCCCCCCCCCCCCCCCCCCCCCCCCCCCCCCCCCCCCCCCCCCCCCCC
        SUBROUTINE PICTUR
        INTEGER*1INTWD, ISTIK
        LOGICAL*1 LWD, MIKE, KWD, IKE
        LOGICAL*1  LNBIT(8), LBUF(32), IPUT(91)
        DIMENSION IODAT(100), IPICT(470), LIST(30)
        COMMON/POOL/LASTP, ISW, INIT, LIST, LNBIT, LBUF, IODAT, IPICT,
       *IPRG, IGOA, IGOB, IGOC, IPUT, I, II, III, IV, IIII, IX, IPRT, LUBIT
        EQUIVALENCE (LWD, INTWD), (KWD, ISTIK)
        DATA NPORT/Z'007C'/, IPORT/Z'00FC'/, P5/.05/
        DATA IFLIP/-1/

IA2=IODAT(2)
        IFLP0=0
C
C       GET COUNT OF PULSES TO BE LOADED
C
        MSB2=IA2/64
        IB2=MSB2*64
        LSB2=IA2-IB2
CSPLIT COUNT INTO TWO 6 BIT PARTS MOST AND LEAST SIG BITS
C
C
        INTWD=MSB2
        MIKE=LWD

INTWD=LSB2

IKE=LWD
C16 TO 8 BIT WORDS
```

```
      MIKE=MIKE.OR.LNBIT(8).OR.LNBIT(7)
      IKE=IKE.OR.LNBIT(7)
CTHAT PUTS THE CONTROLS IN
C
C
      CALL OUT(NPORT,MIKE)
      CALL OUT(NPORT,IKE)
      IA2=IODAT(1)+3
      MSB2=IODAT(2)
C
      DO 1 ID=4,IA2
      K=IODAT(ID)
         IFLG=K
         K=IABS(K)
         N=K/10000
         L=K-N*10000
         M=L/100
         L=L-M*100
         LL=L
         IF(IFLG)7,99999,8
7        ICK=IFLP**IFLP0
C     SWITCH FOR ONE VERSES TWO MHZ OPERATION
C
      IF(INIT.GT.LIST(4))GO TO 6
      CALL OUT(IPORT,0)
   RETURN
CCCCCCCCCCCCCCCCCCCCCCCCCCCCCCCCCCCCCCCCCCCCCCCCCCCCCCCCCCCCCCCCCCC
C THIS IS THE RANDOM NOISE GENERATOR
99999  ISEED=12345
       DO 5 ID=1,MSB2
       ISEED=ISEED*31623
       RAN=ABS(ISEED*(1./(2.**15-1.)))
       RAN=RAN*31.5+2.
       IID=RAN
```

```
         IF(MOD(IID,2).EQ.0)GO TO 5
C              DIG NOISE NEEDS A "SQUARED LOOK"
C
         INTWD=IID

IKE=LWD

IKE=.NOT.(LNBIT(7).OR.IKE)

5        CALL OUT(NPORT,IKE)

6        CALL OUT(NPORT,0)
         RETURN

END
CCCCCCCCCCCCCCCCCCCCCCCCCCCCCCCCCCCCCCCCCCCCCCCCCCCCCCCCCCCCC
         IF(ICK.GE.0) GO TO 70

IFLP0=1

M=MM*100+M

ZM=M

ZL=LL

IFLP0 2

GO TO 1021

70            MM=M

ZK=LL

GO TO 1

8             CONTINUE

K=L/10
              L=L-K*10

IF(M.GT.50)M=50*(M-50)

ZK=K

ZK=ZK*6.3+P5

ZL=L

IF(N-1)101,104,103

101           ZL=(ABS(56.7-ZK)/9.)*ZL+P5+ZK

GO TO 102

103           ZL=ZK-((ZK/9.)*(9-ZL)+P5)
102           ZM=M

IF(M.EQ.0)ZM=1.
```

```
1021            CONTINUE
                Z=ABS(ZK-ZL)/ZM
                ISTIK=IABS(ISW)
104             DO 55 J=1,M
                ZJ=J
C
                IF(N.EQ.0)INTWD=ZK+Z*ZJ+P5
                IF(N.EQ.1)INTWD=LL
                IF(N.EQ.2)INTWD=ZK-Z*ZJ-P5
C
                MIKE=KWD
                IF(ISW)5500,5533,5522
5500            MIKE=MIKE.AND..NOT.(LNBIT(ISTIK).
                GO TO 5533
5522            MIKE=MIKE.OR.LNBIT(ISTIK)
5533            MIKE=.NOT.(LNBIT(7).OR.MIKE)
                CALL OUT(NPORT,MIKE)
55              CONTINUE
1               CONTINUE
```

APPENDIX G
STUDENT ERROR FILE PROGRAM

```
C
        PROGRAM ERRS 20
        DIMENSION IPUT(91)
        LOGICAL*1 NAME(9)
        DATA NAME/'E','R','R','S','2','0','D','A','T'/
        DATA IPUT/41,7,1,0,0,8,3,0,61,24,5,
     *             7,2,0,0,8,3,0,61,24,5,
     *             7,3,0,0,8,3,0,61,24,5,
     *             7,4,0,0,8,3,0,61,24,5,50*0/
C
        CALL OPEN(6,NAME,0)
1       FORMAT(9(10I5,1X,/),1I5)
        WRITE(6,1)(IPUT(I),I=1,91)
        ENDFILE 6
        STOP
        END
```

B. TYPE ERRORS20.DAT

| 41 | 7 | 1 | 0 | 0 | 8 | 3 | 0 | 61 | 24 |
| 5 | 7 | 2 | 0 | 0 | 8 | 3 | 0 | 61 | 24 |
| 5 | 7 | 3 | 0 | 0 | 8 | 3 | 0 | 61 | 24 |
| 5 | 7 | 4 | 0 | 0 | 8 | 3 | 0 | 61 | 24 |
| 5 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

0

APPENDIX H
PICTURE CODE GENERATOR

```
10   REM THIS PROGRAM TAKES A SERIES OF PARAMETERS FOR LINE SEGMENTS,
20   REM WHICH FORM THE PICTURE DISPLAY. THE PROGRAM THEN ENCODES THEM
30   REM INTO FIVE DIGIT GROUPS FOR USE BY THE PROGRAM BITE.
40   REM
50   REM THE MENU DESCRIBES WHICH ELEMENTS ARE AVAILABLE. EACH
60   REM SELECTION USED CREATES ONE OR MORE GROUPS, UP TO 96 GROUPS,
70   REM AND SUBTRACTS THE NUMBER OF PULSES USED FROM THOSE AVAILABLE
80   REM UNTIL THERE ARE NONE LEFT.
90   DIM V[9],I[100]
100  DIM A$[10],B$[10]
110  LET L0=3
120  LET I[3]=1
130  PRINT "WHAT IS THE TOTAL LENGTH OF THE PICTURE IN PULSES"
140  INPUT S
150  LET I[2]=S
160  REM
180  PRINT "                    M E N U"
190  PRINT
200  PRINT "1=A FLAT LINE FROM 1 TO 4096 PULSES IN LENGTH, 0 TO 5 VOLTS"
210  PRINT "2=A RISING (OR FALLING) LINE 1 TO 50 PULSES IN LENGTH"
220  PRINT "    OR A MULTIPLE OF 50 UP TO 2450 PULSES IN LENGTH"
230  PRINT "3=A RISING (OR FALLING) LINE GREATER THAN 50 PULSES IN"
240  PRINT "    LENGTH AND NOT AN EVEN MULTIPLE OF 50"
250  PRINT "4=A RANDOM NOISE PICTUIRE"
260  PRINT "5=A MIXTURE OF 4 WITH 1,2 OR 3 ABOVE"
270  PRINT
280  LET I[1]=L0
290  PRINT "YOU HAVE ";96-L0;" WORDS LEFT"
300  PRINT "YOU HAVE ";S;"PULSES LEFT"
310  PRINT "SELECT DESIRED SEGMENT TYPE FROM THE MENU PLEASE"
320  INPUT N
330  IF N>5 THEN 290
332  LET T3=L0
340  PRINT "WHAT IS THE LENGTH OF THIS SEGMENT?"
350  INPUT L
355  LET L5=L
360  IF S-L<0 THEN 340
370  LET S=S-L
380  REM           FLAT EVEN  ODD RND#  MIX
390  GOSUB N OF 450,690,1150,1350,1420
400  REM      *********OTHER BASICS USE "ON N GOSUB"
405  GOSUB 1450
```

```
410  IF S <= 0 THEN 9036
430  GOTO 160
440  REM***************FLAT***************************
450  REM
460  PRINT "ENTER A VOLTAGE FROM 0.0 TO 5.0 PLEASE"
470  INPUT W
480  LET W=INT((63*W)/5+.05)
490  LET T=10000
500  REM THIS GETS LENGTH >2450 PULSES LONG
510  LET N=0
520  IF L<50 THEN 580
530  LET L=L-50
540  LET N=N+1
550  IF L<50 GOSUB 620
560  IF N>48 GOSUB 620
570  GOTO 520
580  IF L=0 THEN 610
590  LET N=L
600  GOSUB 630
610  RETURN
620  LET N=N+50
630  LET L0=L0+1
640  LET I[L0]=T+100*N+W
650  LET N=0
670  RETURN
680  REM***********EVEN MULTIPLE OF 50 (UP OR DOWN)**********
690  PRINT "FROM WHICH OF THE FOLOWING VOLTAGES DO YOU WISH TO BEGIN"
700  LET F1=4
710  LET F=.4444
720  LET E=9
730  GOSUB 880
740  GOSUB 950
750  LET W=10*E
760  LET T=0
770  PRINT "GOING UP OR DOWN"
780  INPUT A$
790  IF A$#"UP" THEN 840
800  GOSUB 860
810  GOSUB 950
820  LET W=W+E
830  GOTO 980
840  IF A$="DOWN" THEN 1000
850  GOTO 770
860  LET F1=4-(E*.4444)+.00005
870  LET F=F1/9
880  REM ENTER HERE WHEN GETTING THE BASE VALUES
890  PRINT "0      ";"0"
900    FOR I9=1 TO 9
910    LET V[I9]=I9*F+3.99995-F1
920    PRINT I9;V[I9]
930    NEXT I9
940  RETURN
950  PRINT "VOLTAGE CODE IS?"
960  INPUT E
970  RETURN
980  GOSUB 510
990  RETURN
1000  GOSUB 1050
1010  GOSUB 950
1020  LET T=20000
1030  LET W=W+E
1040  GOTO 980
1050  LET F1=E*.4444
1060  LET F=F1/9
1070    FOR I9=1 TO 9
1080    LET V[I9]=(I9*F+.00005)
1090    PRINT I9;V[I9]
1100    NEXT I9
1110  PRINT "0      ";"0"
```

```
1130 RETURN
1140 REM************UNEVEN MULTIPLE OF 50 (UP OR DOWN)*********
1150 PRINT "WHAT ARE THE START AND ENDING VOLTAGES? (0 TO 5V)"
1160 INPUT H9,H
1170 LET Z=0
1180 LET W9=H9
1190 LET W1=H
1200 IF H9<H LET Z=20000
1210 LET W9=INT((63*W9)/5+.05)
1220 LET W1=INT((63*W1)/5+.05)
1230 LET L2=L/100
1240 LET L3=INT(L2+.05)*100
1250 LET L2=(L-L3)*100
1260 LET C1=(Z+L3+W9)*-1
1270 LET C2=(Z+L2+W1)*-1
1280 LET L0=L0+1
1290 LET I[L0]=C1
1300 LET L0=L0+1
1310 LET I[L0]=C2
1330 RETURN
1340 REM*******************RANDOM NOISE*******************
1350 LET L0=L0+1
1360 LET I[L0]=0
1370 LET L0=L0+1
1380 LET I[L0]=0
1400 RETURN
1410 REM*************REGULAR AND RANDOM NOISE MIXTURE********
1420 PRINT "DO THE REST OF THE PICTURE WITH RANDOM NOISE LAST"
1430 PRINT "THEN USE MENU 4"
1440 RETURN
1450 REM************NICE PRINT ROUTINE***********
1460 LET M=L0
1470   FOR J=1 TO M
1480   PRINT I[J];
1482   NEXT J
1484 PRINT "IS THAT SATISFACTORY? (YES-NO)"
1490 INPUT B$
1500 IF B$="YES" RETURN
1510 LET L0=T3
1520 PRINT "TRY AGAIN"
1530 LET S=S+L5
9035 RETURN
9036 GOSUB 1460
9040 STOP
9999 END
```

While the invention has been described in terms of its preferred embodiment it is understood that the words which have been used are words of description rather than words of limitation and that changes within the purview of the appended claims may be made without departing from the scope and spirit of the invention in its broader aspects.

What is claimed is:

While the invention has been described in terms of its preferred embodiment it is understood that the words which have been used as words of description rather than words of limitation and that changes within the purview of the appended claims may be made without departing from the scope and spirit of the invention in its broader aspects.

What is claimed is:

1. In a maintenance trainer for an electronic system said trainer having a training station including a facsimile of the electronic system's external meter displays and test functions, system error selecting means and trainer operated system error correction functions, the improvement residing in waveform generating means for electronically simulating internal functions of said electronic system, said waveform generating means comprising, (a) digital computer means, (b) a clock circuit, (c) a programmable waveform generator receiving digital input from said computer means, operating on said clock circuit via said computer means, operating on said clock circuit via said computer means and providing an analog output to training station displays, said programmable waveform generator comprising, memory means, a data loading circuit receiving digital data from said computer means and loading said memory means, said data loading circuit comprising data port latch means receiving waveform data and control data from said computer means, a function and address control circuit comprising latch strobe gate means controlling said data port latch means in response to control data from said computer means, a program control decoder receiving control data from said computer means through said data port latch means, load gate means controlling said memory address latch means and said memory address counter means in response to said clock circuit and the output of said program control decoder, pulse stretching means connected between said latch strobe gate means and said load gate means, and write gate means responsive to said clock circuit and said program control decoder and controlling said memory address counter means, memory address latch means responsive to said function and address control circuit, said data port latch means providing control data to said function and address control circuit and waveform data to said memory address latch means and said memory means, memory address counter means receiving waveform data from said memory address latch means and providing address to said memory means in response to said clock circuit and said function and address control circuit, memory mapped address means adapted to enable said data port latch means, said function and address control circuit, said memory address latch means and said memory address counter means in response to control data from said computer, and a digital analog converter receiving digital data from said memory means and providing analog signals therefrom; and, (d) an input/output circuit interfacing said computer means, said programmable waveform generator and said training station displays, error selecting means and test functions, said input/output circuit functioning as a special purpose memory mapped input/output controller and comprising data select circuit means integrally interconnectable with the external displays, meters and test functions of said training station, a data out port receiving system data and providing waveform data to external meters and displays and control data to said data select circuit means, a data in port receiving data from said data select circuit means and providing an input to said computer means, and device select means adapted to enable said data select circuit means, said data out port and said data in port in response to control data from said computer.

2. In a maintenance trainer for an electronic system, a waveform generating means as defined in claim 1 wherein said function and address control circuit provides programmable waveform generator operation in any one of the modes comprised of (1) data accepting; (2) accepting an address load of the least significant digit; (3) accepting an address load of the most significant digit; and (4) run independently of said computer means.

3. In a maintenance trainer for an electronic system, a waveform generating means as defined in claim 2 wherein said memory address counter means comprises a multiplicity of series connected up-down counters.

4. In a maintenance trainer for an electronic system, a waveform generating means as defined in claim 3 wherein said memory means comprises a multiplicity of parallel connected random access memories.

5. In a maintenance trainer for an electronic system, a waveform generating means as defined in claim 4 wherein said input/output circuit includes latch means controlling waveform data between said data out port and said external meters and displays, said latch means being enabled by means of control data from said data out port.

6. In a maintenance trainer for an electronic system, a waveform generating means as defined in claim 5 wherein said data select circuit means comprises a plurality of data select circuit cards, each said data select circuit card including a multiplicity of parallel connected integrated circuit multiplexers.

7. In a maintenance trainer for an electronic system, a waveform generating means as defined in claim 6 wherein said data out port comprises a programmable bidirectional, tri-state integrated circuit and said data in port comprises a programmable mono-directional tri-state integrated circuit.

8. In a maintenance trainer for an electronic system, a waveform generating means as defined in claim 7 wherein said data out port is adaptable to bidirectional bus usage.

9. In a maintenance trainer for an electronic system, a waveform generating means as defined in claim 1 wherein said clock circuit comprises, a clock, clock gate means controlling the output of said clock, a divide by two clock divider flip flop controlling said clock gate means in response to operating mode control data, and a divide by two control flip flop responsive to the internal clock of said computer means controlling said clock gate means.

10. In a maintenance trainer for an electronic system, a waveform generating means as defined in claim 9 wherein said computer means internal clock runs at 4 MHz, said clock runs at 2 MHz and said clock circuit effects loading of data from said computer means into said programmable waveform generator at 4 MHz and run operation of said waveform generator at 1 MHz and 2 MHz.

11. In a maintenance trainer for an electronic system, a waveform generating means as defined in claim 1 wherein said computer means comprises a microcomputer.

12. In a maintenance trainer for an electronic system, said trainer having a training station including a facsimile of the electronic system's external meters, displays and test functions, system error selecting means and trainee operated system error correction functions, the improvement residing in waveform generating means for electronically simulating internal functions of said electronic system, said waveform generating means comprising, a microcomputer, a clock circuit having a clock, clock gate means controlling the output of said clock, divide by two clock divider flip-flop controlling said clock gate means in response to operating mode control data, and a divide by two control flip flop responsive to the internal clock of said microcomputer controlling said clock gate means, a programmable waveform generator receiving digital input from said microcomputer and providing an analog output to training station displays, said programmable waveform generator comprising a random access memory means, memory address latch means, memory address converter means, a data loading circuit receiving digital data from said computer means and loading said random access memory means, said data loading circuit including data port latch means receiving waveform data and control data from said microcomputer, a function and address control circuit comprising latch strobe gate means controlling said data port latch means in response to control data from said microcomputer, a program control decoder receiving control data from said microcomputer through said data port latch means, load gate means controlling said memory address latch means and said memory address counter means in response to said clock circuit and the output of said program control decoder, pulse stretching means connected between said latch strobe gate means and said load gate means and write gate means responsive to said clock circuit and said program control decoder and controlling said memory address counter means, said memory address latch means being responsive to said function and address control circuit, said data port latch means providing control data to said function and address control circuit and waveform data to said memory address latch means and said memory means, said memory address counter means comprising a multiplicity of serially connected up-down counters receiving waveform data from said memory address latch means and providing address to said memory means in response to said clock circuit and said function and address control circuit, and a digital/analog converter receiving digital data from said memory means and providing analog signals therefrom, and an input/output circuit interfacing said microcomputer, said training station displays, meters, error selecting means and test functions, said input/output circuit comprising a plurality of data select circuit cards integrally interconnectable with the external displays, meters and test functions of said training station, each said data select circuit card including a multiplicity of parallel connected multiplexers, a data out port comprising a programmable bidirectional tri-state integrated circuit receiving system data and providing waveform data to external meters and displays and control data to said data select circuit cards, and a data in port comprising a programmable monodirectional tri-state integrated circuit receiving data from said data select circuit cards and providing an input to said microcomputer.

13. In a maintenance trainer for an electronic system, said trainer having a training station including a facsimile of the electronic system's external meters, displays and test functions, system error selecting means and trainee operated system error correction functions, a computer, and a waveform generating means with a clock circuit for electronically simulating internal functions of said electronic system, the improvement residing in a programmable waveform generator adapted to receive digital input from said computer and provide an analog output to training station displays, said programmable waveform generator comprising, a random access memory means, memory address latch means, memory address counter means, a data loading circuit receiving digital data from said computer and loading said random access memory means, said data loading circuit including data port latch means receiving waveform data and control data from said computer, a function and address control circuit comprising latch strobe gate means controlling said data port latch means in response to control data from said computer, a program control decoder receiving control data from said computer through said data port latch means, load gate means controlling said memory address latch means and said memory address counter means in response to said clock circuit and the output of said program control decoder, pulse stretching means connected between said latch strobe gate means and said load gate means and write gate means responsive to said clock circuit and said program control decoder and controlling said memory address counter means, said memory address latch means being responsive to said function and address control circuit, said data port latch means providing control data to said function and address control circuit and waveform data to said memory address latch means and said memory means, said memory address counter means comprising a multiplicity of serially connected up-down counters receiving initial address data from said memory address latch means and providing address to said memory means in response to said clock circuit and said function and address control circuit, and a digital/analog converter receiving digital data from said memory means and providing analog signals therefrom.

* * * * *

UNITED STATES PATENT AND TRADEMARK OFFICE
CERTIFICATE OF CORRECTION

PATENT NO. : 4,406,627
DATED : Sep. 27, 1983
INVENTOR(S) : Michael F. Winthrop and Buddy L. Holmes It is certified that error appears in the above-identified patent and that said Letters Patent are hereby corrected as shown below:

Column 79 delete first paragraph

> "While the invention has been described in terms of its preferred embodiment it is understood that the words which have been used as words of description rather than words of limitation and that changes within the purview of the appended claims may be made without departing from the scope and spirit of the invention in its broader aspects
>
> What is claimed is:".

Signed and Sealed this

Seventeenth Day of July 1984

[SEAL]

Attest:

Attesting Officer

GERALD J. MOSSINGHOFF

Commissioner of Patents and Trademarks